United States Patent [19]
Kitamura et al.

[11] 4,232,954
[45] Nov. 11, 1980

[54] RECORDING POSITION ADJUSTER

[75] Inventors: Takashi Kitamura, Yokohama; Asao Watanabe, Higashikurume; Takashi Nakano, Yokohama; Katsumi Masaki, Kodaira; Kazuhiro Hirayama, Yokohama; Yasushi Sato, Kawasaki; Taisuke Tokiwa, Yokohama, all of Japan

[73] Assignee: Canon Kabushiki Kaisha, Tokyo, Japan

[21] Appl. No.: 831,919

[22] Filed: Sep. 9, 1977

Related U.S. Application Data

[62] Division of Ser. No. 616,675, Sep. 25, 1975, Pat. No. 4,059,833.

[30] Foreign Application Priority Data

| | | |
|---|---|---|
| Feb. 3, 1975 [JP] | Japan | 50-14544 |
| Feb. 4, 1975 [JP] | Japan | 50-14530 |
| Feb. 4, 1975 [JP] | Japan | 50-14534 |
| Feb. 13, 1975 [JP] | Japan | 50-18528 |
| Mar. 1, 1975 [JP] | Japan | 50-25120 |

[51] Int. Cl.² .................................................. G03B 15/00
[52] U.S. Cl. ..................................................... 354/7
[58] Field of Search .............................. 354/4, 5, 6, 7

[56] References Cited

U.S. PATENT DOCUMENTS

| | | | |
|---|---|---|---|
| 3,582,946 | 6/1971 | Mita et al. | 354/7 |
| 3,638,185 | 1/1972 | Dell et al. | 346/108 X |
| 3,643,251 | 2/1972 | Kolb et al. | 354/7 |
| 3,820,123 | 6/1974 | Ammann | 354/7 |
| 3,946,365 | 3/1976 | Bantner | 354/7 |
| 3,971,044 | 7/1976 | Findley et al. | 354/9 |
| 4,007,442 | 2/1977 | Findley et al. | 178/30 X |
| 4,089,008 | 5/1978 | Suga et al. | 354/5 |

*Primary Examiner*—Michael L. Gellner
*Attorney, Agent, or Firm*—Fitzpatrick, Cella, Harper & Scinto

[57] ABSTRACT

A recording position defining apparatus includes a beam generator for generating a modulated beam in accordance with a signal to be recorded; a beam deflector; a beam detector fixed at a predetermined position; a clock signal generator for generating clock signals of a predetermined frequency; and a record signal applicator for applying a record signal to the beam generator upon detection of a predetermined number of clock signals after the beam is detected by the beam detector.

33 Claims, 73 Drawing Figures

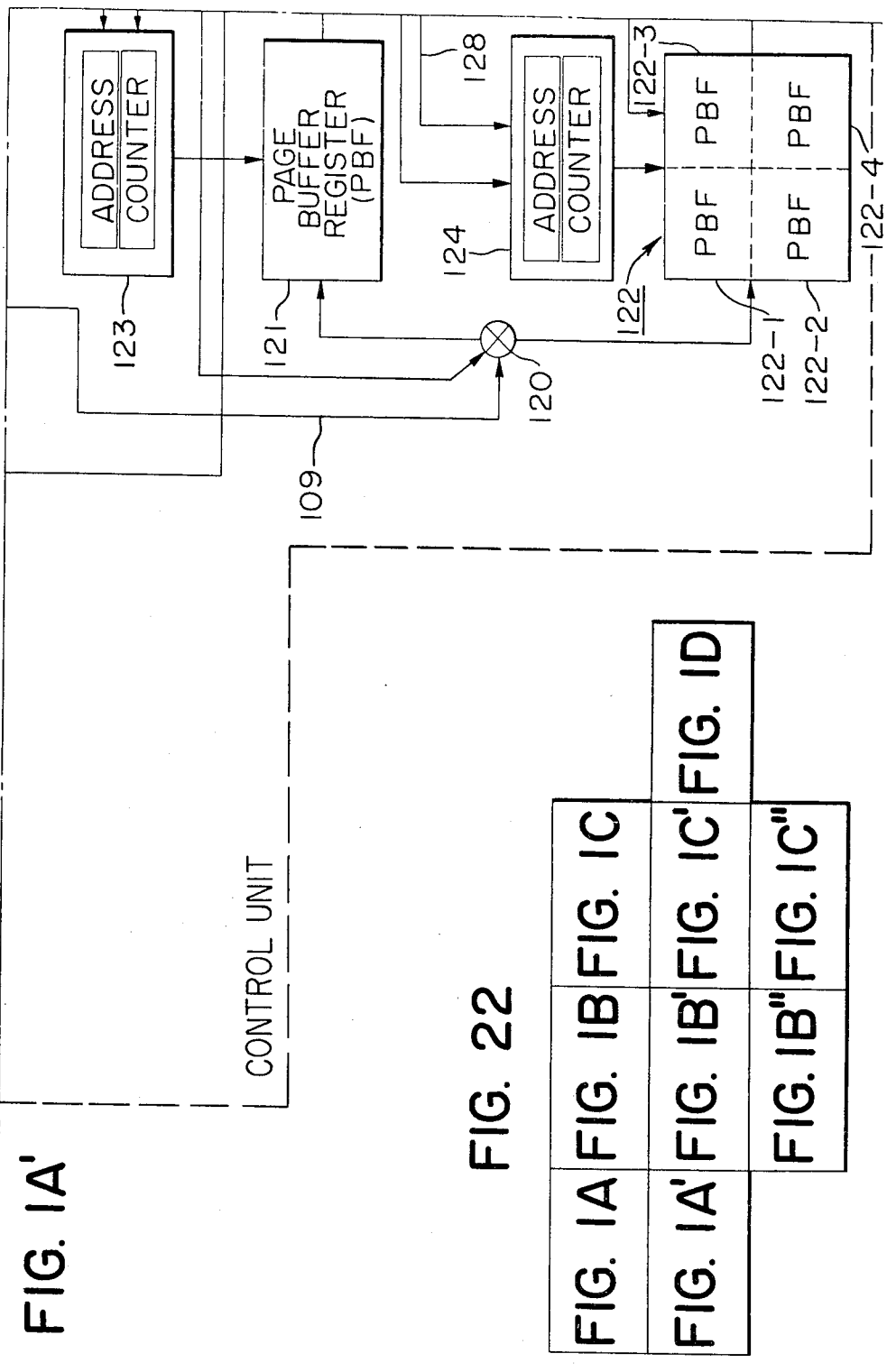

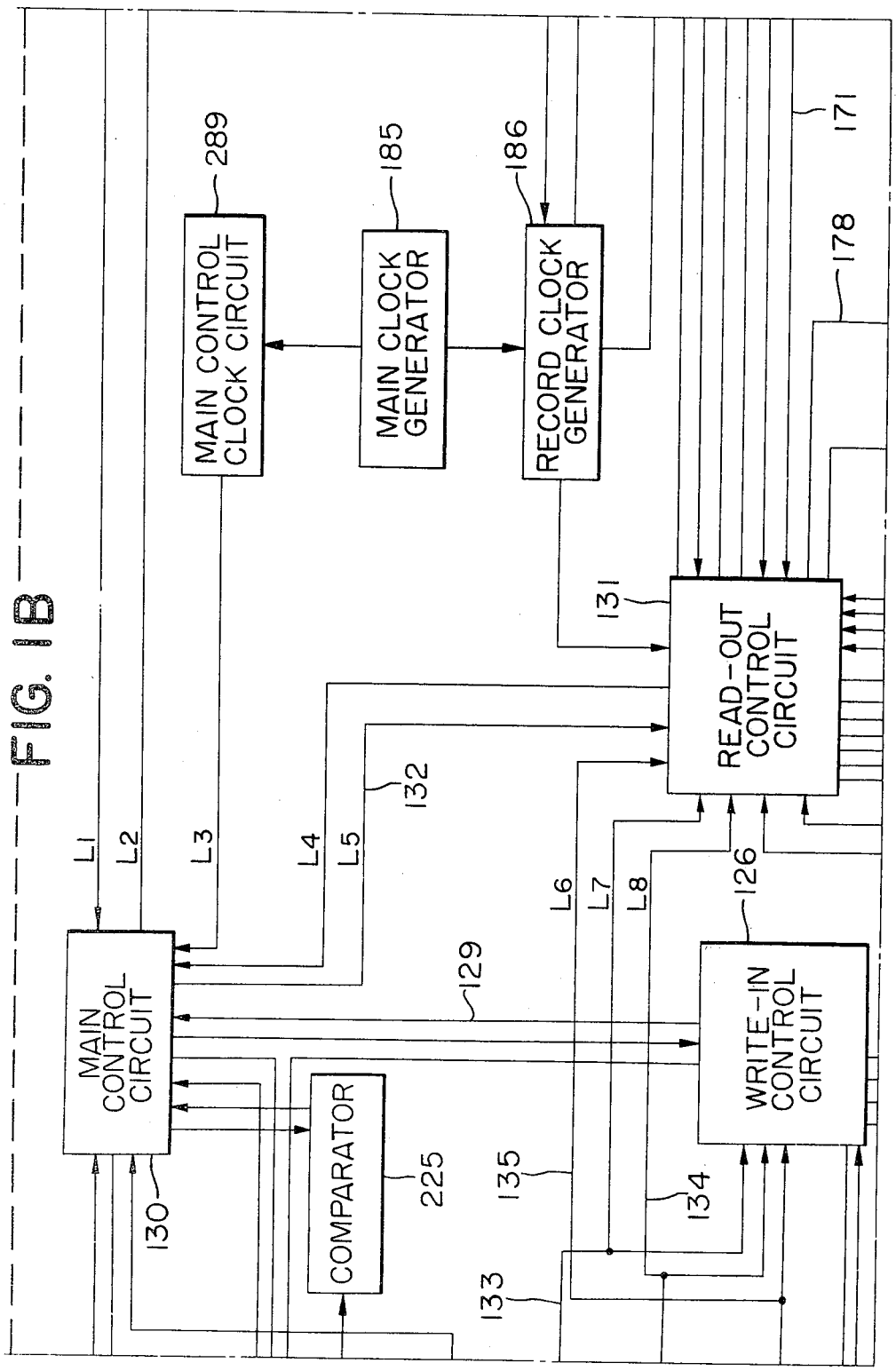

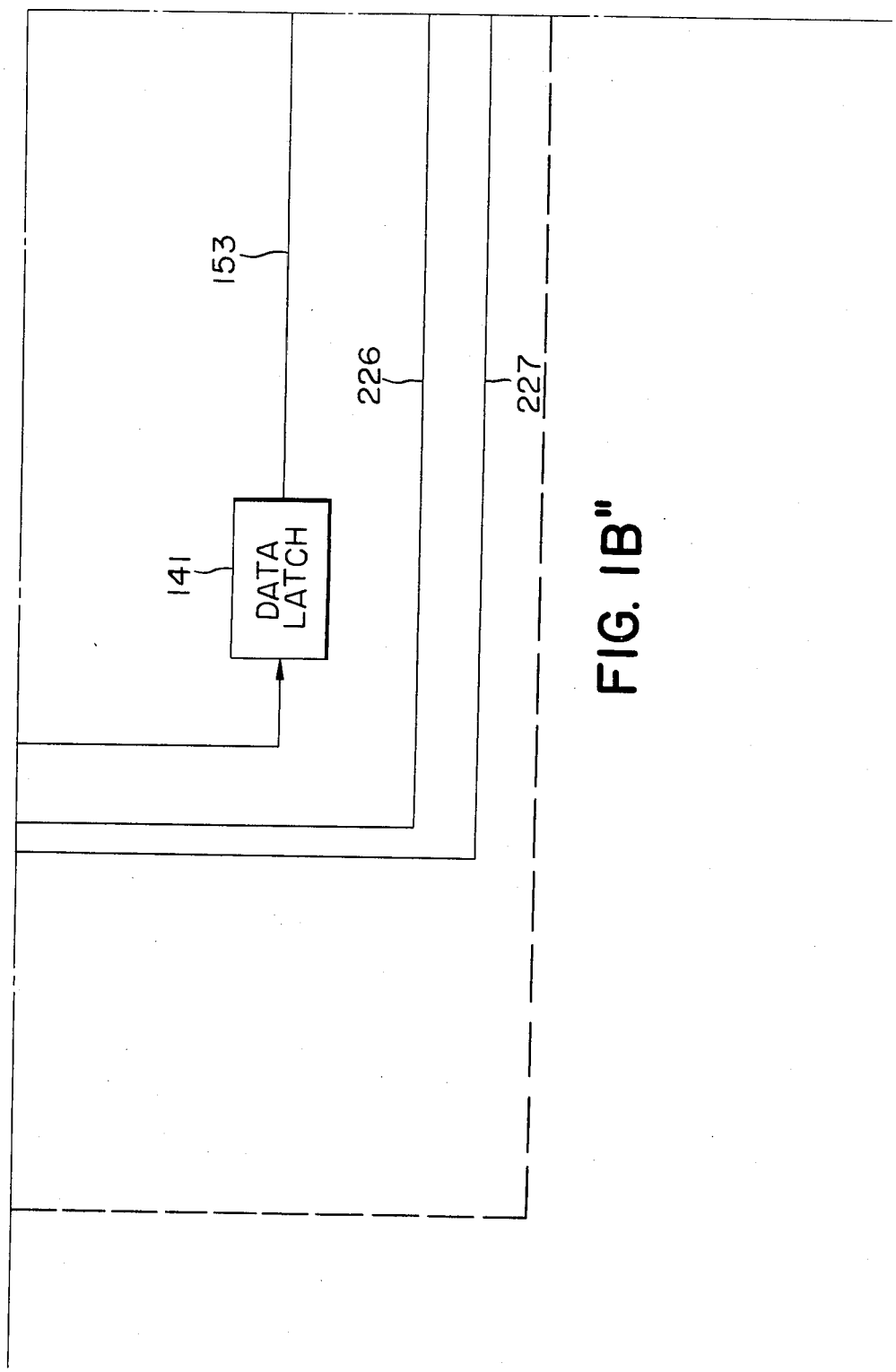

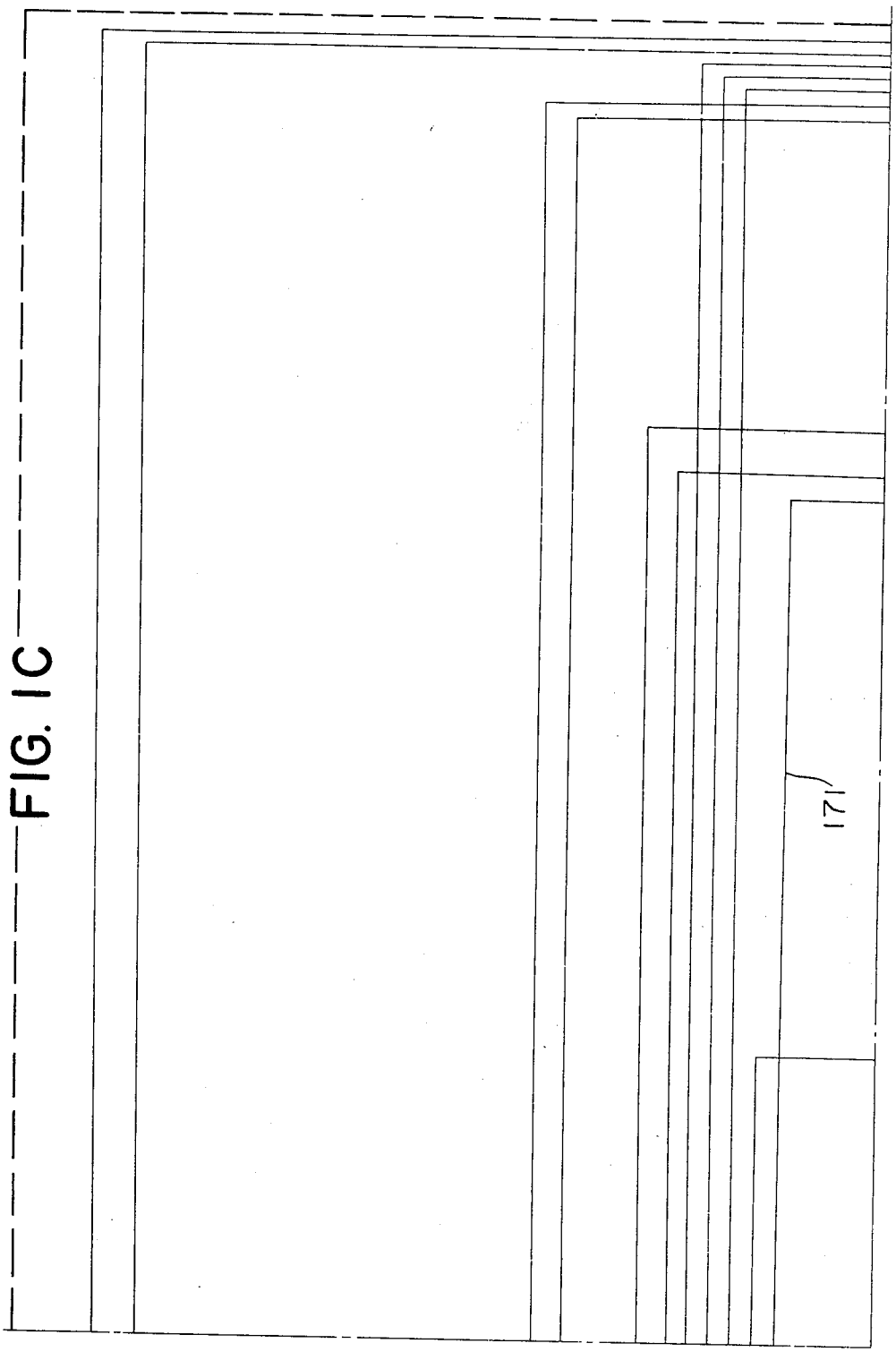

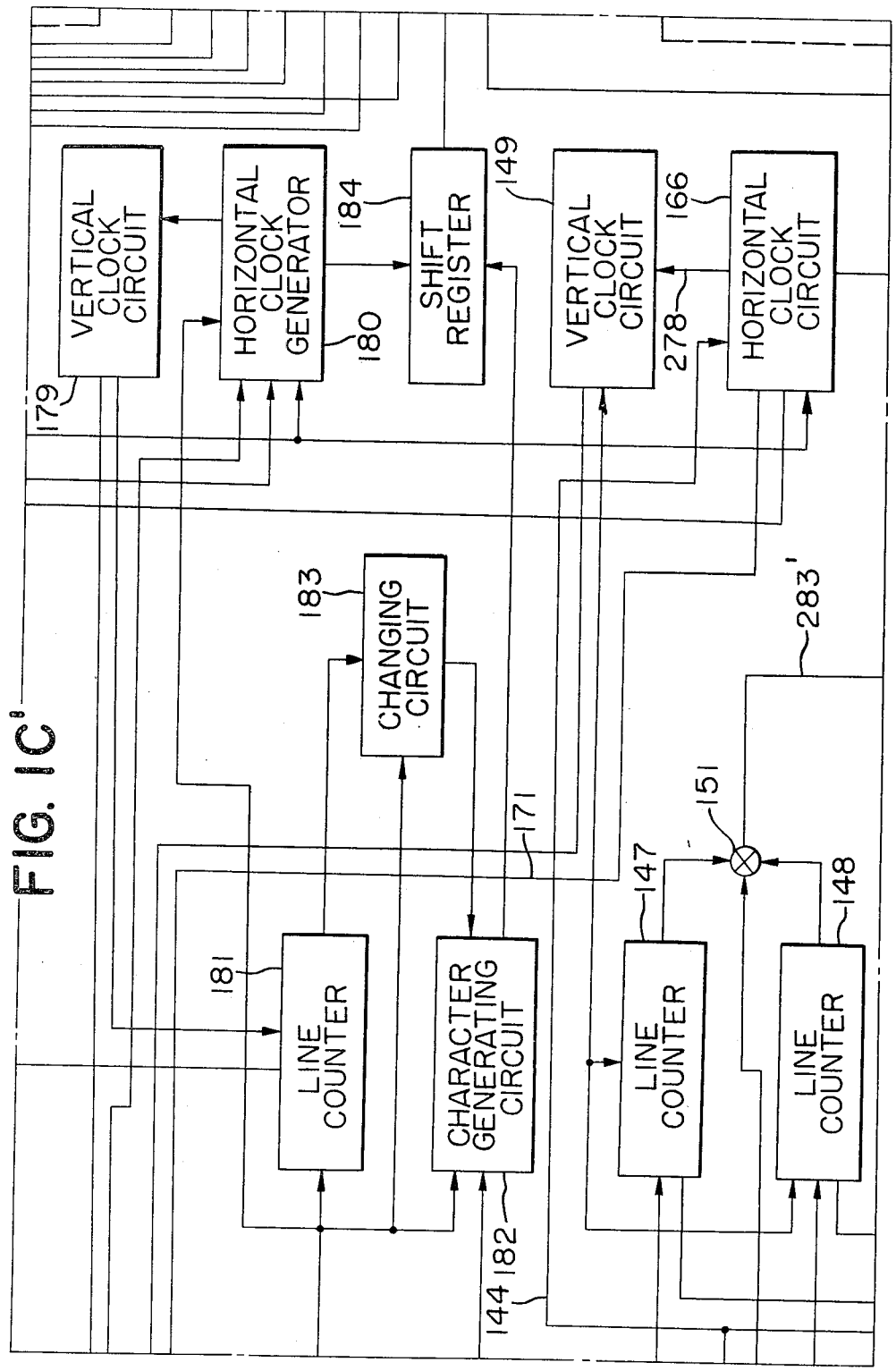
FIG. IC

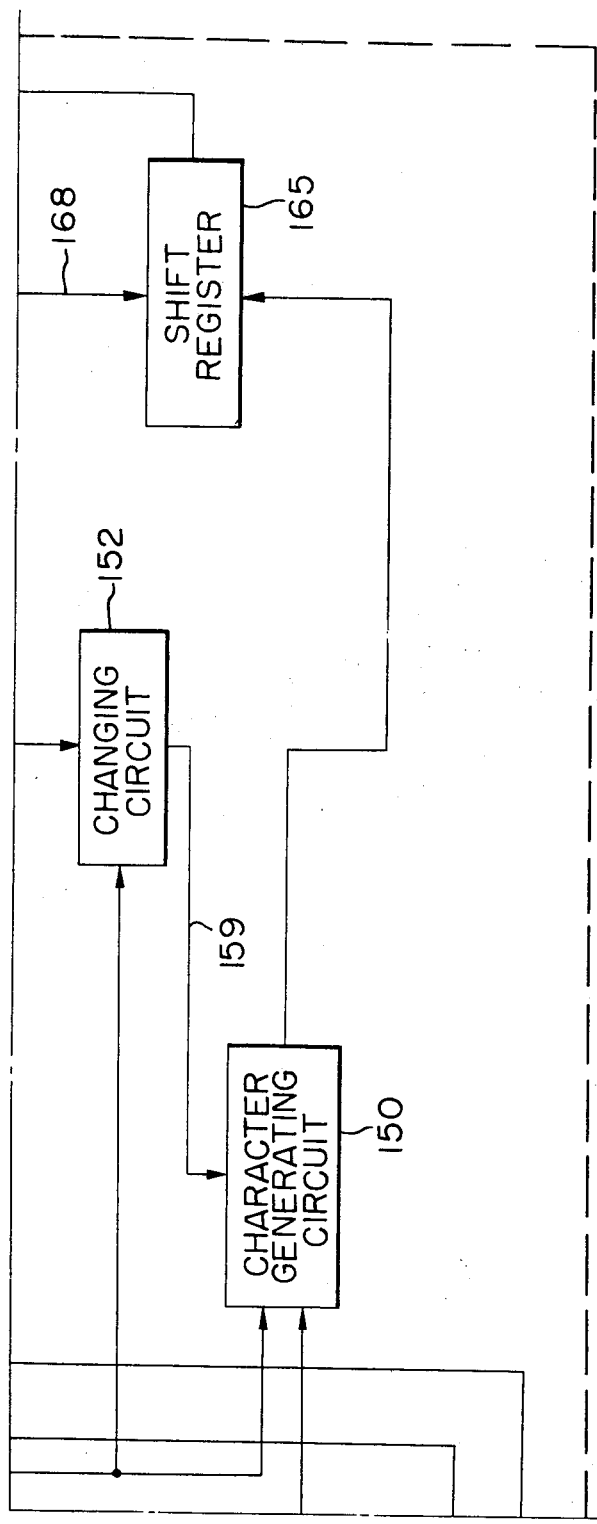
FIG. 1C"

FIG. 5
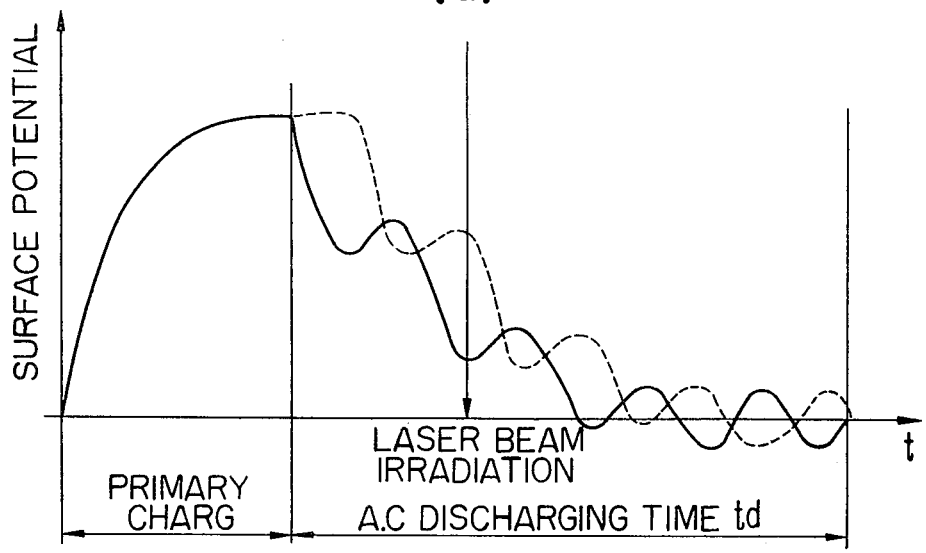
(a)
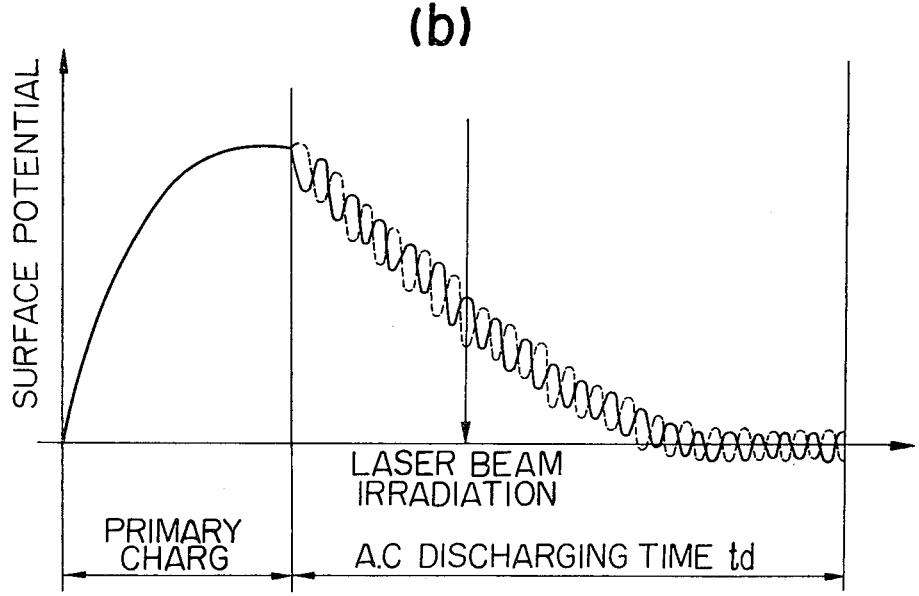
(b)

FIG. 7
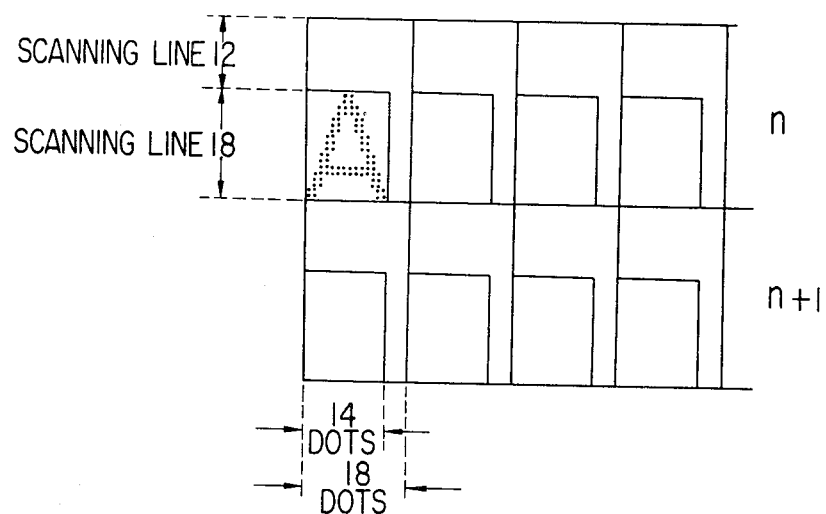
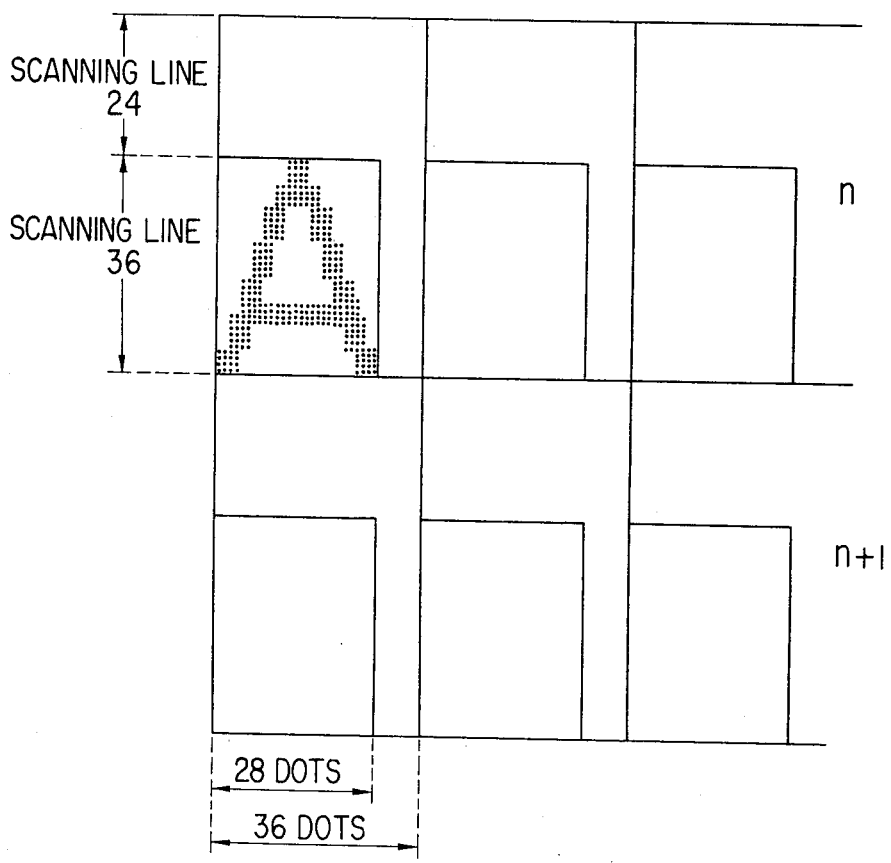

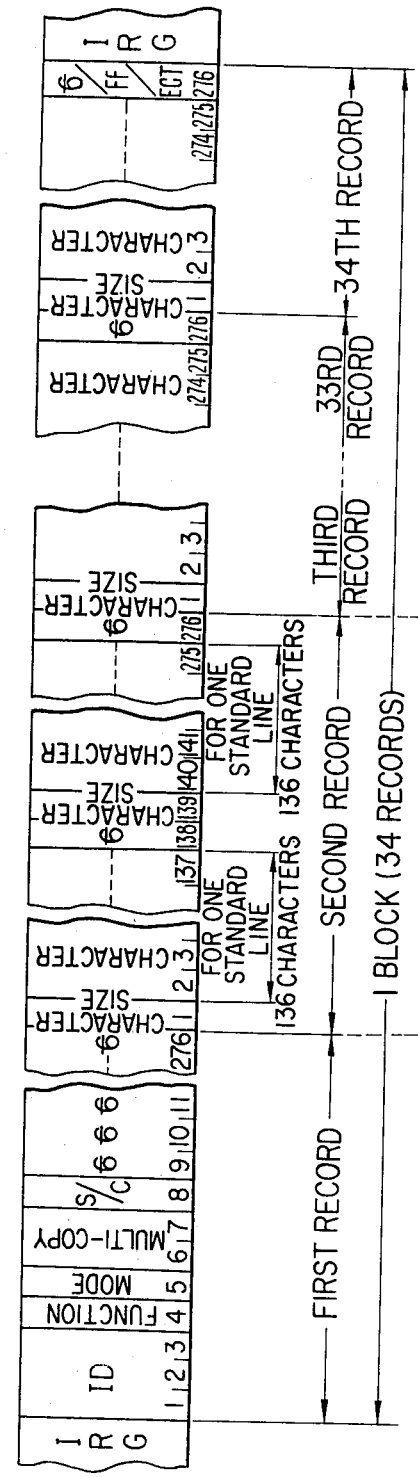
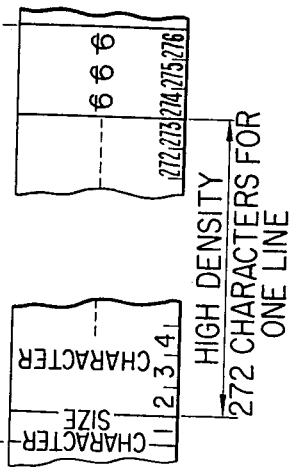
FIG. 8A
FIG. 8B

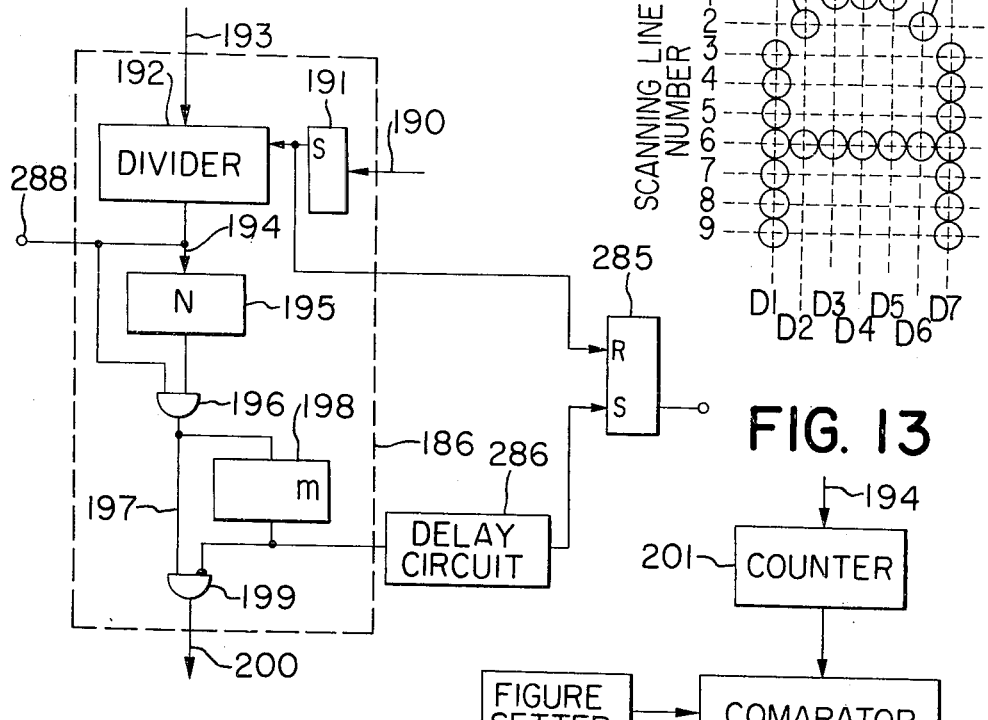
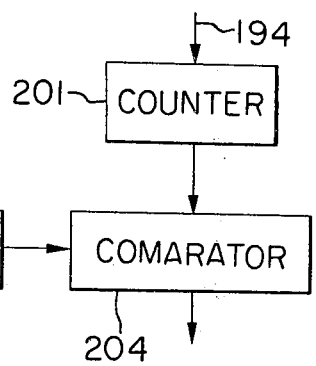
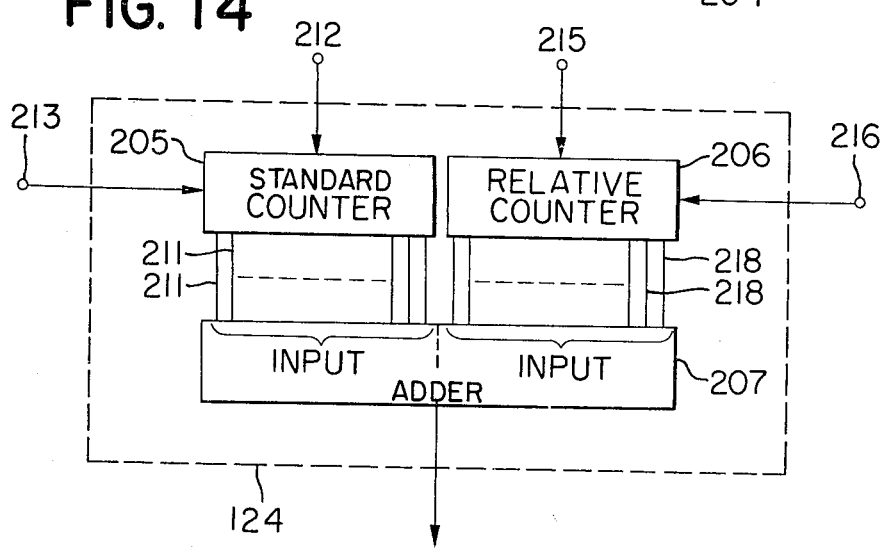

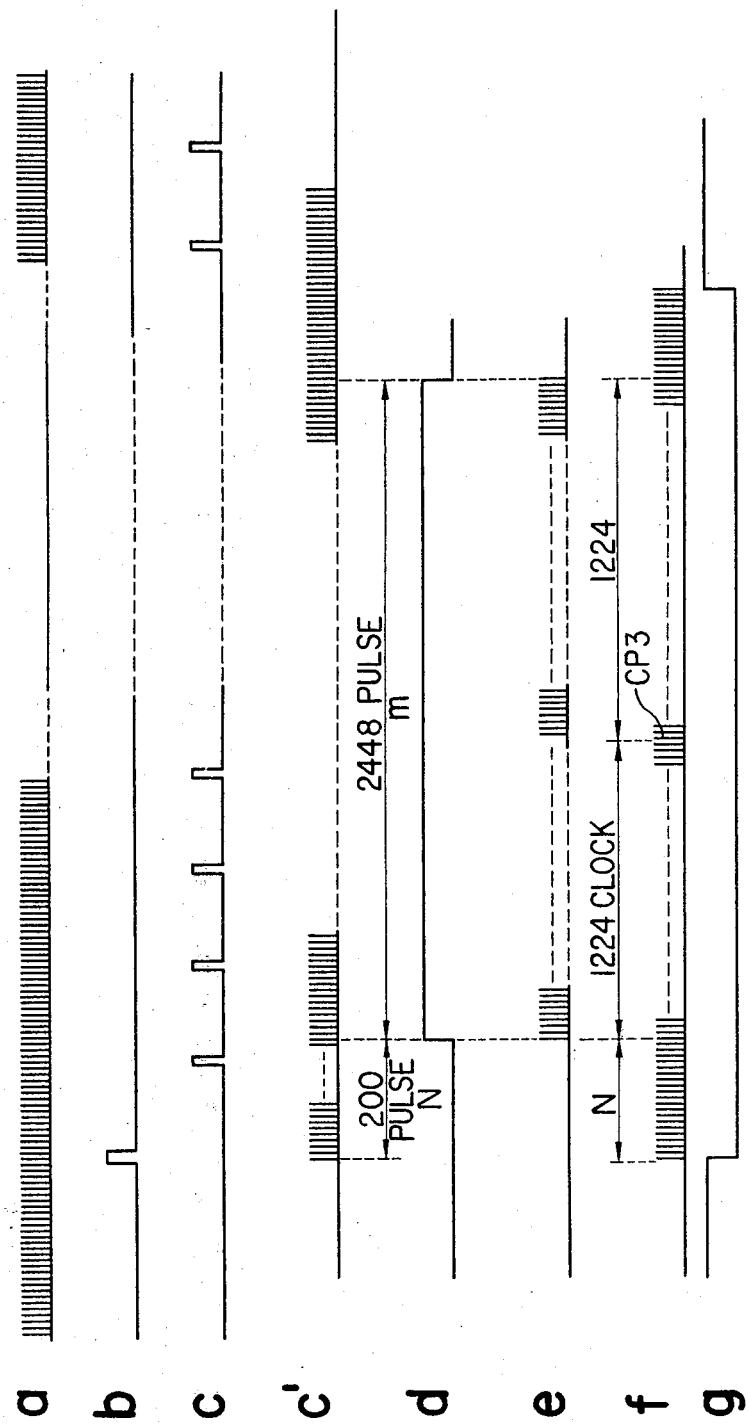

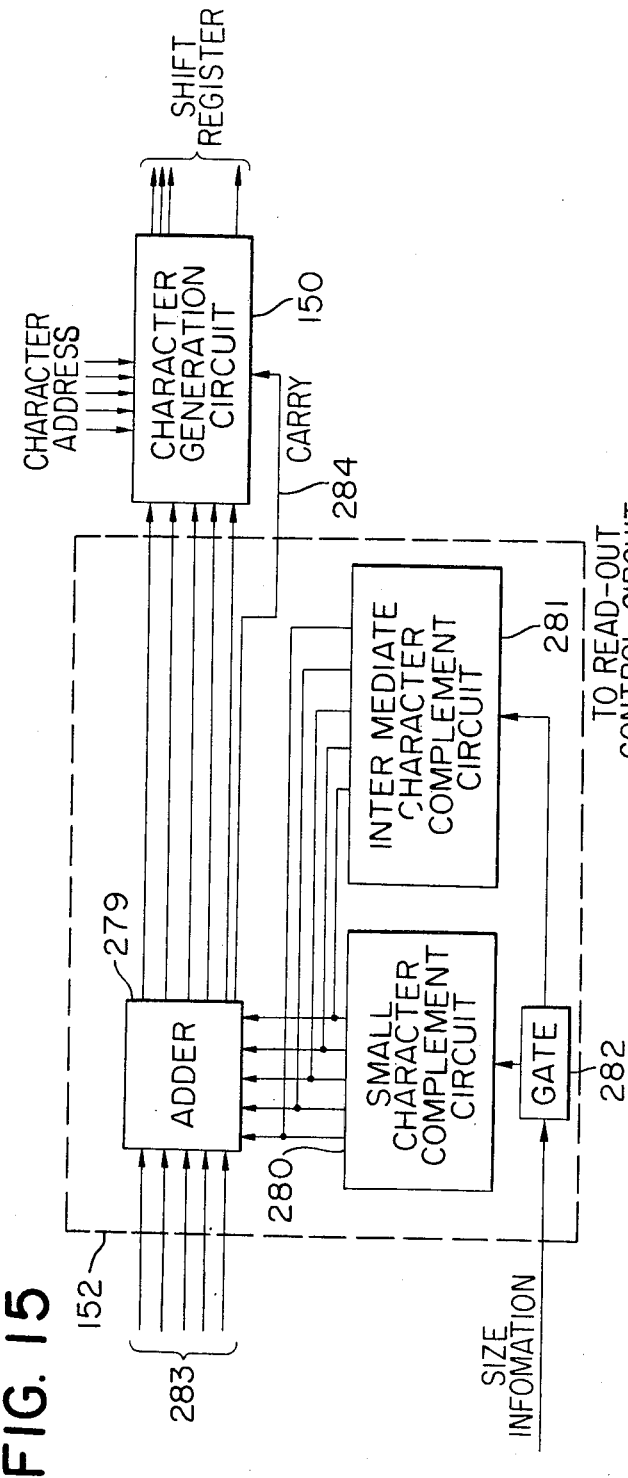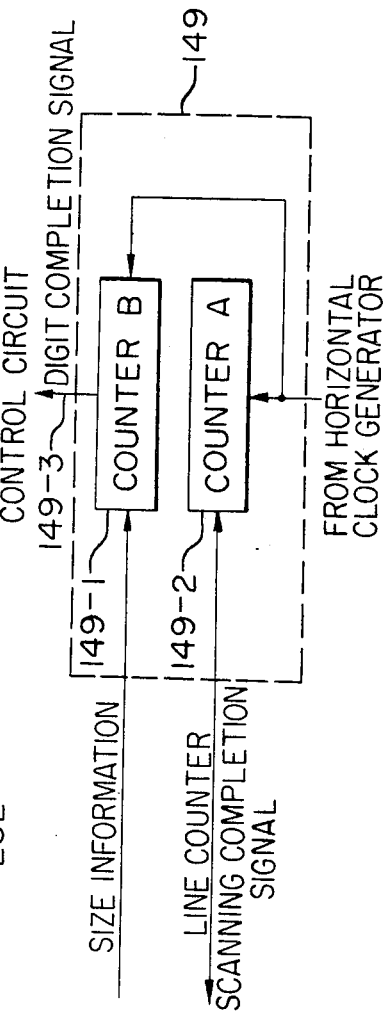
FIG. 15
FIG. 16

FIG. 19
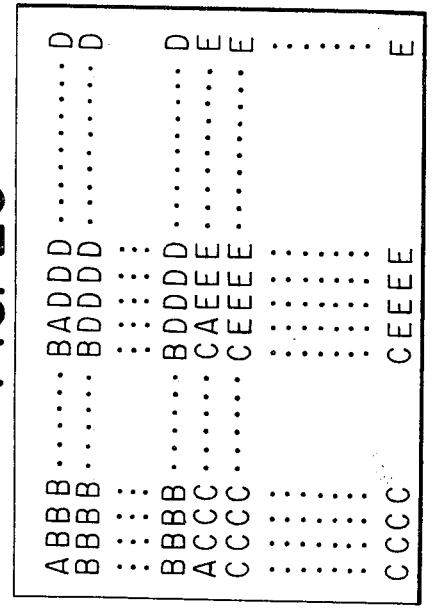
FIG. 20
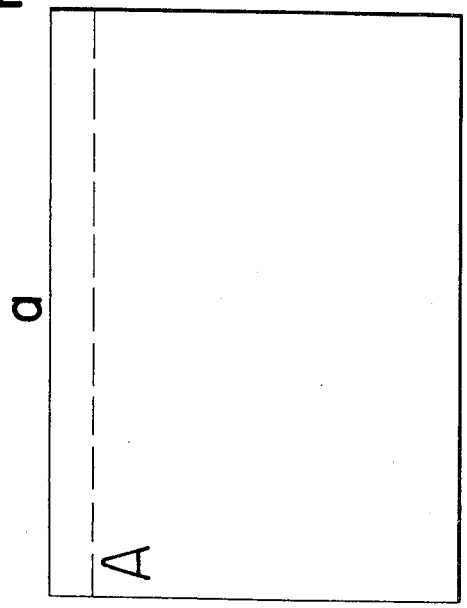
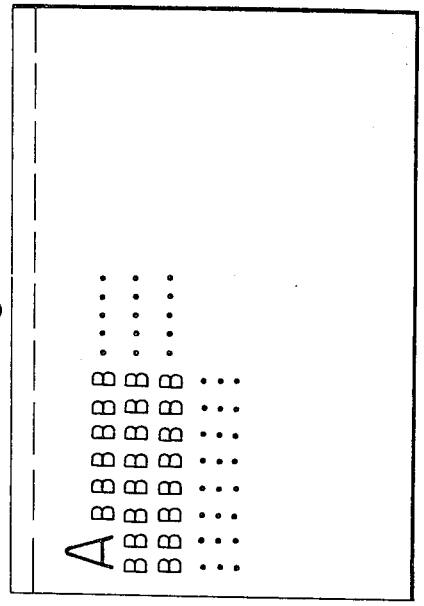

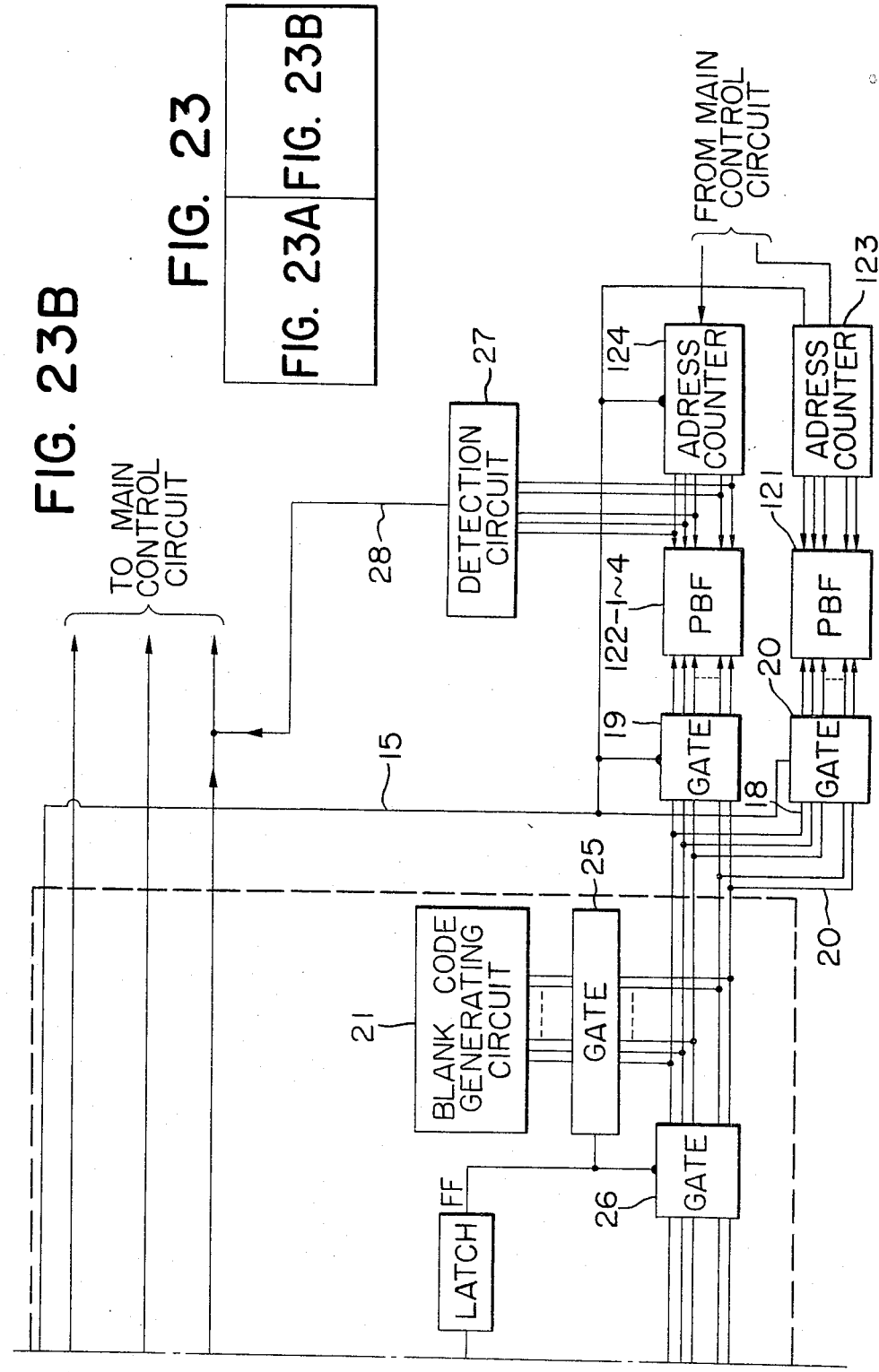

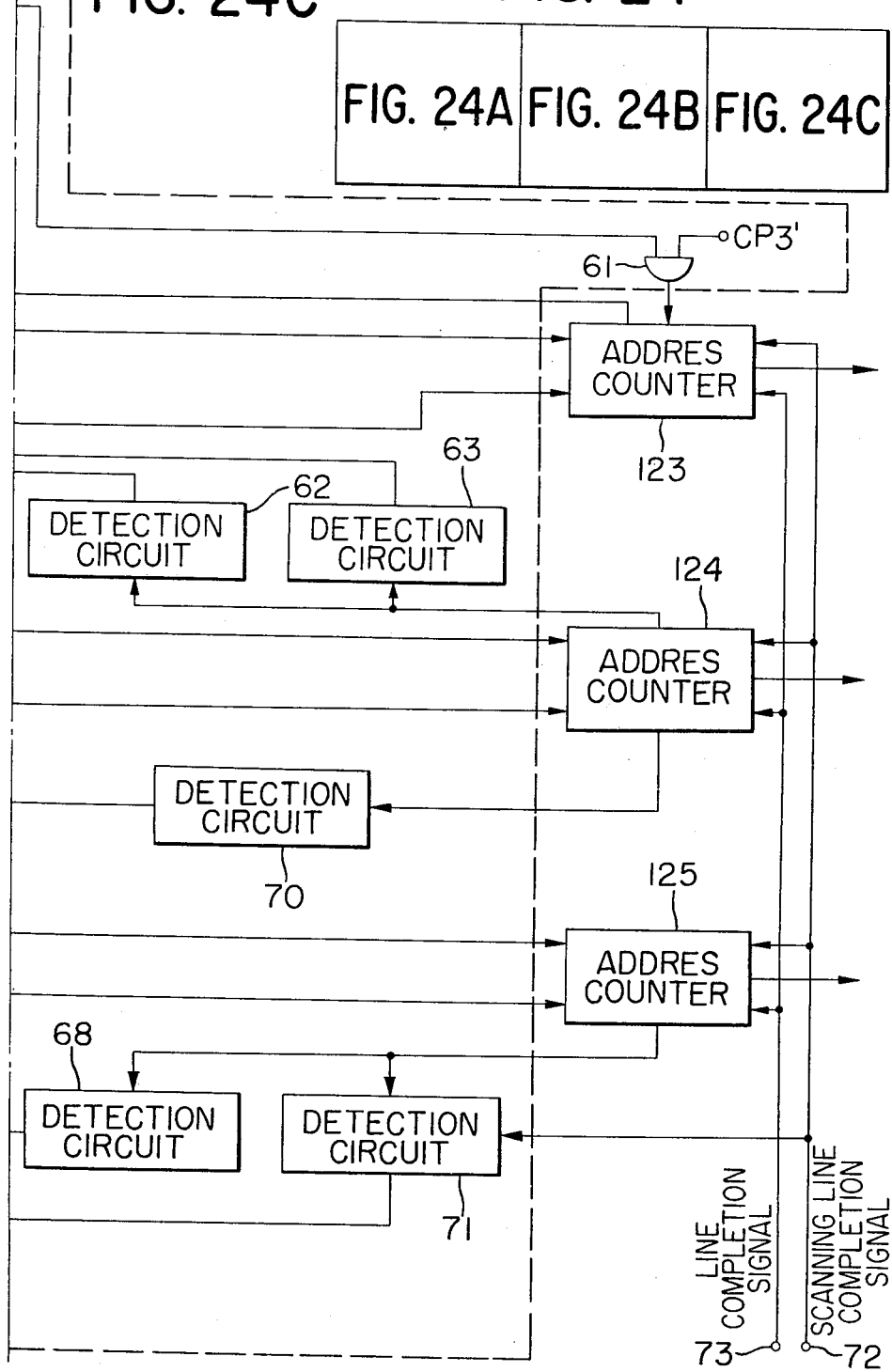

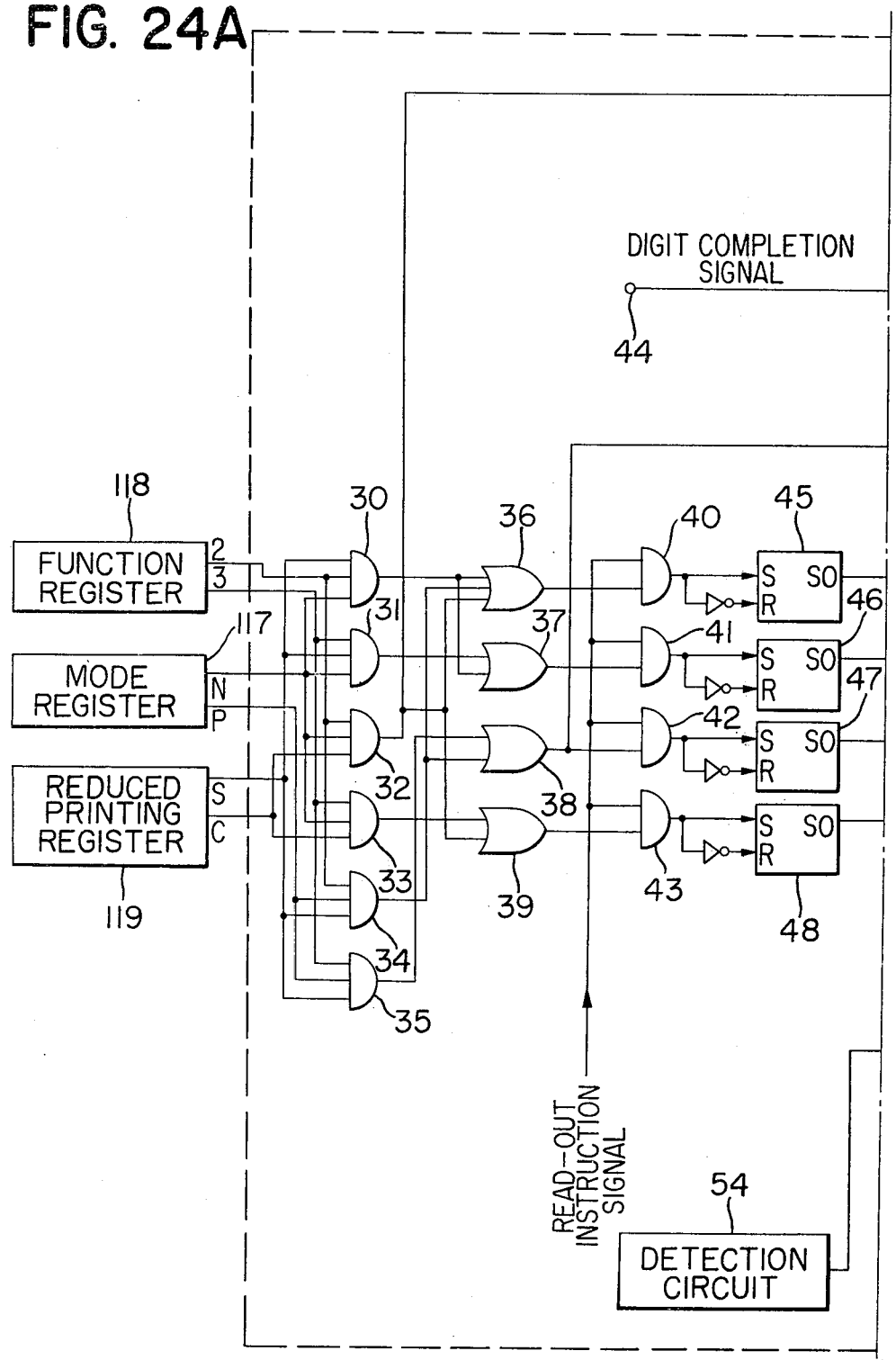

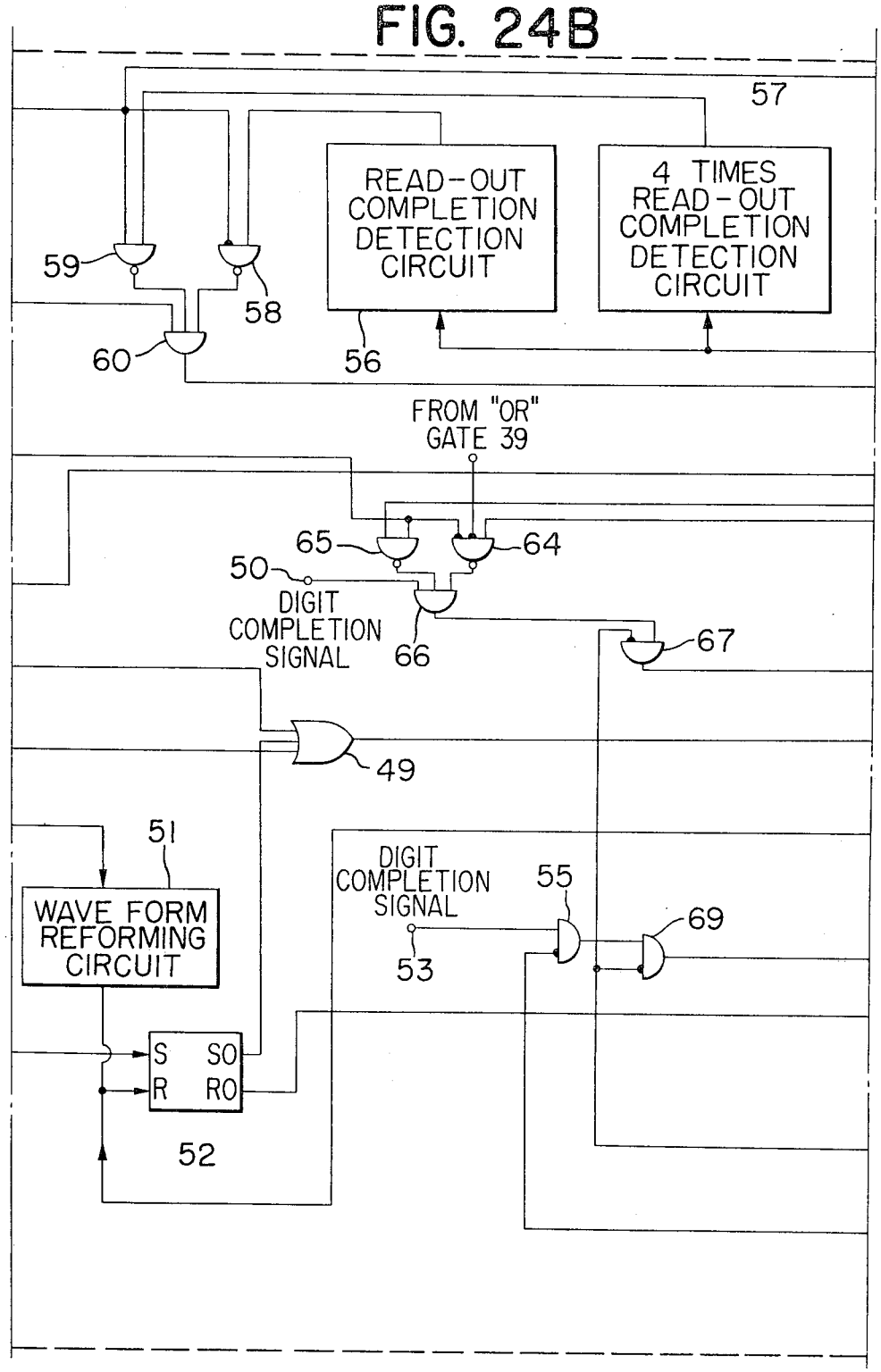

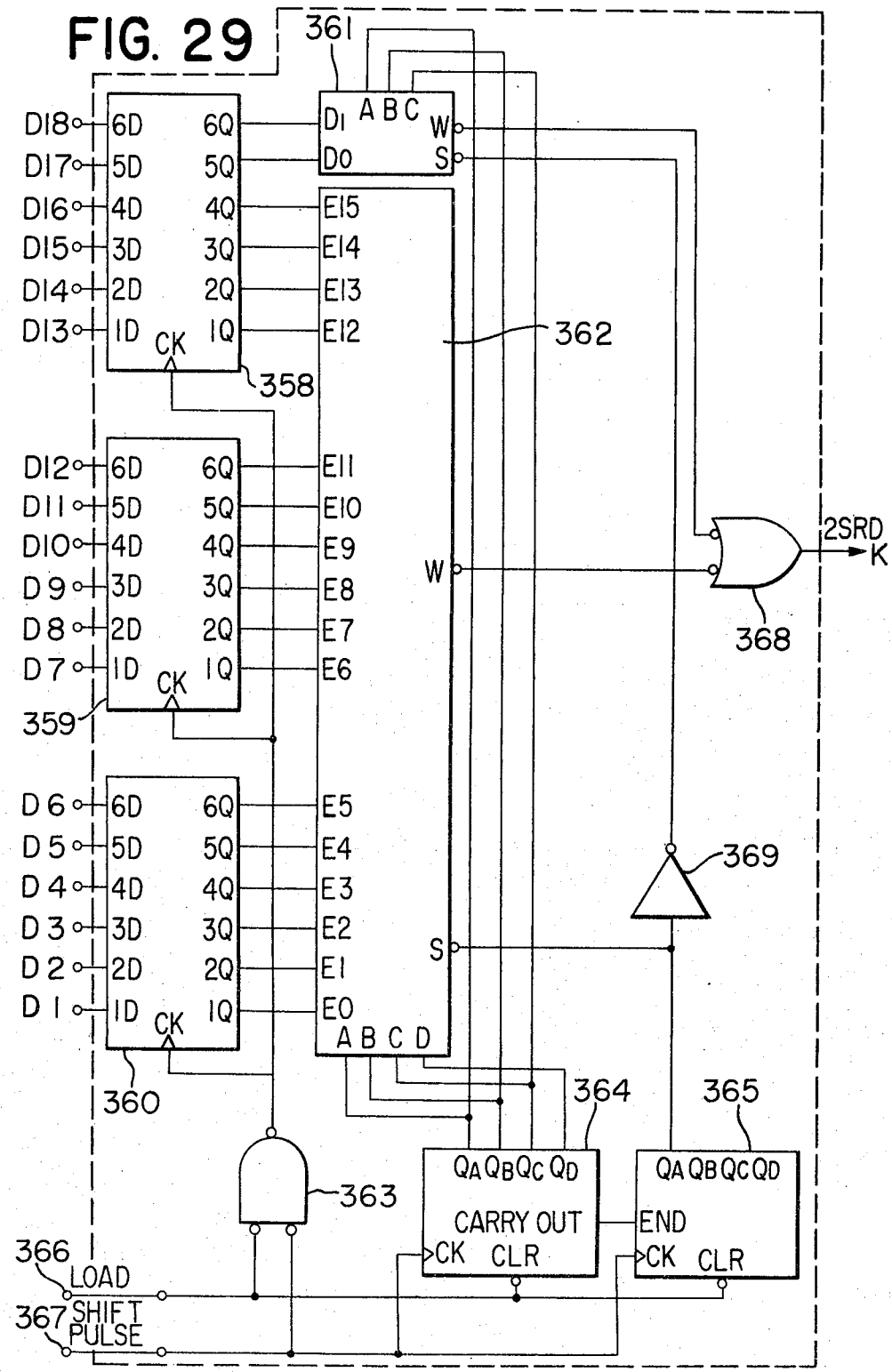

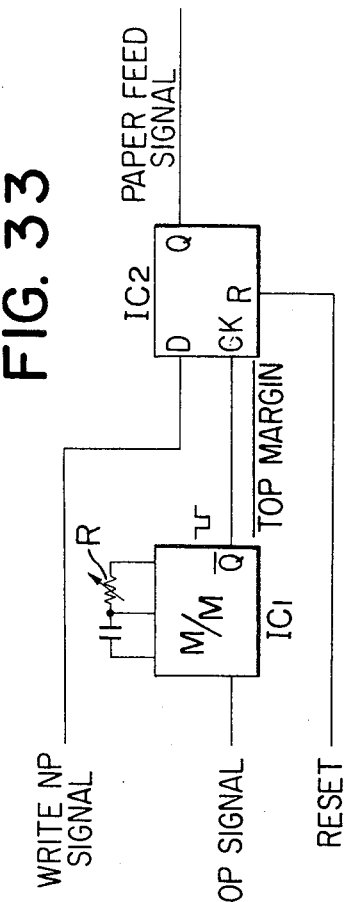
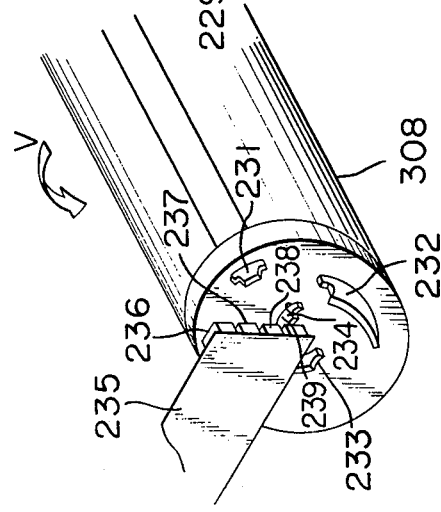
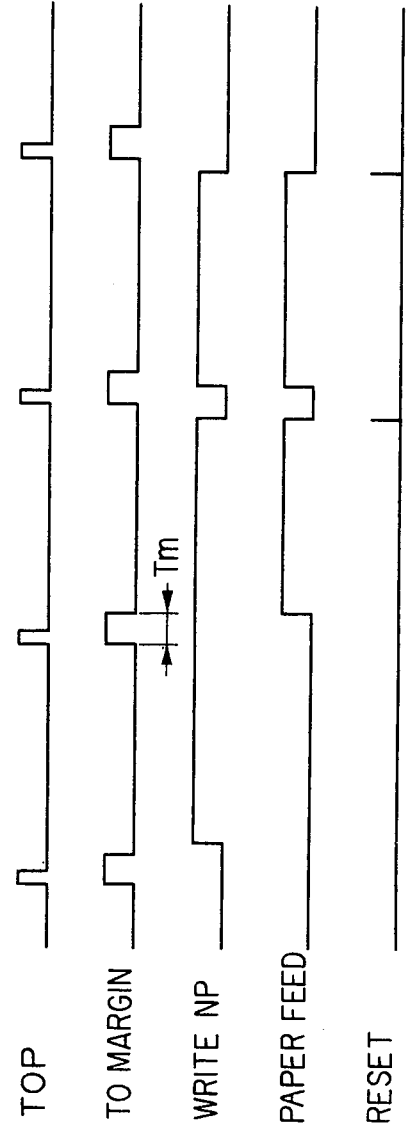

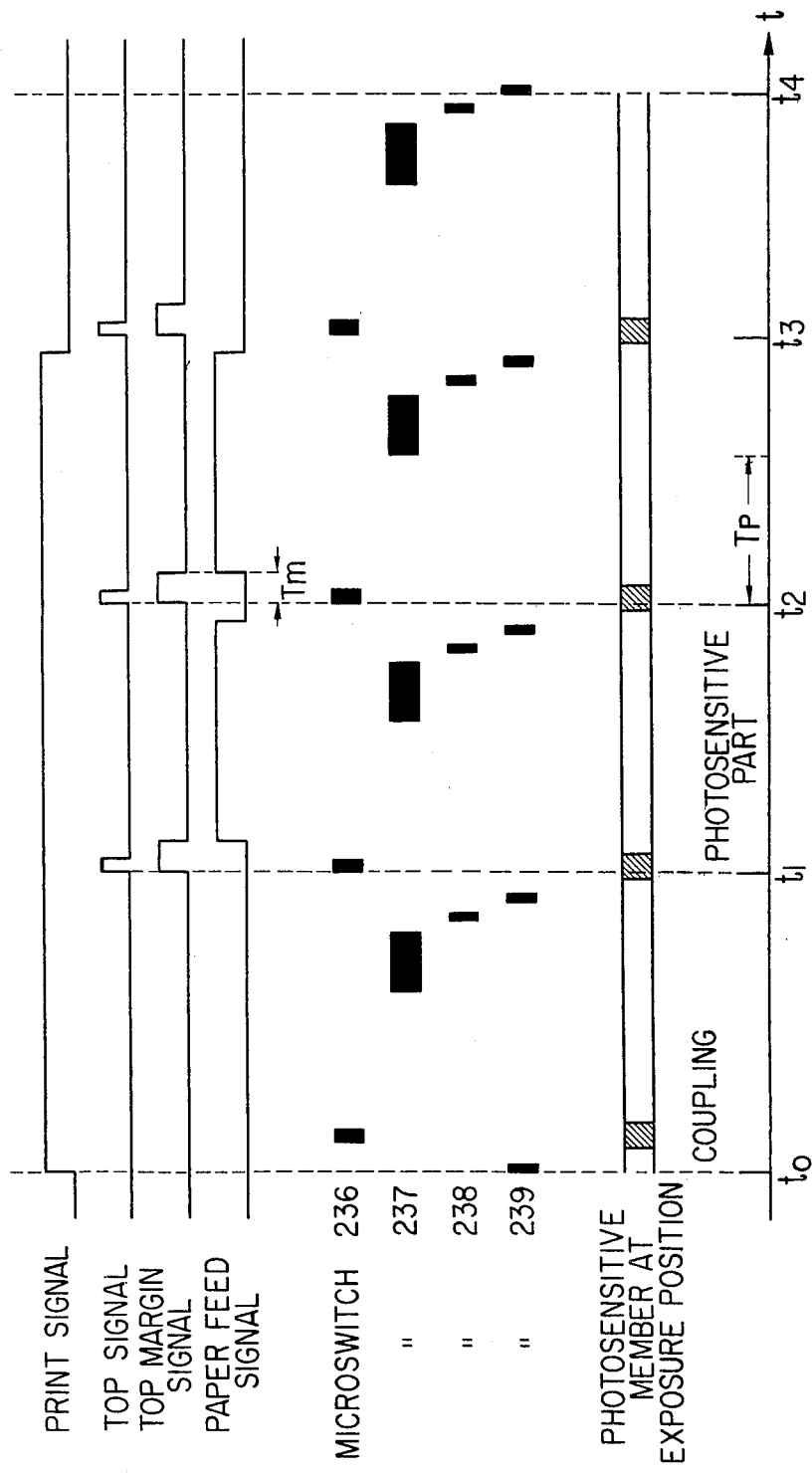

RECORDING POSITION ADJUSTER

This is a division of application Ser. No. 616,675 issued Nov. 27, 1977 filed Sept. 25, 1975, now U.S. Pat. No. 4,059,833.

BACKGROUND OF THE INVENTION

1. Field of the Invention

This invention relates to recording equipment with a recording position adjuster, which is capable of recording upon a recording medium by means of a scanning beam modulated by recording signals, particularly, recording equipment with a recording position adjuster which can detect and command recording positions by means of a beam detector that can detect specific positions of the beam.

2. Description of the Prior Art

The general means of recording computer output on a medium is by pressing type on a recording medium by hammers at the instant when a desired type on a base revolving at a certain speed is just in face with the recording paper. The hammering of types on the printing medium, is necessarily noisy.

A non-impact printer in which an externally modulated beam scans on a recording paper can provide a fine and high speed beam permitting high resolution and high recording speed, without the noise of hammering type. The means can be used in or in connection with computers as printing equipment for recording the output signals.

In this scanning system, however, several scanning lines on a recording medium make characters or signs, and, if the starting position of each scanning line is not exactly at a set position, the scanning lines are dislocated relative to one another in the scanning direction and the recorded characters or signs sometimes are not readable.

SUMMARY OF THE INVENTION

A major object of the invention is to provide a position adjuster which allows detection of an exact recording position, eliminating any dislocation between the scanning lines.

Another object of the invention is to provide a position adjuster which can detect an exact recording position with a very simple composition.

A further object of the invention is to provide a position adjuster which allows starting at a certain position apart from a preset starting position.

BRIEF DESCRIPTION OF THE DRAWINGS

The invention will be described in greater detail with reference to the accompanying drawings in which;

FIG. 5 (a) and 5 (b) is a set of graphs indicating the relationship between surface potential and ac discharge time.

FIGS. 8A and 8B illustrates the positioning of information on the recording medium.

FIG. 11 is a block diagram detailing the recording clock generator in FIG. 1.

FIGS. 12A, 12B, 12C, 12C', 12D, 12E, 12F, 12G is a set of wave forms illustrating the generation of recording clock pulses.

FIG. 13 is another embodiment of a counter 195 shown in the block diagram of FIG. 11.

FIG. 14 is a detailed block diagram of the address counter 124 in FIG. 1.

FIG. 15 is a detailed block diagram of a changing circuit for the embodiment of FIG. 1.

FIG. 16 is a detailed block diagram of a vertical clock circuit in FIG. 1.

FIGS. 19A, 19B, 19C and FIG. 20 illustrate a process of multiple printing.

FIG. 22 is a diagram of the relative positions FIGS. 1A through 1D.

FIGS. 23, 23A and 23B is a block diagram in detail of a write-in circuit.

FIGS. 24A, 24B and 24C is a block diagram in detail of a read-out circuit.

FIG. 29 is an another embodiment of shift register 165 in FIG. 10.

FIG. 30 is a view of photosensitive drum.

FIG. 32 shows the wave forms of signals generated by a rotating photosensitive drum.

FIG. 33 is a block diagram of a reshaping circuit for paper feeding signals.

FIGS. 34 and 35 are a set of wave forms of paper feeding signals and other signals.

A preferred embodiment of a recording equipment using a laser beam for scanning a recorded medium will be described in detail.

DESCRIPTION OF THE PREFERRED EMBODIMENT

Figure 1A:
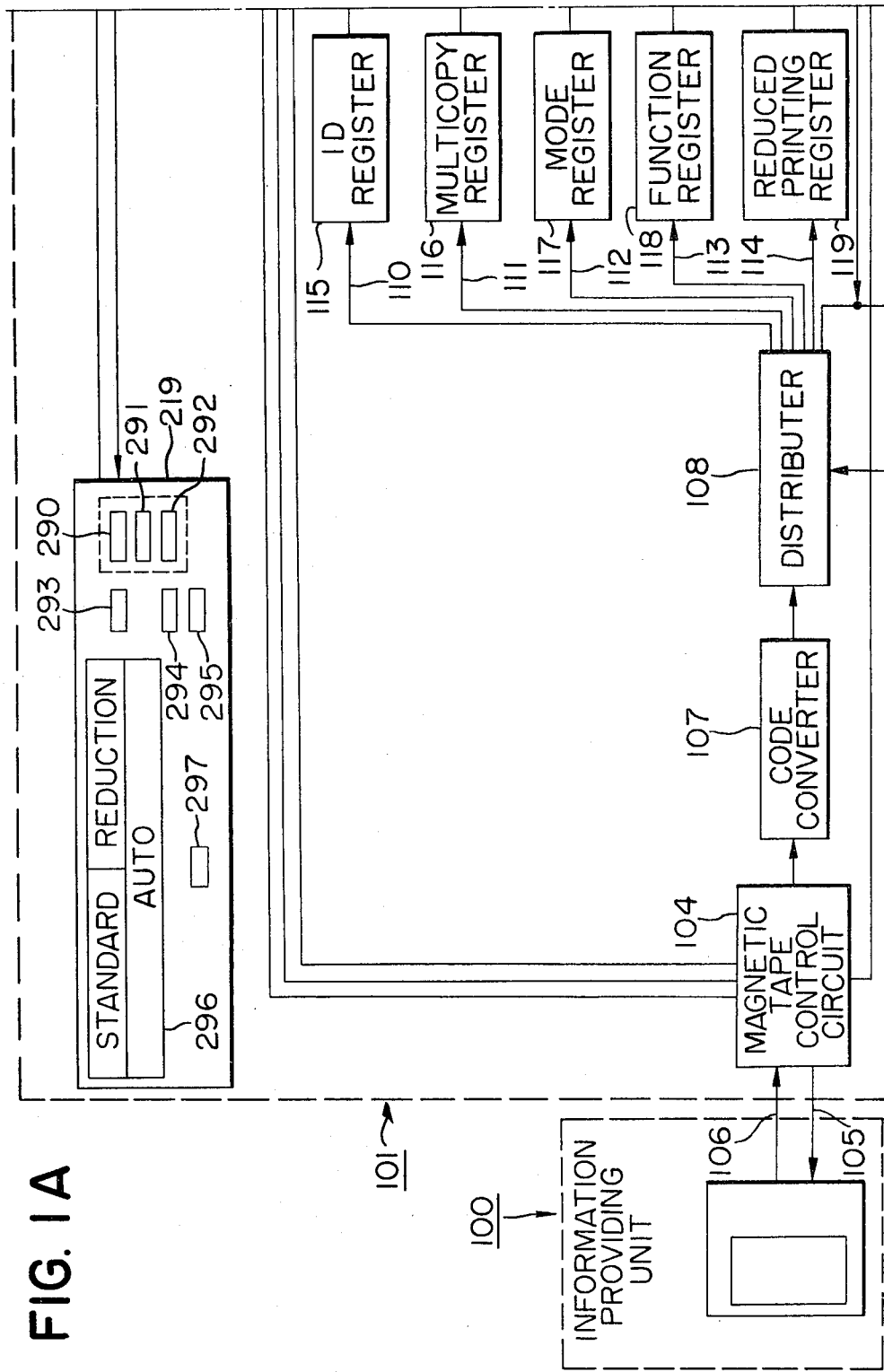
FIG. 1A, 1A', 1B, 1B', 1B", 1C, 1C', 1C", 1D is a block diagram of one embodiment of the invention.
Figure 1B:
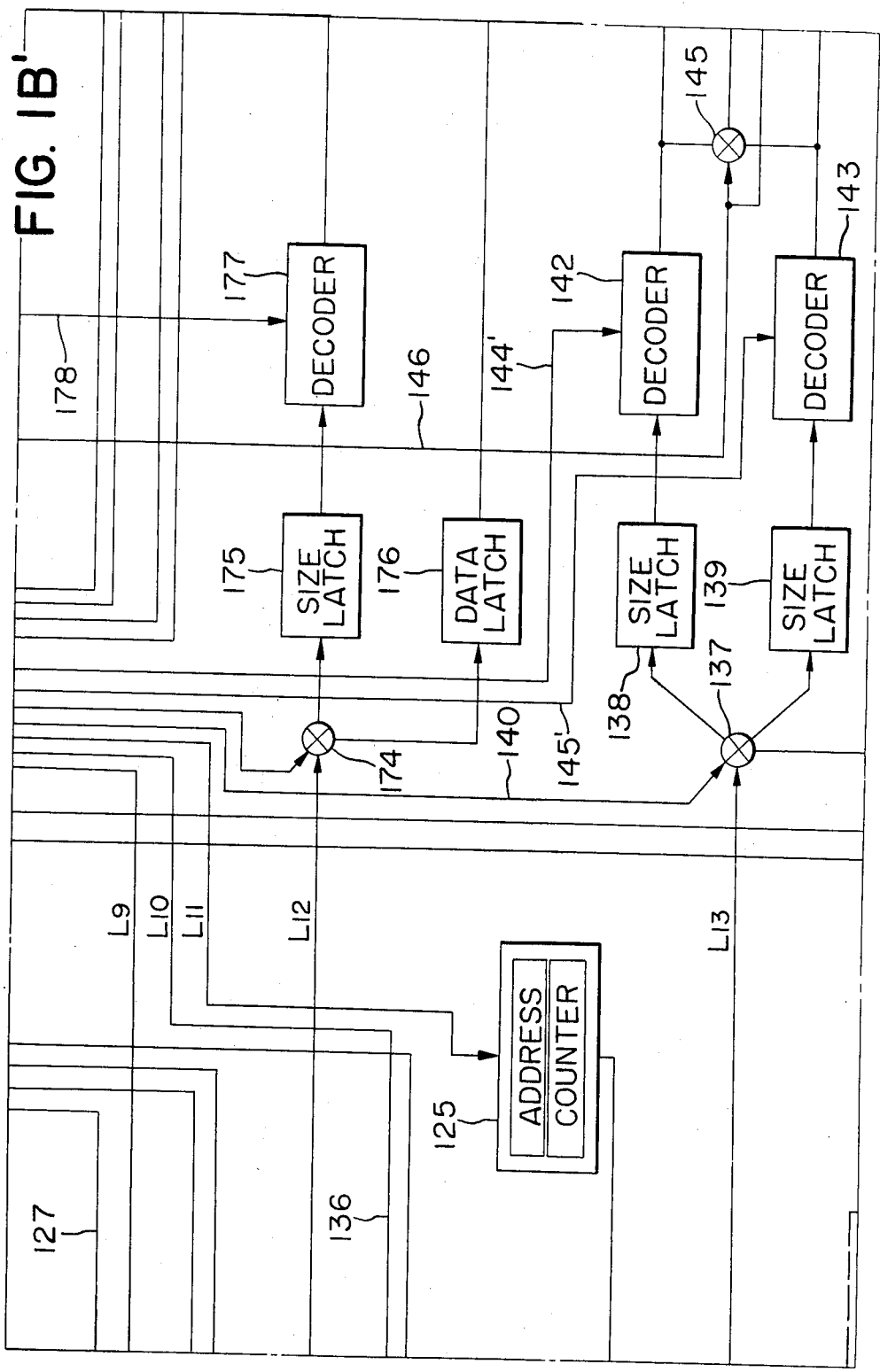
Figure 1D:
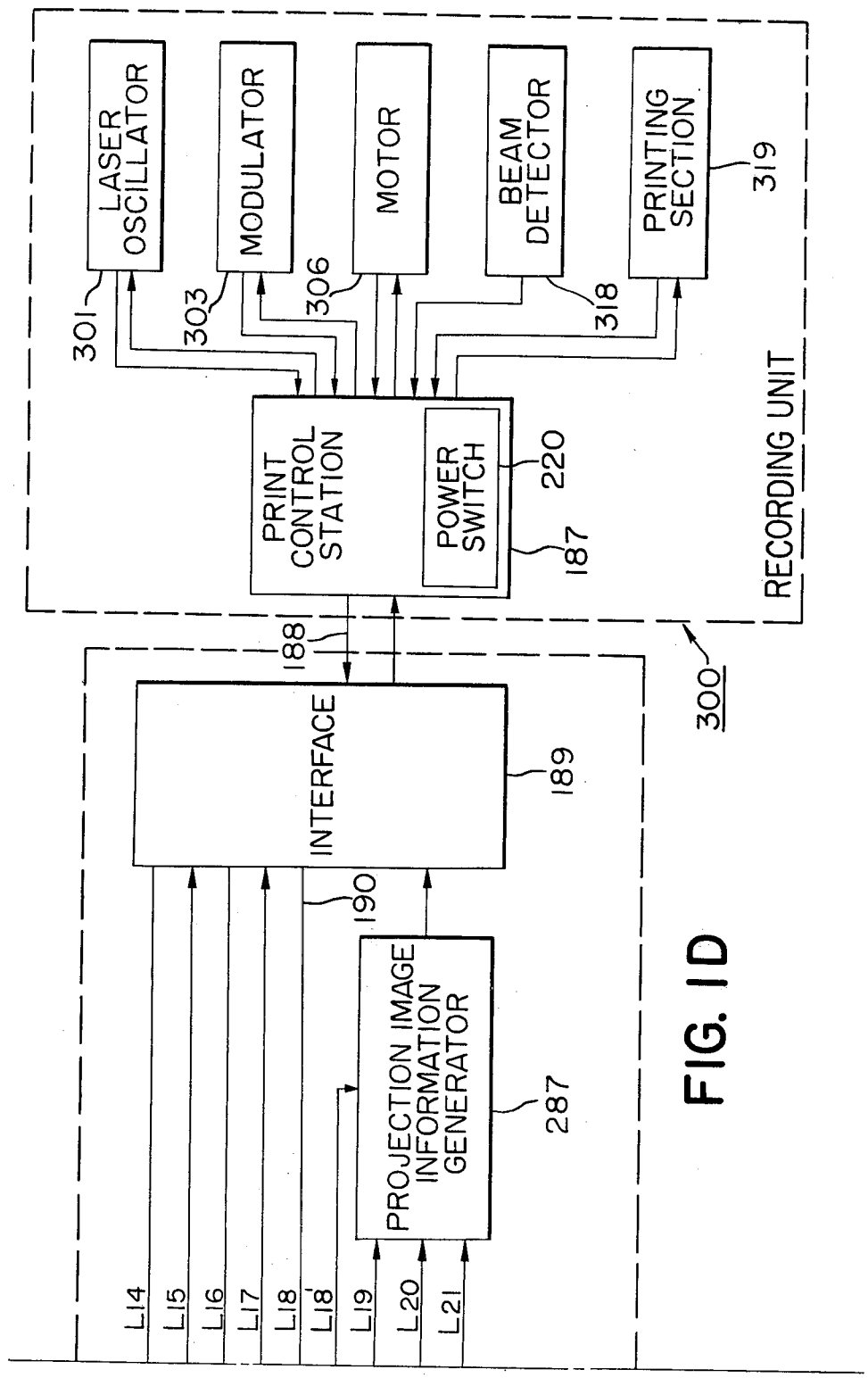
Figure 2:
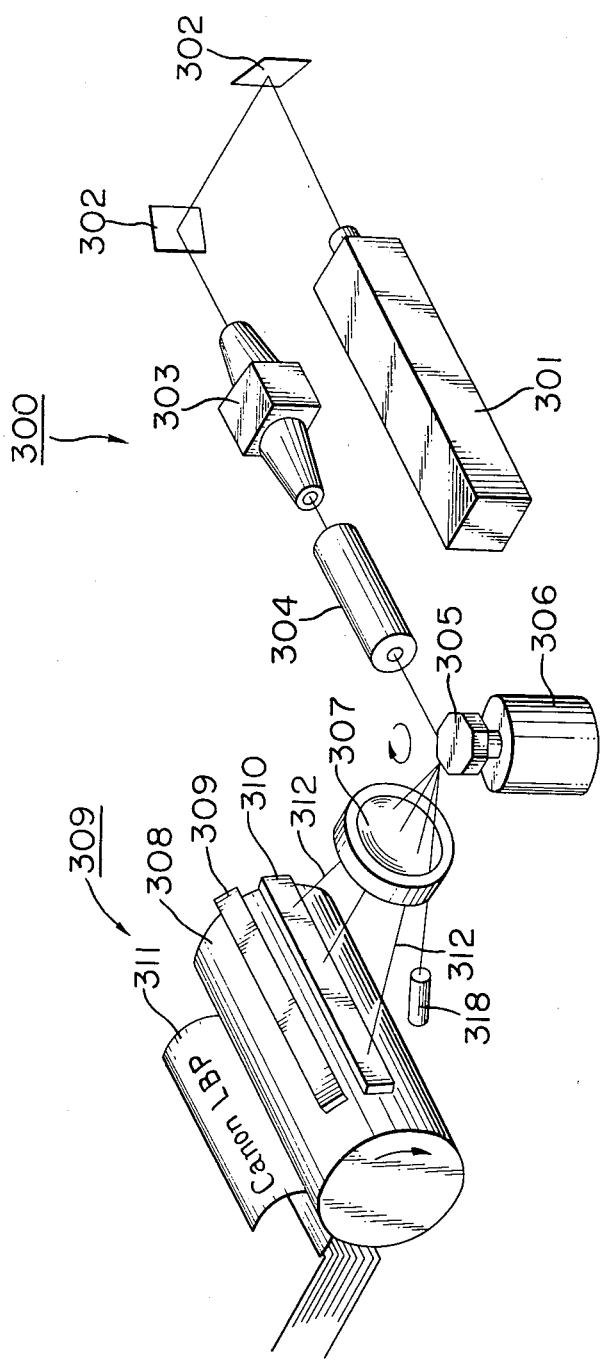
FIG. 2 is a perspective view of a recording unit of the embodiment shown in FIG. 1.
Figure 3:
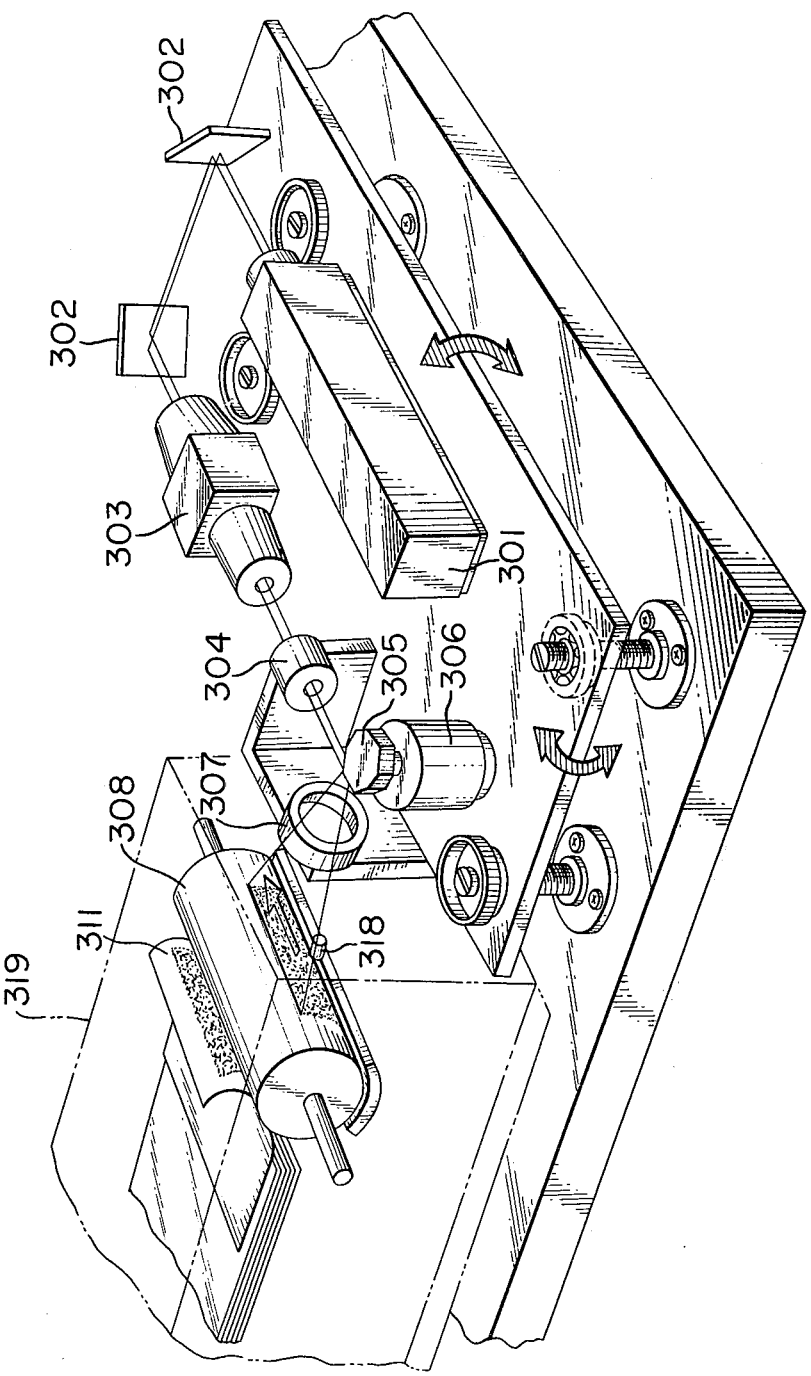
FIG. 3 is a further perspective view of the recording unit.

Referring now to FIG. 1, there is shown a block diagram of said recording equipment employing a laser beam which consists of an information providing unit 100 such as a magnetic tape recorder, control unit 101 which controls information from said information providing unit 100 in order to be recorded properly, and a recording unit 300 in which information from said control unit 101 is recorded on a recording medium. In this embodiment of the invention, recording unit 300 provides latent images on a photosensitive material scanned by a laser beam which is modulated by recorded information. The latent images are developed by means of a toner and the developed image is transferred to a printing paper. We will now describe in some detail such recording equipment. FIGS. 2 and 3 show a general perspective view of the recording equipment in which a laser beam emitted from laser oscillator 301 is led to an input of modulator 303 through reflectors 302. Reflectors 302 are provided only for saving space by changing the optical path and can be eliminated if desired.

In the modulator 303, an optoacoustic modulator utilizing optoacoustic effect or an optoelectric modulator utilizing optoelectric effect, both known, can be used.

The intensity of the laser beam is modulated in accordance with the intensity of the input signals.

If laser oscillator 301 is a semiconductor laser or a circuit-controllable gas laser, an internal modulation laser incorporating internally a modulator element, beam expander 304 can be used, omitting modulator 303.

The laser beam through modulator 303 is magnified in beam diameter by means of the beam expander 304, retaining parallelism of the light beam. This magnified laser beam is led to polygonal/mirror 305 which has a plurality of mirrors. Polygonal mirror 305 is mounted on a shaft supported with high precision bearings (for example, pneumatic bearings) and is driven by a constant speed motor 306 (for example, hysterisis synchronous motor, DC servomotor). Laser beam 312 scans horizontally by means of rotation of the polygonal mirror and is focused upon photosensitive drum 308 through an imaging lens 307 having f−0 characteristics. In common imaging lenses, the imaging portion r on an imaging plane at the projection angle 0 is $$r = f \cdot \tan 0 \quad (1)$$

where f=focal length of imaging lens
In this embodiment, the projection angle of the reflected laser beam 312 on the imaging lens 307 linearly changes with elapse of time. Accordingly, the moving speed of the imaged spot on the imaging plane of photosensitive drum 308 changes non-linearly i.e. is not at constant speed. With increase of projection angle, the moving speed increases. In other words, a laser beam which is periodically turned on for very short time intervals permits a series of spots to be formed upon photosensitive drum 308, in which the distances between the spots become wider near both extremities of the drum. In order to avoid this result, imaging lens 307 is tailored so as to have the property:

$$r = f \cdot 0 \quad (2)$$

Such a lens having $f-\theta$ characteristics is called an imaging lens. And also, if parallel light is focused as a spot through an imaging lens, the minimum diameter of the spot is $$d_{min} = 2.44 \, \lambda \, f/A \quad (3)$$

where
 f: focal distance of imaging lens
 λ: wave length of light used
 A: diameter of imaging lens A sharper spot dmin can be obtained as A becomes larger, if f and λ are constant. The beam expander 304 mentioned above is used for this effect. Beam expander 304, therefore, can be omitted as long as an obtained diameter of a laser oscillator is as small as required. Beam detector 318 consists of small slits and optoelectric sensors with high response time (for example, a PIN diode). Beam detector 318 detects the position of scanning laser beam 312, and initiates a time interval preceding the start of input signals to modulator 303 to impart the desired information on the photosensitive drum. By this means, lack of precision in the mirrors of the polygonal mirror and non-synchronization of horizontal signals due to non-uniform rotation can be reduced considerably and high quality images can be obtained, and the requirement of precision in both polygonal mirror 305 and driving motor 306 is somewhat reduced. The above-mentioned matters result in fewer technical difficulties and reduce manufacturing costs.

As described, deflected and modulated laser beam 312 is irradiated on photosensitive drum 308 and latent images are developed by an electrophotographic process, fixed, and printed on printing mediums 311 of ordinary paper to thereby produce hard copies.

Figure 4:
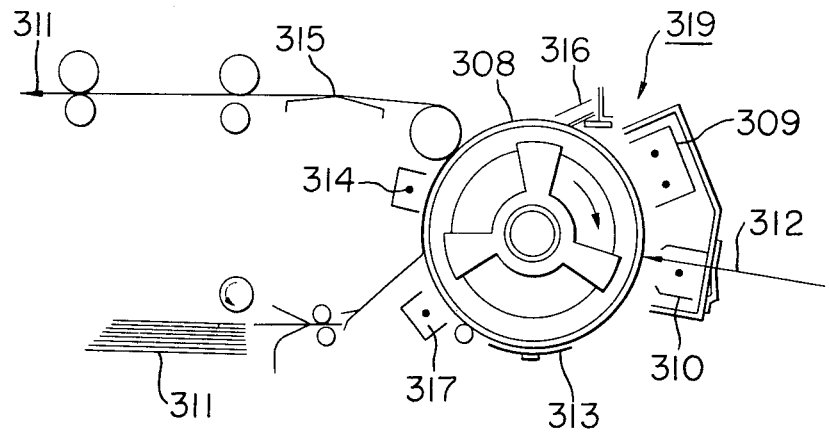
FIG. 4 is a side elevational view of a principal recording mechanism in the recording unit.

Printing unit 319 will now be described by referring to FIG. 4. An example of electrophotographic processes which can be applicable to the embodiment is the Japanese Patent Publication 23910/67 corresponding to U.S. Pat. No. 3,666,363. A surface of a photosensitive drum 308 consisting of a photoconductive layer and an insulating layer is first charged with positive or negative charge, which traps in the photoconductive layer a charge of the opposite polarity. Then said laser beam 312 irradiates the charged insulated layer and ac corona discharge 310 is simultaneously discharged. This allows patterns to form due to potential differences resulting from patterns of light and dark produced by laser beam 312, and then the insulated laser is uniformly exposed in order to obtain a high contrast electrostatic image. The electrostatic image is visualized by means of a major developing agent of charged color particles in developing unit 313, and the visualized image is transferred to printing material 311 by using an internal or external electric field and is thermally fixed by fixing means 315 such as ultrared ray lamps or heat plates. The electrophotographic image is thereby printed on the copy medium. After printing, cleaning unit 316 cleans the insulated layer to remove the remaining charged particle so that photosensitive drum 308 can be used repetitively.

The corona discharging unit for printing is numbered 314 and the post corona discharger is numbered 317 and same members represent the same units in all figures.

Next we describe, referring to FIG. 5, in this embodiment of the invention the phenomena which occur in photosensitive agents when the surface charge on an insulating surface is reduced by corona discharge and the surface is irradiated by a laser beam after uniform charging on the surface of the insulated layer in the photosensitive body.

FIG. 5 shows the change of surface potential of a photosensitive body.

In FIG. 5 (a), the frequency of ac corona discharge is considerably low. In this case, the surface potential of the insulating surface during ac corona discharge, depending upon the phase of the ac voltage, becomes between the full line and the dotted line. The period of irradiation by the laser beam is locally very short, for example, 150 nanoseconds in this embodiment. This causes non-uniform static potential images after full exposure by light on account of the non-uniform potential on the insulated surface even though irradiation by laser is at a constant quantity. The developed latent images are, therefore, not uniform, synchronizing with ac frequency. In copying machines, this phenomenon is not significant because the effect of the phase after luminous exposure on the total area of ac discharge is made even.

Figure 6:
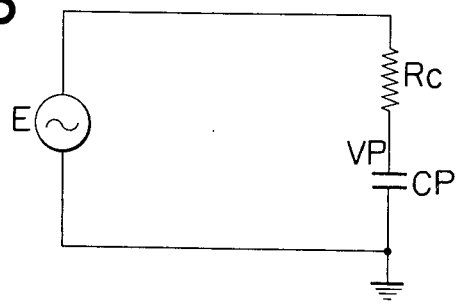
FIG. 6 is an equivalent circuit of the recording unit.

To eliminate this non-uniformity, higher frequency ac discharging results in decreasing the amplitude of variation synchronized with ac frequency of the surface potential of the insulated layer (FIG. 5, b). Accordingly, the potential difference on the insulated surface irradiated by the laser beam is small and non-uniformity of latent images is practically of little importance. The equivalent circuit makes this clear, as shown in FIG. 6, in which E: voltage applied to poles of ac corona discharger
Rc: resistance between discharging poles and the photosensitive body upon corona discharging
Cp: capacity of photosensitive body, assuming that the body is only capacitive load.

The surface potential on the insulated layer during ac discharging can be given $$V_p = \frac{E_o}{\sqrt{(WC_pR_c)^2 + 1}} [\sin(wt + \theta + \phi) - \sin(\theta + \phi) \cdot I - \frac{t}{C_pR_c} + V_{ol} - \frac{t}{C_pR_c} \quad (4)$$

$$\phi = \tan^{-1}\left(\frac{1}{wC_pR_c}\right)$$

where
  Vo = surface potential by primary charging and just before ac discharging
  E = Eo cos (wt+0): voltage applied to poles of ac corona discharge The discharging time can be represented by the second term of (4) and its time constant is $C_pR_c$.

The amplitude of variation caused from the frequency of ac corona discharge can be given in the first term as $$E_o/\sqrt{(WC_pR_c^2 + 1)}$$

In FIG. 6, the ac discharging time td is $$TD = L/V \quad (5)$$

V: circumferential speed of the drum
l: length of discharging area.

The capacity represented by Cp in an equivalent circuit of FIG. 6 is proportional to area on a photosensitive body passing through the discharging area in unity time.

$$CP = A \cdot V \quad (6)$$

A: constant

If perfectly discharged under $CP = CP_1$, $RC = RC_1$, and $V = V_1$, the time constant of discharging in equation (4) is $$\tau_1 = CP_1 \cdot RC_1 \quad (7)$$

At the same instant, the amplitude of variation caused from the ac discharging frequency Ao is $$A_o = \frac{E_o}{\sqrt{(W_0 C_{p1} R_{c1})^2 + 1}} \quad (8)$$

Assuming that the amplitude Ao is enough to cause the non-uniformity, and making the discharging frequency $W = W_1$ and $W_1 > W_0$, then the amplitude $A_1$ can be given as:

$$A_1 = \frac{E_0}{\sqrt{(W_1 C_{p1} R_{c1})^2 + 1}} < \frac{E_0}{\sqrt{(W_0 C_{p1} R_{c1})^2 + 1}} = A_0 \quad (9)$$

and the magnitude is small enough not to make significant non-uniformity. As described, non-uniformity of darkness can be removed by changing the frequency of ac corona discharge without changing the discharging period.

Now, consider the circumferential speed of the drum. Giving $V = \alpha V_1 = V_2$, we get from equation (6)

$$CP_2 = \alpha CP_1$$

The discharging time is $$td_2 = \frac{l}{V_2} = \frac{l}{\alpha V_1} = \frac{td_1}{\alpha} \quad (11)$$

$$td_1 = \frac{l}{v_1}$$

Accordingly, the discharging time constant should be $$\tau_2 = C_{p2} \cdot R_{c2} = \frac{\tau_1}{\alpha} = \frac{C_{p1} \cdot R_{c1}}{\alpha} \quad (12)$$

As $C_{p2} = \alpha C_{p1}$, then $$RC_2 = RC_1/\alpha^2 \quad (13)$$

A practical solution to change the Rc is to change distance between poli the wires of discharger and the photosensitive body. Magnitude of the varying amplitude caused from the ac corona discharge $A_2$ is $$A_2 = \frac{E_0}{\sqrt{(W_2 C_{p2} R_{c2})^2 + 1}} \quad (14)$$

$W_2$ which makes $A_2$ equal to $A_1$ is
$W_2 C_{p2} R_{c2} = W_1 C_{p1} R_{c1}$ therefore, $$W_2 = W_1 \cdot \frac{C_{p1} \cdot R_{c1}}{C_{p2} \cdot R_{c2}} = aW_1 \tag{15}$$

To make uniform darkness of latent images, higher frequency of ac corona discharge than a certain value which is proportional to the circumferential speed of the drum is required. In this embodiment of the invention, the circumferential speed V is 30 cm/sec, and the area of discharging is 3 cm×30 cm and the capacity of the photosensitive plate is 5pF/cm$^2$, and the current of the ac discharging is 75 μamps, and the voltage is 7 KV, and the frequency is 1 KHz, and the electrostatic contrast is about 500 V. The liquid development and inversion process are used. By these experiments, non-uniformity of latent images could be removed off under the frequency f $$F \geq V/0.03 \text{ HZ} \tag{16}$$

where V: circumferential speed of drum (cm/sec)
In other words, pitch equivalent to the drum frequency of ac corona discharge is 0.3 mm. Therefore, the effect of equation (16) generally is given $$F \geq V/P \tag{17}$$

where p is a constant depending on capacity of a photosensitive body, length of discharging area, and conditions of development, and p was 0.03 cm, when V was measured in cm, in the embodiment.

Another embodiment of electrophotographic processing is disclosed in U.S. Pat. No. 3,666,363. A photosensitive plate mainly consists of a conductive substrate, a photoconductive layer, and an insulating layer. The surface of the insulating layer is first uniformly charged by a primary discharge of positive or negative polarity and an opposite charge from the previous charge is trapped on the surface of the photoconductive layer and the insulated layer or in the photoconductive layer, and the charge on the insulated surface is cancelled by ac corona discharge, and then the laser beam in the form of information signals is irradiated and an electrostatic image of darkness of the laser is formed on the surface of the insulated layer and a process after developing electrostatic images is same as the first embodiment.

Photosensitive bodies and laser oscillators in the first and the second embodiment are as follows Group A (a) laser oscillator;
He-Ne gas laser, wave length 632.8 mμm (b) photosensitive body; 10 gr of vinyl chloride is added to cadmium sulfide activated by copper and also a small quantity of thinners is added. This photosensitive mixture is sprayed to about 70 μm thickness on a thin aluminum plate of about 100 μm thickness and a mylar film of 25 μm thickness is tightly bonded on a photosensitive face with adhesive agents. This is a photosensitive plate, which is wound on an aluminum drum. This photosensitive body requires a positive charge as the first charge.

Group B (a) laser oscillator
He-Cd laser, wave length 441.6 mμm (b) photosensitive body
On an aluminum substrate, a Te film of about 1 μm thickness is evaporated and a film of Se including Te of 15% of about 90 μm thickness is evaporated. On the last surface, a transparent plastic of about 30 μm thickness is painted and hardened.

This photosensitive body requires a negative charge as the first charge.

Other lasers existing now and in future can be applied in the process of developing first and second latent images. The photosensitivity of the photosensitive body should be fitted to the wave length of lasers.

As a laser,
Ar gas laser,
Kv gas laser
Ar+Kv gas laser
(visible) semiconductor laser
dye laser
ultrared ray laser (YAG laser,
semiconductor laser) multiplied by
non-linear crystals can be used.

Figure 7:
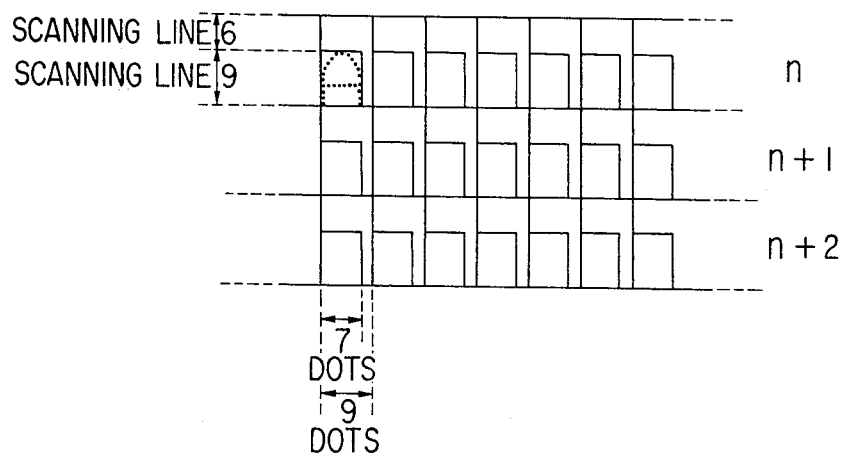
FIGS. 7A, 7B and 7C is a set of drawings illustrating the recording of characters on the recording medium.

Photosensitive drum 308 is driven under a certain constant speed in the indicated direction and beam 312 scans at constant speed on said drum 308 parallel to the axis of said drum 308 by mirror 305 driven by motor 306. The beam is also modulated by the modulator 303 which is controlled so as to draw for example, an alphabetic character "A", the character being written on photosensitive drum 308 as shown in FIG. 7.

Characters can be written in three sizes, that is, large, medium, and small and a character is composed of a dot matrix, which will be described in greater detail. A small character can be written by selecting dots in a 7×9 dot matrix (with 9 scanning lines) with 6 spare scanning lines at the upper part of a character and 2 dots at the right hand of the character reserved for white space as shown in FIG. 7A, all of which provides a space for small character information. A medium character can be written by selecting dots in a 14×18 dot matrix (with 18 scanning lines) with 12 spare scanning lines at the upper part of a character and 4 dots at the right hand of the character reserved for white space as shown in FIG. 7B, all of which provide a space for medium character information.

A large character can be written by selecting dots in a 36×28 dot matrix (with 36 scanning lines) with 24 spare scanning lines at the upper part of a character and 8 dots at the right hand of a character reserved for white space as shown in FIG. 7C, all of which can make a space for making a large character information. For ease in character generation, large characters can be generated by the character generator for medium characters, with the exception that a dot for medium size is equivalent to four dots for large size; therefore the resolution of a character is the same as that for medium size.

Recording unit 300 is generally described hereinbefore. It is contemplated that a number of other modifications to or changes can be made in the preferred embodiment of the recording unit, one of which is direct irradiation of beam 312 on photosensitive paper instead of irradiation on photosensitive drum 308, will be within the scope of this invention.

Back to FIG. 1, information providing unit 100 and control unit 101 will be described in detail. It is contemplated that other memory equipment or electronic computer units other than magnetic tapes, which are capable of supplying electric signals to be recorded, may be employed in the information providing unit of the embodiment of the invention. In the embodiment of the invention, coded signals and control signals of information recorded in recording unit 300 are sent out from information providing unit 100 and such information is stored in a magnetic tape (not shown) under the format shown in FIG. 8.

In standard density printing which will be described hereafter, information is stored on the magnetic tape under block units as shown in FIG. 8A. One block unit can be separated into 34 unit areas (records) and one record has 276 characters. The block has information for a page having 136 characters on one line and 66 lines in a column for a paper of A4 size, as shown in FIG. 9A.

In greater detail, a first record is an area for recording control signals, in which a first to a third character stores ID information as described hereafter, and a fourth character stores function information as described hereafter, and a sixth and seventh character stores multi-copy information, and an eighth character stores reduction printing information, and the ninth to 276th character stores nothing in the first record.

The first record has only control information, but the second to 34th record has information (called character information hereafter) for characters and signs (called characters hereafter) and information of character size in a line (called size information hereafter), all of which is recorded in recording unit 300. More precisely, the second to 137th character in a record stores coded character information for 136 characters in one line on a recording paper 103 (138th character is a blank space), and the first character stores the size information of a complete line which is used upon recording by recording unit 300, and the 140th to 275th characters store 136 coded character informations (the 276th character is a blank space), and the 139 character stores size information for characters and signs stored in the 140th to 275th characters We have explained that the 2nd to 34th records had a blank record at the 276th character, but the 276th character in the 34th record stores page-end signals as well as program-end signals which signals the end of a program.

Figure 9:
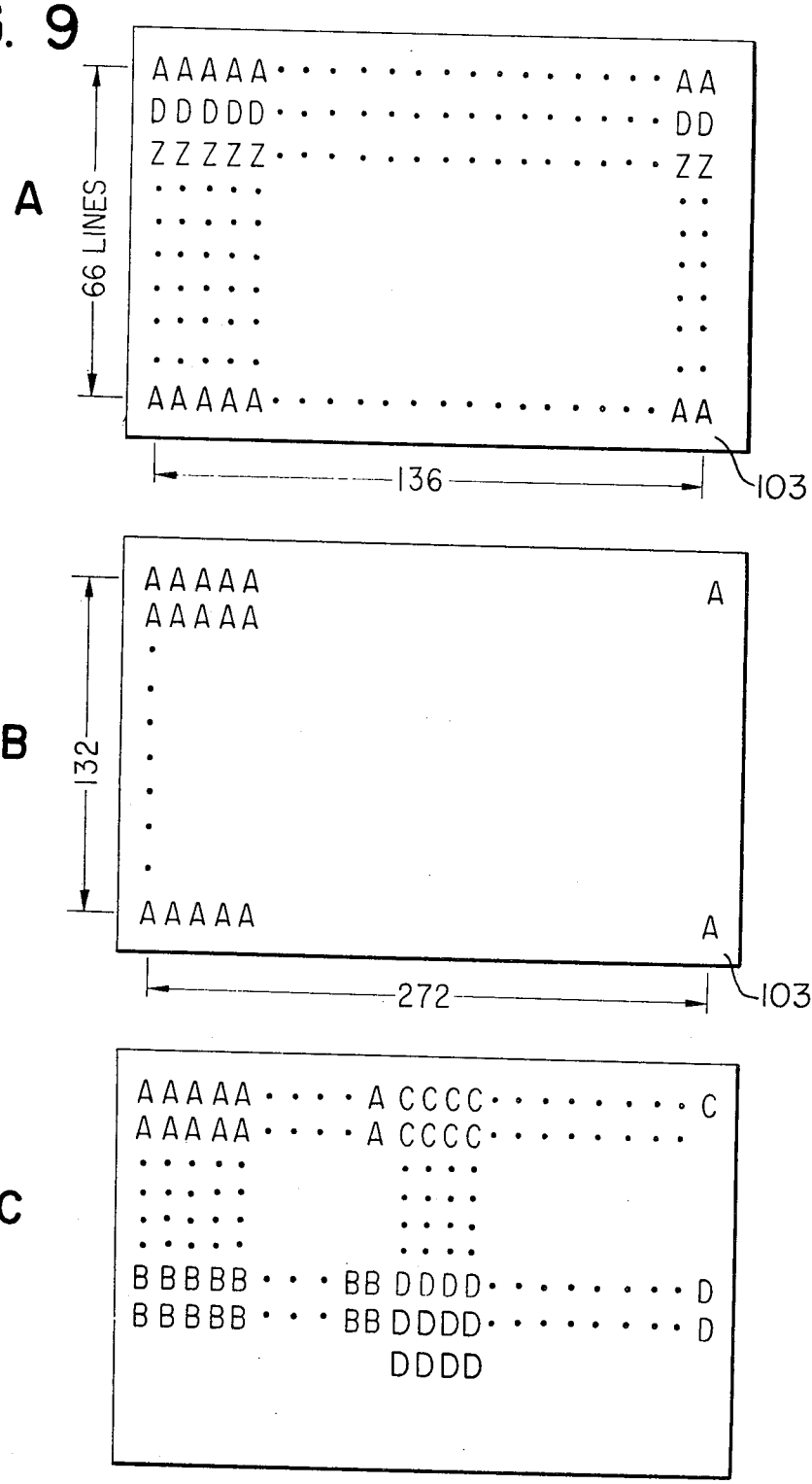
FIGS. 9A, 9B and 9C illustrates a recording format on a recording paper.

Accordingly, one record stores character information enough for two lines of medium-size characters and of character-size information for each line, and the remaining 33 records can store information enough for one page similar to FIG. 9A.

FIG. 8B shows a storing format in high density of information (called high density format hereafter) which will be described hereafter. In this format, the 2nd to 273rd character in a 2nd to 34th recrod stores informations of 272 characters and a 274th to 276th character is blank, and others are the same as FIG. 8A with exception that a first character stores character-size information concerning a 2nd to 273rd character.

Such high density information can store in four blocks information of small-size characters in one recording paper 103 of A4 size which has 132 lines of 272 characters in one line.

The 276th character which is a last line of a page stores signals informing the end of a page and of a program.

If the character-size information stored under a recording format as shown in FIG. 8A store large size, the character information stored in the 2nd to 69th and 140th to 207th characters are effective for printing and the 208th to 275th are not printed.

The embodiment being described in relation to the control signals described above, permits output instructions as described hereafter.

The mode information gives instructions for standard density as shown in FIG. 8A or high density as in FIG. 8B, and the function information provides instruction regarding fixed data or variable data (fixed data represents commonly usable data for each page when two kinds of information are superposed for printing on one page).

Accordingly, when one form of information is overlaid on another for printing, after which both informations are no longer required, either of the two data may be made the fixed data, and the other the variable data. However, when a letter or other document, such as a circular, having the same content is addressed to a plurality of different addresses, the content of the letter, etc. is the fixed data, and the different addresses to be printed on the uniform letter form the variable data. Incidentally, data which is not overlaid are made variable data. Further, when instructing the recording information to be variable data, a separate and distinct instruction is also given as to whether the variable data are to be overlaid on fixed data, or not. The information of the eighth character for reduced printing is to instruct whether four pages of information (the number of pages is not necessarily limited to four, but any plurality of pages will do) are to be printed on a single output paper on a reduced scale, or a single page of information is to be printed on a single output paper (hereinafter referred to as "ordinary printing").

The ID information indicates the proper number of a program, and first block in which such information is stored if n blocks are required for the program. This means is used to select specific programs.

6th and 7th character, multi-copy information, indicates number of sheets to be copied.

In greater detail, function signals are of three types called function 1, 2 and 3; function 1 (F1 hereafter) indicates fixed data (as described heretofore, an information surface such as a printing frame or a printing text in a letter for superposed printing of individual names and addresses and the like); function 2 (F2 hereafter) indicates variable data which represent printing with fixed data, and function 3 (F3 hereafter) indicates variable data which represent independent printing.

Mode signals are N and P. N represents normal information of 136 characters of 66 lines in A4 size and P represents high-density information of 272 characters of 132 lines.

Reduction signals are S and C. S represents normal printing of information in page buffers without any reduction and C represents printing reduced in one page informations in four page buffers.

The information separated in many block units as in FIG. 8 is stored in magnetic tapes, and control signals are applied to magnetic tape control line 105 from magnetic tape control circuit 104 in control unit 101 in order to read out information from the magnetic tape on output line 106.

Magnetic tape control circuit 104 can read out information on magnetic tapes in every one block and the first record in one block is read out first.

As described heretofore, character information is converted into coded information and stored on magnetic tapes, of which EBICDIC code is used in the present embodiment, and information on output line 106 is applied to code converter 107 in order to convert such code to ASCII codes. It is evident that code converter 107 can be omitted or modified in accordance with the codes stored in magnetic tapes or used in the control unit 101.

Information converted into ASCII codes are fed to distributor 108 in which control signals are separated from size information and information to be stored, and the size information and stored information are led to signal line 109. ID signals are stored through line 110 in ID register 115; function signals are stored in function register 118 through line 113; mode signals are stored in mode register 117 through line 112; multi-copy signals are stored in multi-copy register 116 through line 111; and reduction signals are stored in reduced printing register 119 through line 114.

Size information and character informations are stored in the page buffer register (PBF hereafter) 121 or PBF 122 but, for storing fixed information, PBF 121 is used exclusively. PBF 121 has the capacity for storing information in one block (about 9 k bytes). PBF 122 is used for storing variable data, and PBF 122 consists of four registers PBF 122-1, 122-2, 122-3 and 122-4 of which each register has a capacity the same as PBF 121, i.e., a total of about 36 k bytes. In the present embodiment, a semiconductor memory is used for accessing these memories but any other random access memories (RAM) meeting required random access time can be used.

PBF 121 and PBF 122 have independent address counters 123, 124 and 125, permitting simultaneous read-out from both PBFs.

Figure 25:
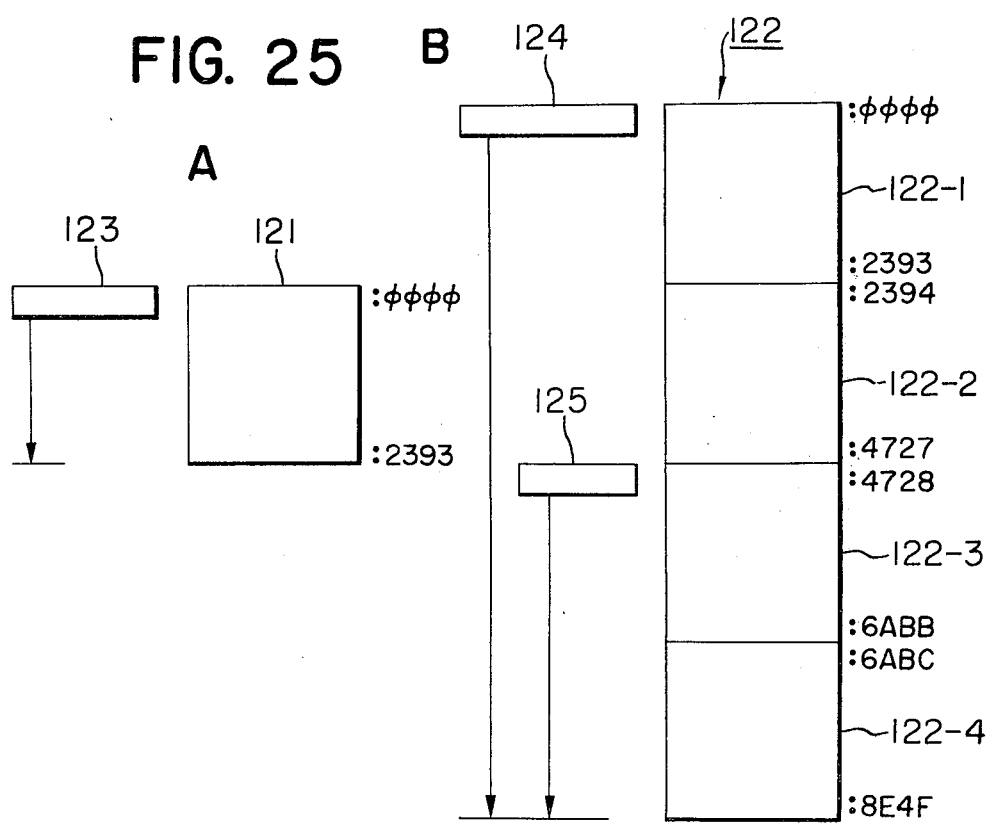
FIGS. 25A and 25B shows in the form of a block diagram the relationship between page buffer memories and address counters.

PBF 122 has two address counters 124 ad 123, and address counter 124 controls read-out and writing of size and character information to and from PBF 122-1, 122-2, 122-3 and 122-4 and address counter 125 controls read-out of size and character informations from PBF 122-3 and 122-4. A plurality of page buffers allows simultaneous read-out of size and character information from a plurality of PBF's, print-out on a paper of resultant information by superposing two sets of informations of sizes and characters, and print-out on one page of information of small-size characters stored in PBF 122 in four pages. FIG. 25 shows the relationship between the PBFs and address counters. PBF 121 has addresses from 0000 to 2393 (in hexadecimal notation), one of which addresses is stored in address counter 123. Information read out from an address of PBF 121 is written in the address in address counter 123 or information stored in address counter 123 is written in an address of PBF 121. PBF 122 has four PBFs, i.e., PBF 122-1 of which addresses are from 0000 to 2393, PBF 122-2 of which addresses are from 2394 to 4727, PBF 122-3 of which addresses are from 4728 to 6ABB, and PBF 122-4 of which addresses are from 6ABC to 8E4F (in hexadecimal notation), and address counter 124 allows storage of any one of addresses from 0000 to 8E4F of which information can be written to another specific address or to which information read out from another specific address can be written, and address counter 125 can define an address of from 4728 to 8E4F from which information can be read out.

As described heretofore, size information and character information is stored in PBF 121 or PBF 122, but the decision as to which of them is controlled by gate signals applied to gate 120 from write-in control circuit 126.

Outputs of the registers 117, 118 and 119 are applied to write-in control circuit 126 in which gate signals to control gate 120 can be shaped, and these three signals can make eight combinations as follows, with the exception that variable data have two indications, i.e., read-out superposing on fixed data or not superposing;

(1) fixed data, standard density, normal printing
(2) fixed data, standard density, reduced printing
(3) variable data (superposed), standard density, normal printing
(4) variable data (superposed), high density, normal printing
(5) variable data (superposed), standard density, reduced printing
(6) variable data (not superposed), standard density, normal printing
(7) variable data (not superposed), high density, normal printing
(8) variable data (not superposed), high density, normal printing.
other combinations are not correct.

In these instructions, gate signals are generated so as to write size and character information into PBF 121 in case of (1), PBF 121 in case of (2), PBF 122-1 in case of (3), PBF 122-1 to -4 in case of (4), PBF 122-1 to -4 in case of (5), PBF 122-1 in case of (6), PBF 122-1 to -4 in case of (7), and PBF 122-1 to -4 in case of (8).

Thus, information stored in PBF 121 or PBF 122 is transferred to and stored in addresses contained in address counters 123 and 124 controlled by write-in control signals supplied from write-in control circuit 126 through signal lines 127 and 128.

When orders of reduced printing are checked as control signals in write-in control circuit 126, information for four pages is controlled so as to be stored into PBF 122-1 to 122-4. A program shorter than four pages stops at the moment of generation of signals of end of program.

Figure 23A:
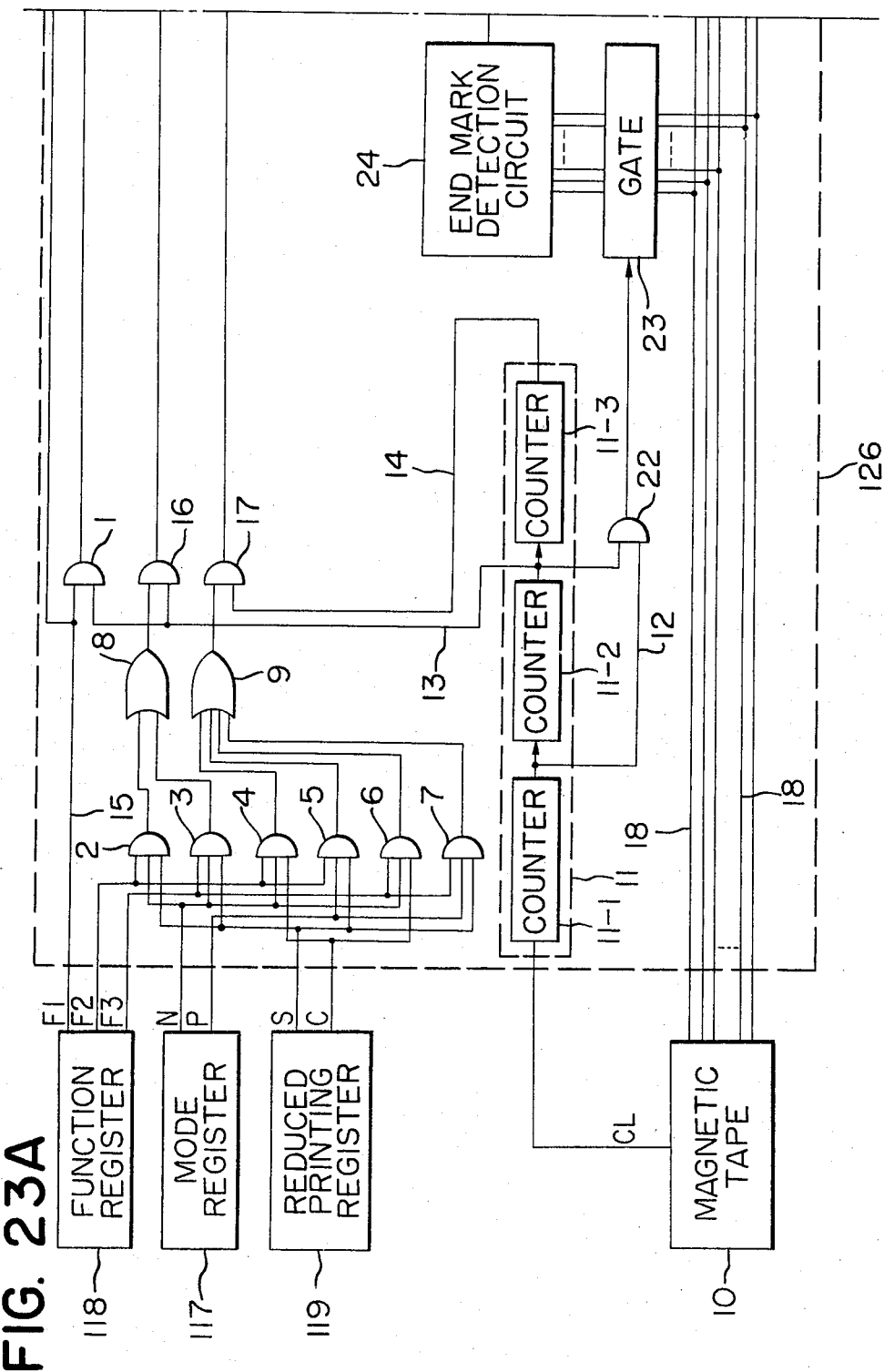

In FIG. 23, write-in control circuit 126 is described in greater detail. A part surrounded by a dotted line corresponds to write-in control circuit 126 in FIG. 1 in which and-gate 1 receives signals from the abovementioned state F1 of the function register 118; and-gates 2 to 7 receive output signals of the aforementioned state F2 and F3 of the function register 118, of the aforementioned states N and P of the mode register 117, of the aforementioned states S and C of reduced printing register 119, or-gate 8 receives output signals from the aforementioned and-gates 2 and 3; or-gate 9 receives output signals from the aforementioned and-gates 4 to 7; thus permitting generation of a signal instructing write-in into PBF 121, a signal from or-gate 8 instructing write-in into PBF 122-1, and a signal from or-gate 9 instructing write-in into PBF 122-1 to -4.

Unit 10 is a magnetic tape located in information providing unit 100 and can generate at every character information signals in parallel as well as basic pulses CL which allow detection of information quantity sent out from magnetic tape 10 by counting basic pulses CL by means of counter 11. Counter 11 consists of three cascade-connected counters, i.e., counter 11-1 counting 276 characters, counter 11-2 counting 34 records, and counter 11-3 counting 4 blocks. The 276th character can be detected upon generation of a signal on output line 12 from counter 11-1, and the 34th record which means completion of read-out of one page equivalent to 34 records can be detected by generating a signal on output line 13 from counter 11-2, and a signal generated on output line 14 from counter 11-3 can inform completion of read-out of four blocks equivalent to information for four pages. Write-in into PBF 121 through and-gate 1 is to write in PBF 121 through said and-gate 1 inhibited to write in PBF 121 through said and-gate 1 by applying signals on output line 13 as well as signals on signal line 15 representing state "138 of function register 118 to and-gate 1, and control signals to main control circuit 130 in order to instruct read-out of information written from PBF 121 through read-out control circuit 131, which will be described hereafter, can be generated.

By applying outputs of the or-gate 8 and outputs of the counter 11-2 to and-gate 16, the end of write-in into PBF 122-1 from said and-gate can be signaled, and the signal is applied to main control circuit 130 similarly to the output of the and-gate 1.

By applying outputs of or-gate 9 and outputs of counter 11-3 to and-gate 17, the end of write-in into PBF 122-1 to −4 from said and-gate 17 can be signaled, and the signal is applied to main control circuit 130 similarly to the output of the and-gate 1.

Information in which bits are read out in parallel by character are fed to PBF 122-1 to −4 or PBF 121 through gates 19 and 20 by means of line 18. Gates 19 and 20 also receive gate control signals through line 15. As the signals through line 15 are also fed to address counter 124 of PBF 122-1 to −4 and to address counter 123 of PBF 121 (but for gate 19 and address counter 124 after inversion), a high level signal on line 15, i.e., the register instructs write-in to PBF 121, permits application of read-out information from magnetic tape 10 to PBF 121 by opening gate 20, and enables address counter 123 to successively write information into PBF 121; low level signal on line 15, i.e., the register instructs write-in to PBF 122, permits application of read-out information from magnetic tape 10 to PBF 122 by opening gate 19, and enables address counter 124 to successively write information into PBF 122.

Such address counters 123 and 124 receive control signals from main control circuit 130 to stop write-in. Where the required amount of information which is written by outputs of and-gate 1, 16 and 17 are satisfied, the address counter is deactivated, i.e., outputs of and-gate 1 inhibit write-in into PBF 121, outputs of and-gate 16 inhibit write-in into PBF 122-1 and outputs of and-gate 17 inhibit write-in into PBF 122-1 to −4.

In the embodiment being described, if program end signals are detected before filling four pages in the case of reduced printing, blank codes (noted B code hereafter) generated in blank-code generating circuit 21 or write-in control circuit 126 are applied to PBF. In this case, the means to detect the end of a page is that outputs of counter 11-1 and of counter 11-2 are applied to and-gate 22 and said and-gate can detect and signal the position of a last character for one page; the detecting signal on signal line 18 is applied to end-mark detection circuit 24 through gate 23, which is opened by the detecting signal, in order to detect end-marks stored at the 276th character for a page where a program ends. The output signals of end-mark detection circuit 24 are latched and control gates 25 and 26.

The output signals are applied to gate 26 after inversion, but, if there exists no output signal, gate 26 is open and gate 25 is closed end, if there exist output signals, gate 26 is closed and gate 25 is open. Thus, B codes are fed to PBF from B code generator circuit 21 through gate 25 after detection the of end-mark.

The major object of this control is reduced printing. For example, the if reduced printing register maintains state C and a program ends after having sent information for of three pages to PBF 122, reduced printing should be executed by storing B code in the one page left. In other words, less than a to preset quantity of information (four pages in the present embodiment) can be processed under reduced printing.

As the counter 11 can not detect whether information for four pages (including B code) are stored or not on account of such generation and of write-in of B code, the reduced printing page detection circuit 27 is set in order to the detect completion for storing information of four pages into PBF 122 by checking address counter 124; completion of storing four-pages of information generates signals on line 28 and B codes can be stored to the extent required by applying both the signals and outputs of and-gate 17 to main control circuit 130.

As described heretofore, end signals of write-in (i.e. output signals of and-gates 1, 16 and 17 in FIG. 23a) through line 129 in FIG. 1 after completion of storing information of certain preset quantity are fed to main control circuit 130 to stop write-in by the write-in control circuit, and read-out signals are applied to read-out control circuit 131 from main control circuit 130 through line 132 by applying end-signals of write-in.

Subsequently, such information is read out for printing. How this read-out operation is conducted will be explained with reference to a state, wherein the character and size information having such control signals as mentioned in the foregoing (6), i.e., variable data (not superposed), standard density, and normal printing, are stored in PBF 122-1, as an example. Since there have been applied to the read-out control circuit 131 the information in the above-mentioned registers 117 to 119 through the signal lines 133 to 135, the fact of the recording information being stored in PBF 122-1 is judged from this circuit, as the result of which instruction is given to the address counter 124 to read out the recording information from PBF 122-1.

Address counter 124 will be described in detail with reference to FIG. 14. The address counter has two counters, one is a standard counter 205 for counting the top address of each line of PBF and another is a relative counter the 206 for counting relative character position on each line, and the counted numbers of counter 205 and 206 are added in adder 207 and the result is an address of PBF 122.

In greater detail, signals from a plurality of memory elements in standard counter 205 are led in parallel to output terminals 211. Standard counter 205 has terminals 212 signaling end of scanning of a line which informs completion of scanning on one line and has terminals 213 signaling to reset standard counter 205 to zero before starting printing of one page.

Signals from a plurality of memory elements in relative counter 206 are led in parallel to output terminals 218. Relative counter 206 has terminals 215 signaling end of a digit which informs completion of scanning of a character; relative counter 206 also has terminals 216 applying a signal generated upon end of scanning of one line in order to reset relative counter 206 to zero.

Outputs 218 are connected to one input of adder 207 in parallel and outputs 211 are connected to another input of adder 207 in parallel.

In greater detail, the number of digits counted by the relative counter is the number of characters (NC) existing in one line. Output terminals 211 of standard counter 205 deliver numbers equal to the NC upon application of the line completion signal on terminal 212. Adder 207 is, therefore, set as if the NC were added. The capacity of standard counter 205 is enough to be able to count the lines contained in one page. Accordingly, one is added to adder 207 upon application of the end signal of one digit on 215, and NC, number of characters in one line, is added upon application of one line-completion signal.

Finally, the outputs of relative counter and standard counter are added in the adder 207.

Address counter 124 has the composition mentioned above. As counter 205 and 206 are reset to zero before read-out from PBF 122, adder 207 becomes zero, i.e., an address of information concerning first informations in the first line (character and size information) of a page is defined. After completion of read-out from zero address, the digit end signal is added, the content of relative counter 206 advances by one, and adder 207 becomes 1, i.e., the address of information concerning the second digit in the first line (character information) is defined.

After reading out NC characters (when the output of adder 207 becomes NC-1), the first read-out of the first line is completed (as already described, one line has several scanning lines, therefore complete printing of one line requires m readouts on the same line) and the relative counter is reset to zero by end signal of scanning lines. Then, output of adder 207 becomes again zero and, after reading out NC characters, end signal of scanning line is generated. Repeating this process and at generation of end signal of scanning line, line completion signal is applied to terminal 212 of standard counter 205 at the moment of generation of mth end signal of scanning line and outputs of adder 207 become NC because NC is added to content of adder 207 by counter 205.

The output of NC is an address storing information (character and size information) in the second line. After reading out the first information and upon generation of the digit completion signal at completion of such read-out, the output of register 207 becomes NC+1 which indicates the address of the second information in the second line.

Repeating this process and at generation of the end signal of scanning line when outputs of adder 207 become 2NC−1, address of NC, NC+1, ... 2NC−1 is successively set, and at generation of mth end signal of scanning line in second line, standard counter receives line completion signal, and counter 207 becomes 2NC on account of addition of NC on said counter 207, and relative counter 206 becomes zero and read-out on third line starts. Successive read-out as described above permits read out information for one page. Standard counter and relative counter are provided but zero reset of only relative counter allows successive read-out of character informations in one same line. Thus read-out control is very simple due to such provision.

Address counter 123 and 125 are the same as address counter 124 described above in detail. If FIG. 14 is applied to counter 123 and 125, suffix (−1) for counter 123 and (−2) for counter 125 should be added to every number in FIG. 14.

Reference numerals 138 and 139 in FIG. 1 designate size latches, each of which is to store size information at the head of each line having character information to be recorded in one line. In order to store the information read out by the address counter 124 into the size latch 138 and the information read out by the address counter 125 into the size latch 139, the gate 137 is controlled by the read-out control circuit through the signal line 140.

In the above-mentioned example, as control circuit 131 instructs through line 136 the read-out to address counter 124, gate 137 is controlled so as to lead read-out character-size information to size latch 138.

Character information read out after such character size information is led to data latch 141, which can store one character information, by the gate 137 controlled by control circuit 131.

Gate 137 is controlled periodically so that, when standard density information is checked in read-out control circuit 131, size information is read out and successively read out information of 136 characters is led to data latch 141 and size information is read out again after completion of the read-out and successively read out information of 136 characters is led to the data latch (not completion of printing in one line), and also, when high density information is checked in read-out circuit 131, size information is read out and successively read-out information of 275 characters is led to data latch 141.

Figure 27:
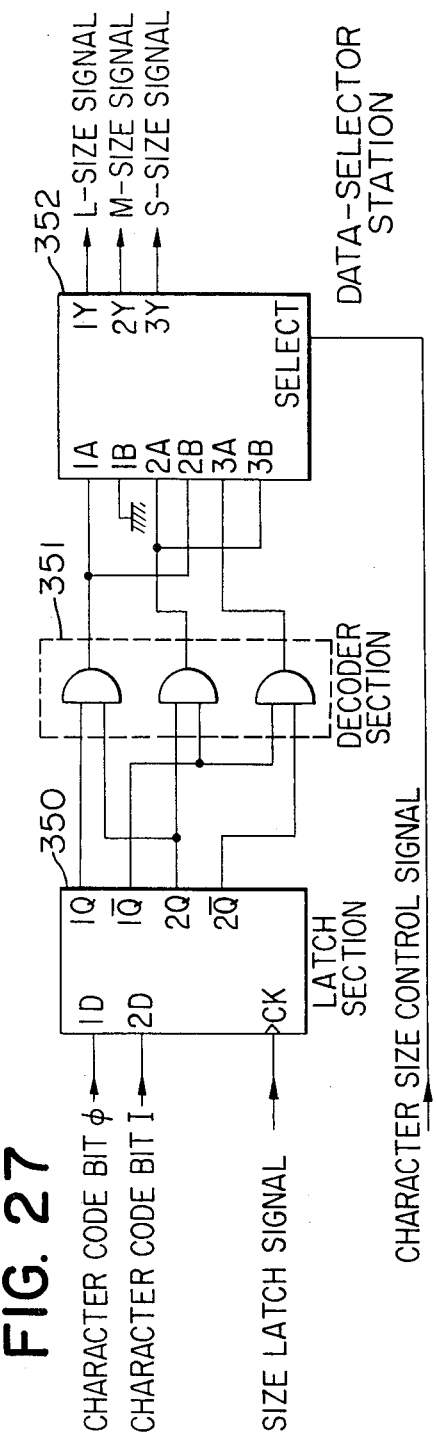
FIG. 27 is a circuit diagram of a size decoder in detail.

Decoders 142 and 143 are connected to size latch 138 and 139 respectively and can decode large, medium and small size information. Lines 144' and 145' from read-out control circuit 131 are connected to decoder 142 and 143, and control signals of reduced printing are fed to the lines which can decode large size as medium size and medium size as small size, and control signal of normal printing is not generated. FIG. 27 shows a schematic diagram of size information decoder as an example. As shown in FIG. 27, integrated circuit 350, which functions as a latch and is SN74175N made by TI, receives 2-bit coded size information at terminals 1D and 2D and size latch informations at terminal CK in order to latch size information.

Latched outputs at terminal 1Q, 1$\bar{Q}$, 2Q, 2$\bar{Q}$ are decoded in decoder 351 of ICs, SN7408N made by TI, and the decoded outputs are fed to terminal 1A, 1B, 2A, 2B, 3A, 3B of data selector 352. Large-size signal, medium-size signal, and small-size signal are obtained respectively at terminals 1Y, 2Y, 3Y of said decoder. Data selector 352 has a terminal SELECT to which character size control signal (reduced printing signal) is applied, and, if character size control signals are not applied, output terminal 1Y generates signals of large size when terminal 1D and 2D receive coded signals representing large characters, output terminal 2Y generates signals of medium size when terminal 1D and 2D receive coded signals representing medium sized character, and 2Y generates small size signals when 1D and 2D receive small character signals. However, if character size control signals are applied, an output signal is not generated at terminal 2Y, when coded signals of large character are applied to terminal 1D and 2D, and an output signal is not generated at terminal 3Y, when coded signals of medium character are applied, and output signal is not generated at any terminal when coded signals of small character are applied. Coded signal for large character is 11 and for medium character is 10 and for small character is 00. Either output of decoder 142 or 143 is supplied to gate 145 which is activated as time-sharing gate of output of any one of two decoders to line 144 in case of reduced printing and which is activated for gating output of decoder 142 in case of normal printing. When decoder 142 is selected, output of decoder 142 is applied to and, when decoder 143 is selected, output of decoder 143 is applied to line 144 by means of read-out control circuit 131 through line 146.

Figure 18:
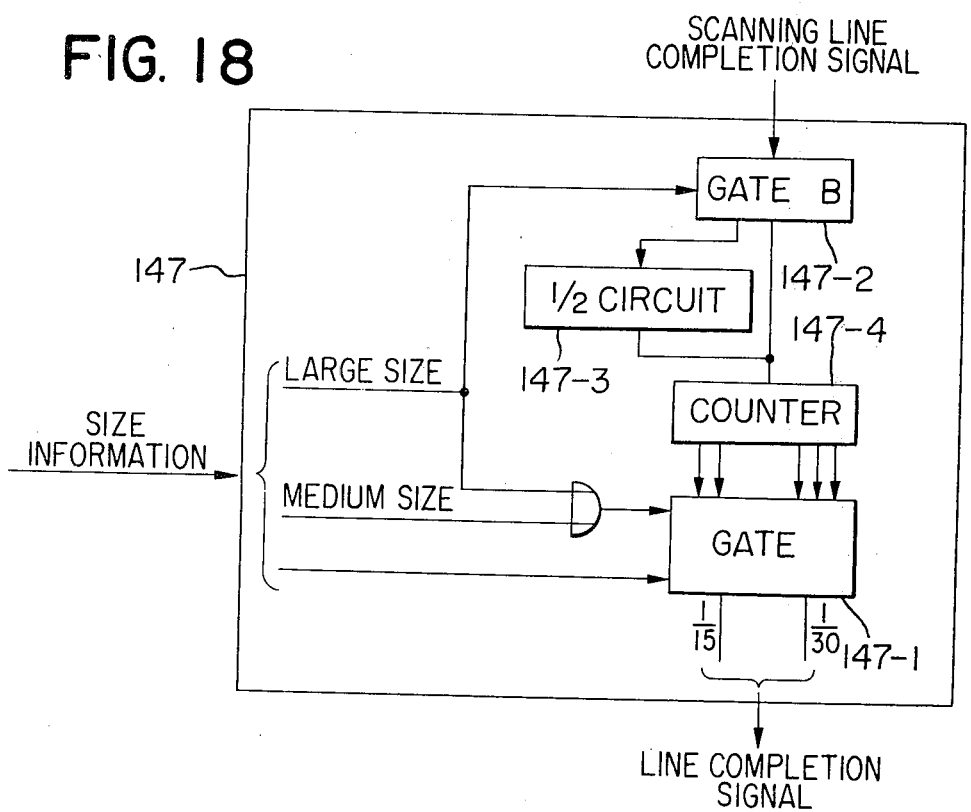
FIG. 18 is a detailed block diagram of a line counter in FIG. 1.

Line counters 147 and 148 count the number of scanning lines required to make characters and generate signals to the read-out control circuit 131 through lines 226 and 227 when a certain number has been counted. In the embodiment of FIG. 18, counter 147-4 controls gate 147-1 upon 15 counts of end signal of scanning line through gate 147-2 from vertical clock circuit 149 in order to generate a line completion signal in the case where size information from decoder 142 and 143 is for small characters, and counter 147-4 controls gate 147-1 upon 30 counts of end signals of scanning line through gate 147-2 in order to generate a line completion signal in the case of small characters. Large character is generated in medium character generator and gate B 147-2 is controlled so as to count down number of end signals of scanning line in counter 147-4 to half by ½ countdown circuit 147-3. i.e., two end-signals of scanning line can be counted as one. Such ½ count down circuit can be achieved by one flip-flop. The other counters 148 and 181 are similar to line counter 147 which is shown in FIG. 18.

FIG. 16 shows vertical clock circuit 149 in which counter 149-1 counts the number of clock pulses fed from the horizontal clock circuit 166 according to the number of dots required to make one character on a scanning line and generates digit completion signals (which are generated at every nine horizontal pulses for a small size character and at every eighteen horizontal pulses for a medium size character and at every thirty six horizontal pulses for a large size character), and vertical clock circuit 149 in which counter 149-2 counts the number of digit completion signals according to the number of characters in one line required by the size information (number of clock pulses required for one line, 2448 may be counted in the present embodiment) and supplies an end signal of scanning line to the line counters 147 and 148 upon completion of counting.

The outputs of line counters 147 and 148 are supplied to changing circuit 152 through gate 151 in order to change the conting number of scanning line. Outputs of the changing circuit 152 are also supplied to character generating circuit 150. Control signals on signal line 146 are supplied to the gate 151 which functions similarly to gate 145, but an output from either of the two counters is selected according to demand in reduced printing while output signals from line counter 147 are selected in normal printing.

Figure 10A:
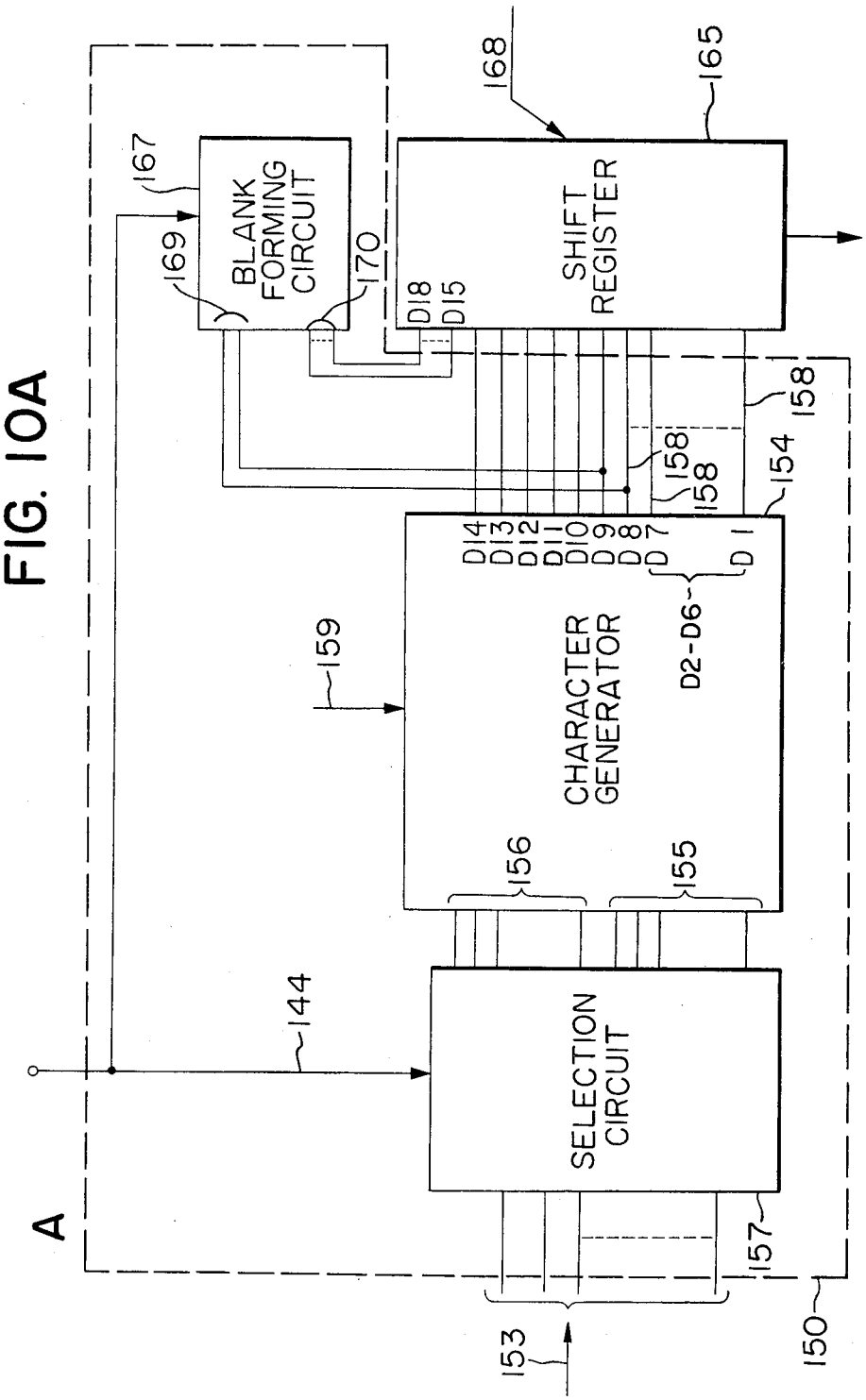
FIG. 10 A is a block diagram in detail of the character generating circuit of FIG. 1.
FIG. 10B is an enlarged drawing illustrating the formation of a character by means of a beam.

We will now describe in detail the character generating circuit 150 in FIG. 1 and 10 A. In the circuit, selection circuit 157, which selects to apply character information on small character generating terminal 155 or medium character generating terminal 156 of character generator 154 (applied to medium character generating terminal 156 if character size informations indicate large character) by receiving character information from output line 153 of data latch 141 and character size information on the signal line 144, and character information supplied through terminal 155 or 156 is output to dot output line 158 as parallel dot signals generated from a scanning line selected by an output signal on output line 159 from changing circuit 152.

D1 to D7 of dot output line 158 generate simultaneously signals when small size signals are applied from signal line 144, and D1 to D14 of dot output line 158 generate simultaneously signals when medium or large size signals are applied from signal line 144.

We will now explain in detail the generation of a small size character "A" with reference of FIG. 10 B.

When small size information is applied to selection circuit 157 through signal line 144, code signals of information of character A from output line 153 are applied to small character generating terminal 155.

If signals representing first scanning line are applied to character generator 154 through output line 159, D3 to D5 of dot output D1 to D7 corresponding to dot 160 to 162 in first scanning line in FIG. 10 B are activated. In similar manner, if signals representing second scanning line through output line 159, D2 and D6 of dot output D1 to D7 corresponding to dot 163 and 164 in second scanning line in FIG. 10 B are activated. In a similar way, signals representing the number of scanning lines successively advance and dot output lines D1 to D7 can be activated as shown in FIG. 10 B. We described here in detail generation of small-size characters. In the case of medium-size characters, character information is applied to medium-size character generating terminal 156 and dot signals corresponding to number of scanning line which is defined by signals from changing circuit 152 through output line 159 can be generated. A medium-size character is made by use of a 14×18 dot matrix as shown in FIG. 7B, and accordingly output line 159 indicates scanning line 1 to 14 and dot output D1 to D14 simultaneously delivers its output when such scanning line is indicated. Parallel outputs of dots on output lines D1 to D7 or D1 to D14 are stored in memory elements of shift register 165, which are not shown in the figure, in parallel. Shift register 165, therefore, has at least 18 cascade-connected memory elements. Shifting in shift register 165 is set by clock pulses from horizontal clock circuit 166 through signal line 168 synchronized with scanning beam 312 on photosensitive drum 308, and dot outputs successively delivered at the side of output D1 are shifting according to the shift of the laser beam.

The number of revolutions of motor 306 in FIG. 2 and 3 is 7900 rpm and a revolving polygon mirror 305 has eight mirror faces and the focal distance of f-θ lens 307 is 300 mm, and the equivalent length of one clock pulse on the photosensitive drum is 0.1058 mm.

Assuming that FIG. 7B indicates a character A to be drawn on photosensitive drum 308, shift register 165 generates a first dot output when a laser beam is located at a first line position of a first scanning line and generates outputs of the second dot D2 by an applied shift pulse when the laser beam locates at the second line position and generates outputs of the third dot D3 by an applied shift pulse when the laser beam locates at the third line position, and in similar manner one shift pulse sets one-bit shift at every moment of displacement along one line.

As explained above, at the extremity of preset scanning length on a scanning line of a character, following character information is read out in data latch 141 and dot signals on said scanning line are generated and transferred in parallel to shift register 165. In this way, a succeeding character is read out just after having read out a first character, spaces between two characters are small and it is not practical to read. In the present embodiment, spaces of two dots are reserved for small characters as shown in FIG. 7A and four dots for medium characters as in FIG. 7B, and eight dots for large characters as in FIG. 7C.

Blanking circuit, numbered 167 in FIG. 10 A, generates such blanking signals which are applied to shift register 165. 167 has small-character blanking lines 169 connected to dot output lines D8 and D9 and medium-character blanking lines 170 connected to D15 to D18 corresponding to the 15th to 18th bit position in shift register 165, and memory elements corresponding to the 8th and 9th position in shift register 165 receive signals by applying blanking signals "0" on small-character blanking line 169 when small-size character signals are applied on signal line 144 and memory elements corresponding to the 15th to 18th position in shift register 165 receive signals by applying blanking signals on medium-character blanking line 170 when large or medium-size character signals are applied on signal line 144.

For this reason, a blanking circuit 167 is provided. One the other hand, as shown in FIG. 16, nine clock pulses are counted in the case of small letters, eighteen (18) clock pulses are counted in the case of intermediate characters, and thirty-six (36) clock pulses are counted in the case of large characters in one part of the vertical clock generator 149. Simultaneously with completion of the counting, a completion signal (a digit completion signal) is sent to the read-out control circuit 131 through a signal line 149-3. Further, a counter B-149-1 which performs zero-return is provided so as to instruct read-out of the subsequent characters to the address counters 123, 124 and 125 by the read-out control circuit 131 upon arrival of the digit completion signal.

There exists no circuit for generating large characters in character generating circuit 150 but it is evident that one dot of medium character is equal to four dots as shown in FIG. 7B and C. Therefore, clock frequency is applied to count down circuit 166-1 by gate A166-2 in order to count down in half when large-size character information are applied to horizontal clock circuit 166 (FIG. 17) and ½ reduced clock frequency is applied to shift register 165 when large-size character information is applied through signal line 144 to horizontal clock a circuit 166. It is evident that horizontal clocks pulses are applied to shift register without passing through count-down circuit 166-1 due to gate A 166-2 which is controlled by small and medium-size character information applied thereto.

As described heretofore, required spaces between two characters can be made according to character sizes by virtue of both horizontal clock circuit 166 and character generating circuit 150.

Blanking circuit 167, as described heretofore, can supply "0" signals to D15 to D18 of shift register 165 in FIG. 10 through a buffer circuit (for example, SH7417H made by TI) when output terminal 1Y or 2Y of data selector 352 in size decoder shown in FIG. 27 is activated and supply "0" signals to D8 and D9 of shift register 165 through a buffer circuit when output terminal 3Y of data selector 352 is activated.

In this way, spaces between lines or between two vertical characters are very small, and for this reason changing circuit 152 (a circuit for changing counting number of scanning line) receives outputs of line counters 147 and 148 and its output is applied to character generator 154, to make spaces equivalent to six scanning lines for small characters, twelve scanning lines for medium characters, and twenty four scanning lines for large characters at the upper portion of a character as shown in FIG. 7 A, B, and C. In changing circuit 152, a specific circuit for large character, however, is not used by the circuit for medium characters is used.

In detail, changing circuit 152 has a subtraction circuit which subtracts a number of scanning lines equivalent to the number of spaces between lines (six for small characters and 12 for medium characters) from the output of the line counter through gate 151 and a selection circuit to select a subtraction of 6 or subtraction of 12 according to the size information signal.

In case of printing of a successive line after having printed a line as shown in FIG. 10 B, if the output of line counter 147 or 148 (1, 2, 3, ... 9) is applied to character generator 150 without any modification, no space is reserved at upper space of a character. Therefore, six scanning lines equal to number of scanning lines for spaces are added.

On account of this device, the character generator receives in series outputs of −5, −3, ... 9 but only outputs of 1, 2, ... 9 permit access to the character generator, which then generates character outputs, and during the outputs −5, −4, ... 0, i.e., during a period of six scanning lines, no character output is generated from character generating circuit 150, and the period of the scanning line makes spaces.

An embodiment of changing circuit 152 explained heretofore is shown in FIG. 15 which consists of a complementary circuit for small characters 280 which generates a complementary number of scanning lines equal to spaces for small characters, a complementary circuit for medium characters 281 which generates a complementary number of scanning lines equal to the spaces for medium characters, and gate 282 which selects one of the two complementary circuits according to size information. Changing circuit 152 also functions to add the outputs from line 283 to a complementary number generated by size information.

Output line 284 generates carries which are generated when an added number from output 283 is positive and 7 or more for small characters or 13 or more for medium characters. Character signals are delivered from character generating circuit 150 as long as carries exist and such device permits no generation of character signals from starting till one scanning advances to a preset scanning line.

Figure 26:
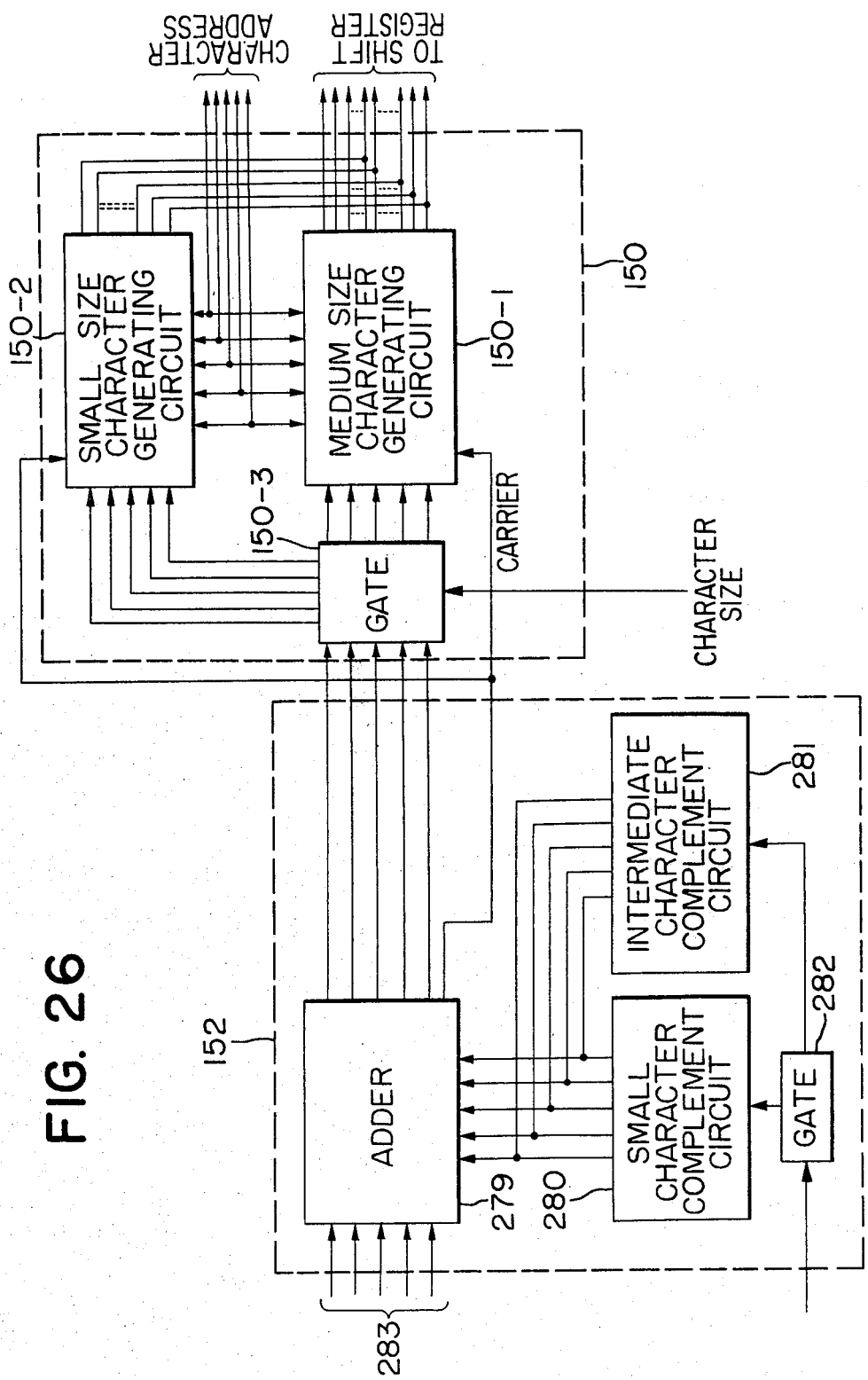
FIG. 26 is a detailed block diagram of the character generating circuit.

Character generating circuit 150 is one block in FIG. 15 which is shown in FIG. 26 in greater detail. Character generating circuit 150 consists of medium-character generating circuit 150-1 of ROM, small-character generating circuit 150-2 of ROM (for example, IC of μCM657/L made by Motorola), and gate 150-3 for connecting outputs of the adder 279 to medium-character generating circuit 150-1 or to small-character generating circuit 150-2 according to character-size information. When medium or large-character-size information is applied to the gate, medium character information is generated by applying the output of adder 279 to medium character generating circuit 150-1, and small character information is generated by applying the output of adder 279 to small character generating circuit 150-2.

For small and medium characters, at least, the proper character generating circuit is determined and the most suitable size for the desired shapes can be easily generated.

In the present embodiment, outputs from character generating circuit 150 are applied to shift registers in parallel and outputs from the shift registers are delivered in series, but various constitutions may be made without departing from the scope of the functions. In FIG. 29, shift register 165 can be replaced with the circuit surrounded by a dotted line. Input terminals of IC 358 to 360, D type flip-flop such as SN74174N, for example, made by TI, receive signals D1 to D18 and the outputs of these flip-flops are connected to shift register 165 in FIG. 10. Outputs 358 to 360 of the flip-flop are connected to multiplexer 361 (IC, SN74151AN, made by TI) and 362 (IC, SN74150 made by TI) and outputs of said multiplexer 361 and 362 are applied to logic gate 368 (IC, SN7400N made by TI).

Load signals are applied to terminal 366 and shift pulses are applied to terminal 367 as shift register 165 in FIG. 10 receives, and logic gate 363 (IC, SN7432N made by TI) receives both signals of 366 and 367, and its output is applied to flip-flop 358 to 360. Signals on 366 and 367 are applied to counters 364 and 365 (both ICs, SN74163N made by TI) and the output of said counter 364 is applied to multiplexer 361 and 362, and the output of said counter 365 is applied to multiplexer 362 and to multiplexer 361 through inverter 369 (IC, SN7404N made by TI). Outputs of logic gate 368 are the signals such as signals from the shift register of FIG. 10.

Since the read-outs from PBF 122 have already been described, we will now describe the read-outs from PBF 121. Address counter 123 is activated by control of the read-out control circuit 131 through signal line L9 and information stored in an address contained in said address counter are applied to gate 174, and gate 174 functions under control of read-out control circuit 131 so as to transfer character size information of the first and 139th character in each record to the size latch 138 or 175 same as 139 in case of standard density information and to transfer information from the second to 137th and 140th to 275th characters to data latch 176 same as the data latch 141 and outputs of the size latch 175 are decoded by size decoders 177 same as decoder 142 and 143, and which is activated by read-out control circuit 131 through line 178 only when variable data indicates superposition and is not activated in other cases by read-out control circuit 131.

The output of the decoder 177 is applied to vertical clock circuit 179 in the same way as the vertical clock circuit 149, to the horizontal clock generator 180 in the same way as the horizontal clock circuit 166, to the line counters 181 in the same way as the line counter 147 and 148, to the character generating circuit 182 in the same way as character generating circuit 150, and the changing circuit 183 in the same way as the changing circuit 152.

The output of data latch 176 is applied to character generating circuit 182 in the same way as the data latch 141 and the output of the character generating circuit 182 is applied to shift register 184 in the same way as the shift register 165.

To summarize, the read-out of PBF 122 has two lines for reduced printing, while the read-out of PBF 121 has only one line, the constituents of each block are the same for both.

Means to generate the clock pulses will be described hereafter. This equipment provides a main clock generator 185 (consisting of crystals) for the basic clock, which generates high frequency pulses (in the present embodiment, about 80 MHz) in main clock generator 185. Its output is applied to record clock generator 186 in order to generate recording clock pulses (about 5 MHz) reduced from main clock pulses for controlling the recording.

Reduction (count-down), however, is not always executed but started upon receipt of output signals of beam detector 318 in recording the unit 102. FIG. 11 shows in detail the recording clock generator 186. Output signals from the beam detector 318 (in FIG. 12b) are led to signal line 188 through printing control 187 and also are led to signal line 190 through interface 189 and reset R-S flip-flop 191 in FIG. 11.

set outputs are applied to 1/16 counter (frequency divider) 192 (for example, IC SN74S112N made by TI can be used) which starts to count such main pulses (80 MHz) as shown in FIG. 12 (a) applied through line 193 and output line 194 delivers count pulses shown in FIG. 12 C at every 16 pulses.

The pulses to be counted are conducted to counter 195 which counts up to a certain number N (200 in the embodiment) and the output of counter 195 is applied to gate 196 which is also connected to said output line 194. The counter 195, therefore, counting up N, the gate begins to deliver its output. In the present embodiment, with the number counted in 195 being 200, the pulses after 200 are delivered on output line 197.

The output on line 197 is applied to counter 198 which delivers output signals after counting a certain number m (in the present embodiment, 2448 pulses).

Output signals from counter 198 are applied to gate 199 after inversion and after a certain number of pulses (2448) shown in FIG. 12 e are produced on output line 200 and the pulses are applied to horizontal clock circuit 166 and generator N of the counter 195 and m of the counter 198 should be explained. When information is recorded by scanning laser beam 312 on photosensitive drum 308, the starting position of each scanning line should be exactly determined. If the print starting positions are not precisely determined, the scanning line may be displaced from the adjacent line, for example, the dots of a character drawn by several scanning lines in FIG. 7 may not be located in an exact vertical line, and distortion may take place.

For this reason, beam detector 318 is set a little further left from the starting point of recording if a laser beam swings from left to right, and upon detection of the beam by beam detector 318, counting of clock frequency starts first and then recording starts after counting a certain number.

Clock frequency for recording is about 5 MHz and the 80 MHz clock generator 185 in the embodiment is not required if 5 MHz is property used as the clock pulse. In the present invention, such main clock generator 185 is used for exact positioning of the starting point of printing. If the 5 MHz clock is used and the counting clock is started by output signals from beam detector 318, the maximum error is one clock pulse which is equivalent to one dot and considerable distortion may result in printed characters. In the embodiment, 80 MHz clock which is 16 times of 5 MHz is prepared and 1/16 counter 192 is started by outputs of beam detector 318 and outputs of 1/16 counter are counted by counter 195 and printing starts upon counting of N.

Maximum error of counting start, therefore, is only 1/16 clock frequency of recording frequency 5 MHz, and distortion is 1/16 of one dot at the maximum which is small enough to be used practically.

It is evident, as explained, that N determines a left margin on a scanning line which is a starting position for printing. N being variable, the left margin can be selected as required. If N is small, the starting point of printing shifts to the left and if N is large, the starting point of printing shifts to the right.

Instead of being variable for number N of counter 195, output of counter 201 and outputs of manual switch for setting number are applied to comparator 204, as shown in FIG. 13. Being compared to each other in comparator 204, signals are generated upon coincidence.

Figure 28:
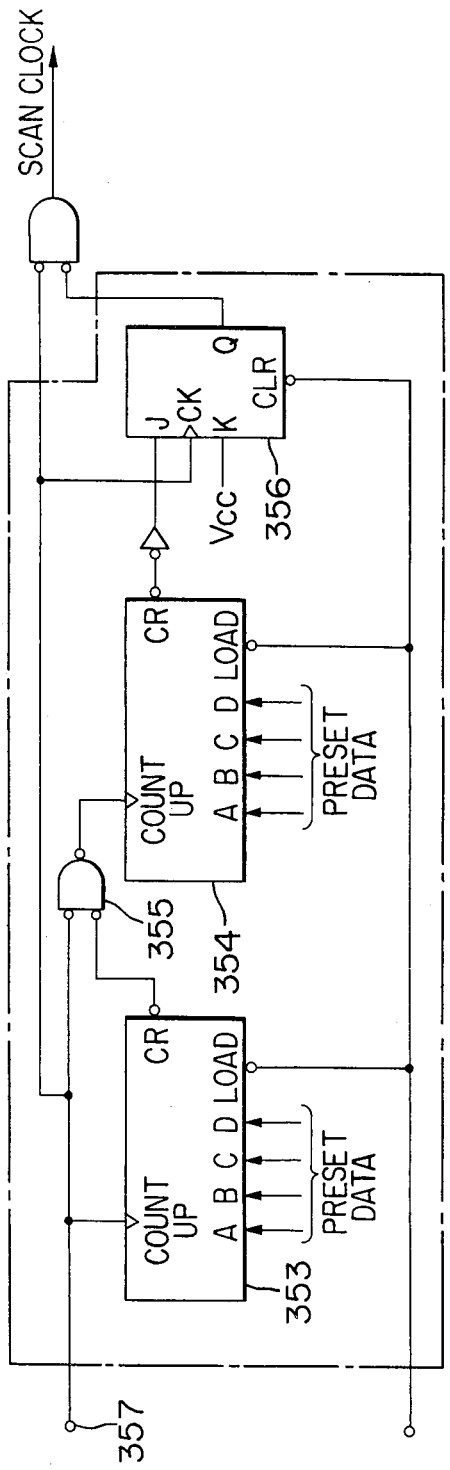
FIG. 28 is an another embodiment, shown in a circuit diagram, for setting the shift margin in FIG. 11.

FIG. 28 shows in greater detail the circuit shown in FIG. 13. Counters 353 and 354 (IC, SN74192N made by TI) are cascade-connected through NAND gate 355 and flip-flop 356 (SN74109N made by TI) is connected to CR terminal of the counter 354, and clock pulses are applied to terminal 357 and a number of clock pulses corresponding to a preset left margin is set at A, B, C, and D terminal of each counter and the LOAD terminal receives end signals of scanning after one scanning of the beam on the photosensitive drum. Due to these connections, clock pulses eliminating clock pulses corresponding to the left margin can be obtained at the output of the and-gate.

Counted number m of the counter 198 also determines the position where one scanning line ends the recording of information. For medium characters, one character has 18 dots and one line has 136 characters, then, since $18 \times 136 = 2448$ dots (in small characters and large characters, it is same) is covered by a scanning line, the clock pulses should be stopped for controlling recording. Thus, m contributes to determine the end position.

In FIG. 12, C' is the same as C and only the abscissa is changed. And also, flip-flop 190 in FIG. 11 receives reset input from set-output of the flip-flop and flip-flop 285 of which set-input is connected to outputs of the counter 198 through delay circuit with delayed time $\tau$ 286 has a set-output as shown in FIG. 12 g of which level at the moment of application of beam detector output changes high to low and low to high after $\tau$ elapses from completion of recording of the information (the $\tau$ is a sufficient time between the end of recording of a last character in a line and removal from the recording area on a recording medium, A4 in this case.)

In the present embodiment, outputs of shift register 184 or 165 and control signals of the clock generator 186 as shown in FIG. 12 g are applied to or-gate, not shown in the figure, in video information generator 287, and outputs of the or-gate are applied to modulator 303 through interface 189. The reasons for applying to the modulator not only an output from the shift register, but also a control signal, as shown in FIG. 12g and as described in the preceding, are: (1) to restrict the beam so that it may not be irradiated onto the recording area of the photosensitive drum, when no character is to be projected; (2) to enable the beam detector to detect the beam; and (3) to enable the beam at a position corresponding to the beam detector to be released from restraint by the modulator.

Figure 21:
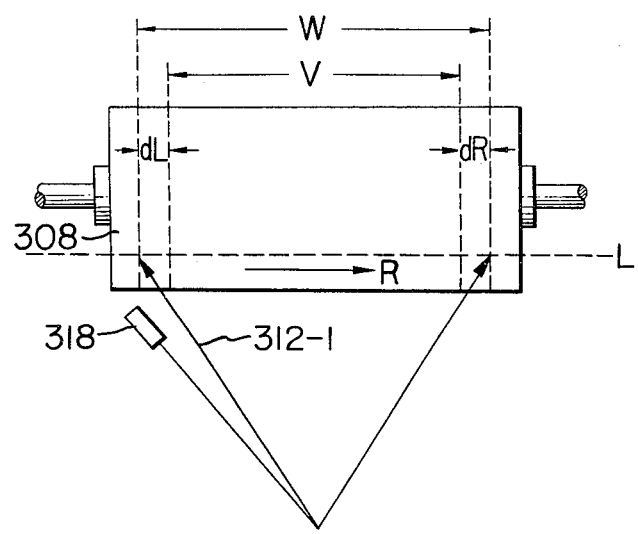
FIG. 21 is a top view of the recording unit in illustrating beam exposure in the recording unit.

In the embodiment, beam detector 318 is used for detecting beam positions and the beam detector 318 locates against a photosensitive drum (printing paper) as shown in FIG. 21.

The area on photosensitive drum 308 indicated by W is the printing zone on a printing paper and, if beam 312-1 repetitively scans in the direction R indicated in the figure, the beam detector 318 is located to detect beam 312-1 when it is at the left side extremity of the width W. Beam detector is fixed to meet such objects and if scanning velocity of the beam is constant, then clock frequency of constant frequency can be counted upon detection of the beam and the position of the beam can be exactly detected.

As described in the present embodiment, the beam is modulated by information of beam position and characters can then be recorded.

In FIG. 21, assuming that width V is the area to be recorded (the modulator receives modulating signals of information from the PBF when a beam scans this zone), dL, and dR are spaces for the left margin and right the margin on a recording paper where the beam should not irradiate.

In the present embodiment, flip-flop 285 in FIG. 11 is set for such purpose, and the modulator is modulated by logical outputs of control signals shown in FIG. 12 g from the flip-flop and information from shift registers 165 and 184 (video information generator 287 is, therefore, a simple "OR" gate). To explain this circuitry, reference is made to FIG. 21 which illustrates the recording unit to be exposed to the scanning beam. The beam is controlled by the "OR" outputs obtained from the control signal (see: FIG. 12g) which renders the beam "off", and the signal from the shift registers 165 and 184 during scanning of the beam width V which occurs after the beam detector 318 has detected the beam and after a lapse of a time $\Gamma$ from positioning the beam spot at the right-most end of the beam width V (the time $\Gamma$ is longer than the time required by the beam to reach the right end of the width W).

The beam is, therefore, turned off during dL and dR and irradiates during V for projecting characters.

In the present embodiment, beam positions are detected by means of outputs of the beam detector, and technical difficulty of manufacturing the polygonal mirror 305 is reduced a great deal on account of use of the such beam detector.

Detection of rotation of motor 306 may be used to detect rotations of the mirror, but this means requires high precision to machine the mirrors. Detection by means of the beam detector of which outputs provide signals to start the counting clock pulses permits detection of the beam position satisfactorily, even employing a poorly machined polygonal mirror.

Since the recording clocks are produced in a divider to which clocks are fed and which is triggered by outputs of the beam detector, stability of the recording clock is excellent but by economic means for generating them.

Furthermore, one of the parts we have not described heretofore is a control panel 219 in FIG. 1 A This panel is provided thereon with switch 290 to designate an ID number, a switch 291 to designate a page number in the ID, a switch 292 to instruct retrieval of a corresponding location on a magnetic tape based on two inputs by the operation of both of the above-mentioned switches, a start-stop switch 293, a switch 294 to set the number of copies to be made, a switch 295 to change the setting operation for the number of copies to be made from automatic over to manual, or vice versa, a control switch 296 for printing in reduced scale, which has three mode selecting pushbuttons to instruct normal printing, reduced printing, and automatic printing, and a power source switch 297.

The other is clock generator 289 in FIG. 1 which generates clock pulses to control main control circuit 130.

Also, terminals 288 in FIG. 11 receive count-down clock pulses which are used as clock pulses to read size information into the size latches.

Referring to FIG. 24 which detailedly represents a part of the read-out control circuit 131, there are provided 'and' gates 30–35 receiving the output signals of aforementioned function register 118, mode register 117 and reduced printing register 119, said output signals being applied to respective gates as shown in the drawing thereby to derive an instruction from 'and' gate 30 for the read-out simultaneously from PBF 121 and from PBF 122-1, an instruction signal from 'and' gate 31 for the read-out from PBF 122-1, an instruction signal from 'and' gate 32 for the read-out in successive order from PBF 122-1, 122-3, 122-2 and 122-4 and also for the simultaneous read-out from PBF 121, an instruction signal from 'and' gate 33 for the read-out in successive order from PBF 122-1, 122-3, 122-2 and 122-4, an instruction signal from 'and' gate 34 for the read-out in successive order from PBF 122-1, 122-2, 122-3 and 122-4 and also for the read-out from PBF 121, and an instruction signal from 'and' gate 35 for the read-out in successive order from PBF 122-1, 122-2, 122-3 and 122-4.

A part of output of said 'and' gate 32 is applied to size decoders 142, 143 and 177 as a letter size change instruction while a part of the output of said 'and' gate 33 is applied to size decoders 142 and 143 as a letter size change instruction, both of which constitute signals for recording with modified letter size as detailedly explained later.

Further provided are four 'or' gates 36–39 to which the output signals of said 'and' gates 30–35 are respectively applied as shown in the drawing, thereby to derive an instruction signal from 'or' gate 36 for the read-out from PBF 121, an instruction signal from 'or' gate 37 for the read-out from PBF 122-1, an instruction signal from 'or' gate 38 for the read-out from PBF 122 in successive order of PBF 122-1, 122-2, 122-3 and 122-4, and an instruction signal from 'or' gate 39 for the read-out from PBF 122 in successive order of PBF 122-1, 122-3, 122-2 and 122-4.

The output signals of said 'or' gates 36–39 are further applied to the 'and' gates 40–43 which also receive the read-out instruction signal from the main control circuit 130, and the output signals and inverted output signals of said 'and' gates 40–43 are applied respectively to the 'set' terminals and 'reset' terminals of flip-flops 45–48. Thus, by the application of a read-out instruction signal which is continuously generated during the read-out period, said flip-flops 45–48 are changed to the 'set' position corresponding to the output of 'or' gates 36–39, applying the output signal thereof to the address counters 123, 124 and 125. Said flip-flops 45–48 are returned to the 'reset' position thereof at the termination of the read-out instruction signal. The 'set' output SO of said flip-flop 45 activates the address counter 123 of which address is successively advanced, by means of read-out clock pulse applied thereto consisting of the digit completion signal from the terminal 44-1, thereby realizing successive read-out from PBF 121. Also the outputs of said flip-flops 46 and 47 are applied through an 'or' gate 49 to activate the address counter 124 of which address is successively advanced by means of the read-out clock consisting of the digit completion signal from the terminal 50 thereby realizing successive read-out from the corresponding addresses of PBF 122.

The 'set' output of said flip-flop 48 is converted, by means of pulse-generating wave forming circuit 51, into a pulse signal at the starting point of level variation. Said pulse signal is applied as a reset input to a flip-flop 52, of which 'set' output is applied to the aforementioned 'or' gate 49 while the 'reset' output is applied to the address counter 125 thereby enabling the read-out from PBF 122-3 and 122-4, the address of said address counter 125 being successively advanced by the application of the read-out clock from the terminal 53 thus realizing the read-out from the corresponding addresses of PBF 122.

The above-mentioned flip-flop 52 is provided for the control of reduced printing, of which 'set' input consists of the output from a detector circuit 54 for detecting that the size information of PBF 122-3 and 122-4 is latched in a size latch provided for this purpose.

The above-mentioned address counters 123, 124 and 125 are provided with the function of automatically returning to the initial state and repeating the read-out operation after reaching the final address thereof, so long as the drive signal from the flip-flop and the read-clock exist. It is therefore necessary to positively terminate the read-out operation for the purpose of read-out up to a desired address or read-out of information in PBF for a desired number of times, and the termination of the read-out operation in the present embodiment is realized by the termination of read-out clock.

The address counter 123 is further provided with a read-out completion detecting circuit 56 (of which output level is varied at each detection and maintained thereafter) for detecting the read-out of the whole content corresponding to one page, and a four-times read-out completion detecting circuit 57 (of which output level is varied at each detection and maintained thereafter) for detecting the completion of four cycles of read-out of the information corresponding to one page, the outputs of said detecting circuits 56 and 57 being respectively supplied to 'nand' gates 58 and 59, which also receive the output of aforementioned 'and' gate 32. Thus an 'and' gate 60, which receives the outputs of said 'nand' gates 58 and 59 as well as the read-out clock pulses, generates the read-out clock pulses necessary for reading once the information in PBF 121 when the output of the 'and' gate 32 is at a low level, and the read-out signal necessary for repeatedly reading four times the information in PBF 121 when the output of the 'and' gate 32 is at a high level.

Stated otherwise, the read-out operation for PBF 121 is carried out once either when the contents of PBF 121 and PBF 122 (in the successive order of PBF 122-1, 122-2, 122-3 and 122-4) are subjected to simultaneous read-out or when the contents of PBF 121 and PBF 122-1 are subjected to simultaneous read-out, while said read-out operation is substantially repeated four times when the contents of PBF 121 and PBF 122 (in the successive order of PBF 122-1, 122-3, 122-2 and 122-4) are subjected to simultaneous read-out. A part of the output of the aforementioned 'and' gate 32 is applied, through an 'and' gate 61 which also receives a pulse CP3' of an advanced phase compared with the 1224th clock pulse shown in FIG. 12 (i.e. a pulse located between the 1224th and 1225th clock pulses corresponding to the middle point of 2448 clock pulses contained in a line), to said address counter 123 as a clear signal for a relative counter contained in said address counter 123 while the base counter therein is cleared when a scanning line counter (not shown) counts half of the number of scanning lines necessary in a page (1980/2). Said 'and' gate 61 is provided for the purpose of reading information of two lines belonging to different PBF's during one scanning period of the laser beam.

Each of said address counters, as explained in the foregoing, receives the scanning line completion signal from the terminal 72 and the line completion signal from the terminal 73 as the clear signals for the relative counter provided in said address counter and at the terminal 212 of the base counter therein.

The address counter 124 is likewise provided with a detecting circuit 62 for detecting the completion of read-out of PBF 122-1 and a detecting circuit 63 for detecting the completion of the read-out of PBF 122-1 to 122-4, of which outputs (of which level varies at each detection and is maintained thereafter) are applied respectively to 'nand' gates 64 and 65, of which outputs are in turn supplied, together with the read-out clock from the terminal 50, to an 'and' gate 67.

Said 'and' gate 67 also receives the inverted signal of the output of a detecting circuit 68 which will be explained later, and furnishes, in the absence of said output, the address counter 124 with the read-out clock pulse coming from an 'and' gate 66.

Said 'nand' gates 64 and 65, being also supplied with the output of aforementioned 'or' gate 38, function to furnish the address counter 124 with the read-out clock pulse necessary for the read-out of PBF 122-1 when the output of said 'or' gate 38 is at a low level, and with the read-out clock pulse of a number necessary for the successive read-out of PBF 122-1 to 122-4 when the output of said 'or' gate 38 is at a high level, whereas said read-out clock pulse is limited to the read-out of PBF 122-1 and 122-2 when the detecting circuit 68 gives an output signal.

The aforementioned address counter 125, which receives the read-out clock pulse through 'and' gates 55 and 69, is provided with the above-mentioned detecting circuit 68 for detecting the completion of the read-out of PBF 122-3 and 122-4 and a detecting circuit 71 for detecting the completion of read-out of characters corresponding to 1224 clock pulses (137 characters in the case of small sized characters), of which output signals (varying the level thereof at the detection and maintaining said level thereafter in the similar manner as explained in the foregoing) is applied, after inversion, to aforementioned 'and' gates 67, 69 and 55, thus said output being subject to level change after each read-out of 137 characters and retaining the thus changed level until cleared. Consequently the supply of read-out clock pulses is terminated after the read-out of characters corresponding to 1224 clock pulses (137 characters in the case of small sized characters), and said detecting circuits (counters) are then cleared by the scanning line completion signal to reopen the read-out operation. When the read-out of PBF 122-3 and 122-4 by the address counter 125 is completed by the repetition of such read-out operations, the 'and' gates 67 and 69 are changed to 'off' position thereby to terminate the supply of the read-out clock.

The aforementioned address counter 124 is further provided with a pulse-generating detecting circuit 70 for detecting the completion of the read-out of characters corresponding to 1224 clock pulses (137 characters in the case of small sized characters). The aforementioned detecting circuits 54, 68, 70 and 71, wave forming circuit 51, flip-flop 52, 'and' gates 55 and 69, and address counter 125 are provided for the purpose of reduced printing.

Reduced printing is indicated by a high level signal from the 'or' gate 39 which instructs the read-out in the line unit of the information in each PBF in the successive order of PBF 122-1 and 122-3, and then the read-out of PBF 122-2 and 122-4 in a similar manner. Said read-out instruction signal is applied to the 'and' gate 43 to generate an output signal for shifting the flip-flop 48 to the 'set' position thereof, and the resulting pulse signal from the wave forming circuit 51 is supplied to the reset input terminal of the flip-flop 52 of which 'reset' output activates the address counter 125 to start the read-out operation from PBF 122-3.

The first character of PBF 122-3, which contains character size information as shown in FIG. 8A, is read and stored in a size latch 139, and the completion of this operation is detected by a detecting circuit 54 of which output shifts the flip-flop 52 to 'set' condition to activate the address counter 124, thus enabling successive read-out starting from PBF 122-1. Under this condition the detecting circuit 71 maintains a state of having counted one character. When the detecting circuit 70 detects the completion of read-out of size information and character information from PBF 122-1 corresponding to 137 characters in small size characters (blank codes provided at each 136 characters in FG. 8A not being read), the output of said detecting circuit is applied to the reset terminal of the flip-flop 52 thereby shifting said flip-flop to 'reset' condition. This changeover from 'set' condition to 'reset' condition initiates the successive read-out of PBF 122-3 (starting from the first character information as the size information was already read).

At the read-out of final character information in a line in this manner which completes a read-out cycle of 137 characters, the detecting circuit 71 applies the output thereof to the 'and' gate 55 thereby terminating the supply of read-out clock pulses to the address counter 125. Then, by means of the scanning completion signal indicating the completion of one scanning cycle of the beam as already explained, the relative counters contained in said detecting circuit 71 and the address counter are cleared and the supply of read-out clock pulses to the address counter is reopened.

In this manner repeated again is the cycle of the read-out of size information at the first of PBF 122-3 of which completion is memorized by the size latch 139, and of the changeover of flip-flop 52 to 'set' position by the detecting circuit 54 upon detection thereby of said memory operation of size latch. After completion of the multiple read-outs of the information in a line, a similar read-out cycle for the succeeding line is initiated by means of the line completion signal, and, upon obtaining the output from the detecting circuit 68 indicating the completion of the read-out of the information corresponding to four pages, the 'and' gates 67 and 69 are closed to terminate the supply of the read-out clock pulses thereby terminating the read-out from PBF 122. Following is a detailed explanation of the recording apparatus of the present invention of which structure is schematically explained in the foregoing.

Prior to the use of said apparatus, the power switch 220 of the printing control 187 in the recording unit 102 is closed to put said recording unit into operation (the laser oscillator 301 is constantly powered irrespective of said switch 220 thereby dispensing with the warm-up time thereof), and the power switch on the control panel 219 is closed to put the control unit 101 into a 'stand by' state. In the case of simple recording of the output of the information providing unit 100 according to the control signal supplied from said unit, the start switch 293 is actuated to apply a switch signal to the main control circuit 130 to generate a start signal which is supplied to the magnetic tape control circuit 104. Said control circuit instructs the read-out, from the tape in said information providing unit, of the control signals of a program which is thus stored in the instruction registers (registers 115-119 inclusive).

On the other hand, in the case where an ID instruction is given, the search instruction switch 292 is then actuated instead of the aforementioned start switch, the ID information is stored in the main control circuit 130 and compared by means of a comparator 225 with the content of ID register 115. Thus the tape alone is advanced until the two coincide with each other, and the read-out from the tape is commenced when such coincidence is established.

The copy number can also be instructed by a switch, and the auto-manual switch 295 decides whether the copy number follows the information in the multi register 116 or the panel input overrides.

As explained in the foregoing, the control signals memorized in the mode, function and reduced printing registers are utilized to identify the PBF in which the character information is to be stored. In case the character information belonging to such memorized control signals is varying data and is subject, as indicated by the reduced printing control signal, to ordinary printing, the write-in control circuit 126 controls the gate 120 and the address counter 124 to store the character information (including character size information) of the first page into PBF 122-1. Upon completion of the write-in of the character information of the first page, said write-in control circuit 126 furnishes a completion signal to the main control circuit 130 to issue a read-out termination instruction to the magnetic tape control circuit 104 thereby terminating the read-out of data.

Also said main control circuit 130, upon reception of a completion signal indicating the completion of the write-in into PBF 122-1, furnishes a read-out instruction to the read-out control circuit 131 which in turn controls the address counter 124 to commence the read-out of the first line of the first page of the memorized information. Assuming that said first line includes 136 memorized character codes A, B, C, . . . , N of 'medium' character size, the read-out control circuit 131 identifies the contents of said registers 117, 118 and 119 and supplies a control signal to the gate 137 for applying the size information to the size latch 138. In this way the data stored in the size latch is decoded by the decoder 142, and the decoded information is applied to and thus controls the clock generator and counter. In this case, as the reduced printing instruction signal is not applied to the signal lines 144' and 145' the size information of medium size character is decoded so as to instruct medium size character. Said instruction is realized by controlling the vertical clock circuit 149 to derive therefrom the digit completion signals at each 18 horizontal clock pulses and the scanning line completion signals at each counting of the clock pulses contained in the recording area of a scanning line (2448 clock pulses or 136 medium sized characters in the present embodiment), the line counter 147 to derive therefrom the line completion signal to be applied to the control circuit 131 upon each counting of a number equal to the number of scanning lines constituting a line (30 in the present embodiment), the character generating circuit 150 to select the medium character size and the medium size complementary number circuit 281 to add a complementary number of "12" to the adder 279 of the changing circuit 152.

Upon completion of the read-out of such size information, the read-out operation of the coded information of the first character "A" is commenced. The counters 205 and 206 of the address counter 124 are cleared prior to the read-out of character size, and the datum "A" is latched by means of the first clock pulse obtained from the line 200 of FIG. 11 from the PBF 122-1 to the data latch 141, which applies said information to the medium size terminal 156 of the character generator 154. In this state the line counter 147 is cleared and in the state of "1".

Consequently a signal indicating the first scanning line is applied to the input line 159 of the character generator 154. However, as is shown in FIG. 15, the carry signal is not supplied to the character generator 150 since a complementary number is applied to the adder 279 from the medium character complementary number circuit 281, and the dot output lines 158 D1-D14 shown in FIG. 10 generate "0" output. Furthermore, the function of the blank forming circuit 167 provides the dot output lines D15, D18 also with "0" output, resulting consequently in the setting of "0" on the 1st to 18th stages (read-out side being 1st stage) of the shift register 165. The dot in said 1st stage is read simultaneously with said setting and applied to the modulator 303 as a modulating signal, but the beam is interrupted and does not reach the photosensitive drum. Said beam is interrupted when a "0" signal is applied to said modulator 303 and made to pass upon reception of a "1" signal.

Upon arrival of the laser beam to the adjacent dot position after 1/5M sec., a horizontal clock pulse is applied to the shift register 165. In this state there appears no change in the control signals between the circuit blocks after the advancement of the beam by one dot position. Thus the "0" in the second stage of the shift register 165 is read and applied to the modulator. After the completion of the scanning of a range corresponding to 18 dots, in this manner, a digit completion signal is applied from the counter B 149-1 of the vertical clock circuit 149 shown in FIG. 16 by way of the read-out control circuit 131 to the terminal 215 of the address counter 124 to add "1" to the content of the counter 217, thereby changing the output of adder 207 to "1" and instructing the read-out of the 1st address of PBF 122-1, or of the 2nd character of the 1st line of the 1st page. In this state since the size information is still retained in the size latch, the aforementioned circuits under the control of said size information also retain the state explained above.

In this manner the coded information of the 2nd character "B" is applied to the character generator circuit 150 with the resulting storage of "0" in the 1st to 18th stages of the shift register 165 as explained above, which are read with the horizontal pulses and utilized to modulate the laser beam displacing in synchronization with the horizontal clock.

Upon completion of the read-out of the 136th character in this manner, a scanning line completion signal is generated from the counter A 149-2 in the vertical clock circuit 149 shown in FIG. 16 and applied to the line counter 147 to change the content thereof to "2" (indicating the 2nd scanning line) and simultaneously to the terminal 216 of the address counter 124 to change the content thereof to "0". In this state the read-out operation is restarted for the character information of the 1st character in the 1st line since the counter 205 still retains "0". There is no change in the state of the circuits under the control of the size information since said information is already read at the read-out of 1st scanning line and is still retained in this state, and only one change lies in the line counter 147 from "1" to "2".

The operation for the 2nd scanning line proceeds by the successive read-out of the character information of the 1st line as in the case of 1st scanning line, and completion of the scanning by the read-out of the final character N, a scanning line completion signal is generated by the vertical clock circuit and applied to the line counter 147.

Similarly upon completion of the read-out of information on the 12th scanning line (i.e. after 12 scannings of the characters of the 1st line), a scanning line completion signal is applied to the line counter 147 to change the content thereof from "12" to "13", thereby instructing to commence the 13th read-out. In case of medium sized character as contemplated for the present embodiment, a carry signal is applied at this stage from the adder 279 of FIG. 15 to the character generating circuit, and also said adder applies thereto the first line indicating signal which indicates the first line in the character generator. Thus, upon read-out of the first character "A" at the character generating circuit $\overline{D1-D14}$ there are generated signals 00000011000000 (arrow indicating the read-out direction of the shift register 165) which are transferred to said shift register. Also the signals "0" is transferred to D15–D18 as explained above, with the resulting storage of "0" in the stages D1 to D18 except D7 and D8. The read-out operation proceeds in a similar manner for the second character B, third character C and so on, and upon completion of the read-out of 136th character N the content of the line counter 147 is changed to "14" to start the 14th scanning cycle from the 1st character wherein a 2nd line indicating signal is applied to the character generating circuit 150.

Upon completion in this manner of the 30th read-out constituting the 30th scanning line, a 30th scanning line completion signal is applied from the vertical clock circuit 149 to the line counter 147, which, as explained above, is reset upon counting 30 scanning line completion signals and generates a line completion signal to the read-out control circuit 131 simultaneously therewith. Said line completion signal applied through said read-out control circuit 131 to the terminal 212 of the address counter 124 changes the content of the standard counter 205 to "138", which is transferred to an input of the adder 207 thereby changing output thereof to "138" (see FIG. 14). (The relative counter 206 is reset to "0" since a scanning line completion signal is always generated simultaneously with the line completion signal.)

In this manner the content of the address counter 124 is changed to "138" which instructs the read-out of the first information, or size information, of the 2nd line.

Consequently, after the read-out of the size information and storage thereof in the size latch 138 in a manner as explained in the foregoing, the read-out operation for the 2nd line is repeated as in the case of 1st line, to complete the 2nd line by 30 scanning lines in the case where the 2nd line is also composed of medium sized characters.

Upon completion of the read-out of the 66th line by the repetition of such read-out operations, the read-out control circuit detects the completion of a page by a logical multiplication of the page completion signal contained in the final character of the 66th line and the line completion signal from the line counter 147 and terminates the read-out from PBF 122-1.

Successively the read-out of the succeeding page from the magnetic tape is commenced upon detection of such termination, and the recording is again realized by the read-out of information from the PBF.

Figure 17:
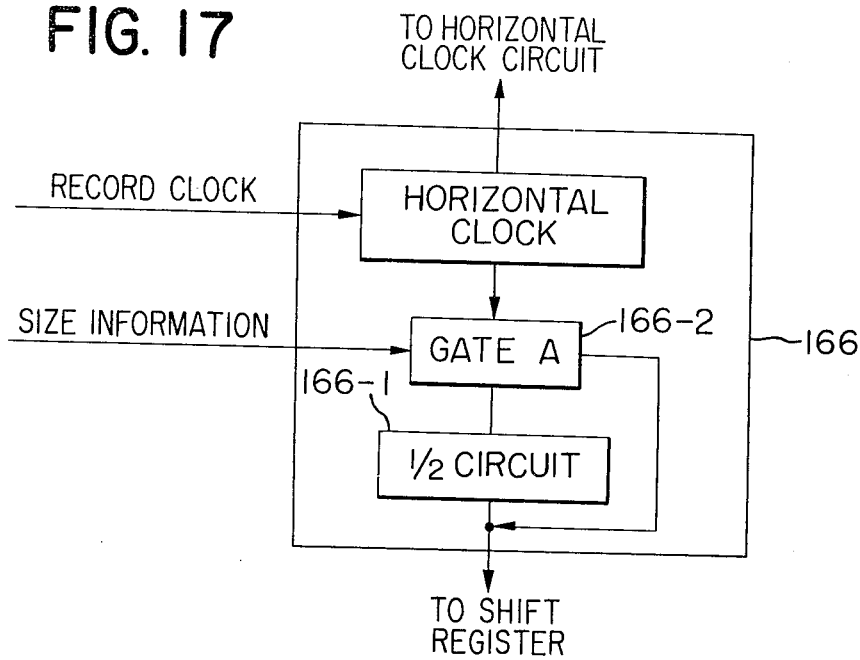
FIG. 17 is a detailed block diagram of a horizontal clock circuit in FIG. 1.

In the case of printing large sized characters, the size information memorized in the size latch 138 and decoded by the decoder 142 is applied as shown in FIG. 17 to the gate A of the horizontal clock circuit 166 thereby reducing the clock frequency applied to the shift register 165 to a half by means of a ½ circuit (which corresponds to reading twice the information of a sage), and also controlling the vertical clock circuit in FIG. 16 to derive therefrom a digit completion signal at each 36 horizontal clock pulses and also to derive therefrom a scanning line completion signal for the line counter 147 at each completion of a scanning line as in the case of medium sized characters while the character generating circuit 150 and the change circuit 152 are controlled in a manner similar to the case medium sized characters. The line counter 147, upon reception of the size information for large sized characters, controls the gate B 147-2 as shown in FIG. 18 to utilize a 1/2 circuit whereby said counter makes 1 count upon reception of two scanning line completion signals.

In this manner a dot in case of the medium size character is read twice both in the column direction and in the line direction to obtain four dots in total, by means of reducing the clock frequency applied to the shift register 165 to a half with respect to the column direction and by doubling the count of line counter 147 with respect to the line direction.

This operation will be more detailedly explained with respect to a particular example of read-out and recording of information consisting of 33 lines each composed of 68 characters A, B, . . . , N. After the read-out of the size information, the first character A of the 1st line is read by the data latch 141 and, as in the case of medium sized characters, the "0" signals are transferred from the character generating circuit 150 to the 1st–18th stages of the shift register 165.

Simultaneously with said transfer, the "0" signal in the 1st stage of the shift register 165 is read to modulate the modulator 303. Upon arrival of the laser beam at the 2nd dot position the shift register 165 is not shifted, contrary to the case of medium sized character, but continues to read the information of the 1st stage due to a fact that the frequency of the shift pulses is reduced to a half, said shift pulse being released to the shift register to allow the read-out from the 2nd stage only when the laser beam arrives at the 3rd dot position.

Upon completion of the read-out of the final 68th character in the 1st line, a scanning line completion signal is released, simultaneously with a digit completion signal, from the vertical clock circuit 149 to the line counter 147, which however still continues to release a signal instructing the 1st scanning line as said counter, in case of large size information, advances the count thereof only after reception of two scanning line completion signals.

Consequently the read-out of the 2nd time after the 1st read-out of the 1st line furnishes the same information as in the 1st scaning while the laser beam is shifted to the 2nd scanning line position. Thus one dot in medium size character is read four times in large size as will be clearly seen from FIG. 7B and 7C.

Further, in the case of large size characters, the 70 to 137th and 207th to 275th characters are not subjected to the read-out operation.

The following is an explanation of the recording of small sized, characters for example, high density information. In this case, the write-in control circuit 126, upon identification of high density information, controls the gate 120 so as to direct the size information and character information to PBF 122 and to write the high density information of one page successively into all of PBF 122-1 to -4, as the high density information corresponds to 4 times the standard information density.

After the information is stored in the PBF the read-out is instructed by the size information which, as in the case of large size characters, is at first stored in the size latch 138 and decoded by the decoder 142. The size information for small size characters thus decoded controls the aforementioned vertical clock circuit 149 to release therefrom a digit completion signal at each 9 clock pulses, the line counter 147 to generate therefrom a line completion signal to be applied to the control circuit 131 upon counting 15 scanning line completion signals as shown in FIG. 15, the gate 282 in the change circuit 152 to generate a complementary number of 6 from the small size complementary number circuit 280, the selection circuit 157 of the character generating circuit 150 (FIG. 10A) so that the character information is applied to the terminal for generating small sized characters, the blank forming circuit 167 to supply "0" signal therefrom to D8 and D9, and the address counter 124 to increase the count thereof by 276 upon reception of a line completion signal.

Although the attached drawings do not show the details of such address counter increasing the count thereof by 276, such functions can be achieved by providing the adder 207 (FIG. 14) with an additional base counter and an additional relative counter which are similar to the standard counter 205 and the relative counter 206 but are capable of increasing the count by 276, and by switching said counters 205 and 206 to said additional counters when the information is identified as high density.

Supposing that the 1st line of a given page of a high density information consists of character information A, B,..., N, after read-out of size information as explained above, the read-out information of the 1st character "A" is applied to the character generator 154 to supply signal "0" to D1 - D7 of the shift register 165 (as the first 6 scanning lines form a blank by the function of the change circuit 152). Also D8 and D9 are supplied with "0" signals as explained above, with the resulting storage of "0" signals in the 1st to 9th stages of the shift register 165, which are subjected to successive read-out by the application of the horizontal clock pulse and modulate the laser beam which is displaced in synchronization with said horizontal pulse.

Upon completion of 9 horizontal clock pulses a digit completion signal is generated and applied through the control circuit 131 to the address counter 124 which thus increases the count thereof by 1 to instruct the read-out of the 2nd character. According to said instruction the read-out of the 2nd character is carried out in a similar manner. Upon completion of the read-out of the 272th character, a scanning line completion signal is supplied from the vertical clock circuit 149 to the line counter 147 and also through the control circuit 131 to the address counter 124 thereby clearing the relative counter to instruct the read-out of 1st character of 1st line again.

Upon completion of the 15th read-out of the character information of 1st line in this manner, the line counter 147 releases a line completion signal which is applied through the control circuit 131 to the address counter 124 thereby advancing the content of the base counter by 276 and advancing the content of the address counter by the number of characters in a line. In this state, therefore, the address counter 124 indicates the address of the 1st character of the 2nd line.

Further, upon completion of the final read-out for the 132th line after repeated read-out operations in the manner explained above, the completion of a page is detected by the line completion signal from the line counter 147 and the page completion signal generated as explained before.

In the foregoing the printing of large, medium or small size characters has been detailedly explained with reference to the case where the PBF 122-1 is involved, but the read-out of data is realized in a similar manner in the case of reading fixed data from PBF 121 by means of the address counter 123 or in the case of reading varying data in reduced printing from PBF 122-2 to --4 by means of the address counter 125, as was explained in the foregoing with respect to 8 combinations of the control signals.

Following is a detailed explanation of the reduced printing mode in which case the information of four pages is printed on a recording sheet as schematically shown in FIG. 9C where the information of four complete pages A, B, C and D is stored respectively in PBF 122-1 to 122-4.

As an example, the information of a whole page A in medium size character, a whole page B in large size character, a whole page C in large size character and a whole page D in medium size character is stored respectively in the n-th, (n+1)-th, (n+2)th and (n+3)th blocks on the magnetic tape and the control signal indicates the reduced printing, the write-in control circuit 126 detects, upon read-out from the magnetic tape, said reduced printing instruction and controls the address counter 124 so as to store said n-th, (n+1)-th, (n+2)-th and (n+3)-th respectively in PBF 122-1, 122-2, 122-3 and 122-4. (It is to be noted that the address counter 125 is used solely for read-out.) The block in the present example means a form from which the 1st record of control signal is omitted. At the read-out operation which is to be commenced upon completion of said write-in operation, the address counter 124 is used, in case of reduced printing, solely for the read-out of PBF 122-1 and 122-2 since the address counter 125 is usable solely for the read-out of PBF 122-3 and 122-4. As is apparent from FIG. 9C, in the case of the reduced printing, a single scanning line writes in information for two pages. In this case, however, as there is no blank space specially provided between one page and another (i.e., in the drawing, between the line AA—and the line CC—, or between the line BB—and the line DD—), no time allowance is obtainable for reading out the size information at the time of recording the character information which is positioned at the right side in the drawing illustration.

In the present embodiment, therefore, prior to the read-out of the information covering two pages, the size information alone for the characters of the 1st line is read from the PBF 122-3 by means of the address counter 125 as detailedly explained with respect to the read-out control circuit 131 and is stored in the size latch 139 by controlling the gate 137.

The size information thus stored in the size latch 139 is decoded by the decoder 143. In this case the size information which in fact provides large size character instructions is decoded by the decoder 143 as a one-step smaller size, i.e. medium size, due to the presence of a reduced printing instruction signal on the signal line 145, and the line counter 148 is controlled according to the case of medium size characters as already explained in the foregoing.

Successively the size information of the 1st line in PBF 122-2 is subjected to read-out, and, with simultaneous control of gate 137, is stored in the size latch 138. Said size information which in fact instructs medium size is decoded by the decoder 142 as small size due to the reduced printing instruction signal applied from the signal line 144, and further the line counter 147 is controlled according to the case of small size character.

Upon completion of the read-out of size information in this manner, the character information of the 1st character of the 1st line in PBF 122-1 is read and transferred to the data latch 141, and the read-out control circuit 131 controls the gate 145 so as to supply the size information for small size to the horizontal clock circuit 166, change circuit 152 and character generating circuit 150 thereby controlling said circuits according to the case of small size printing explained in the foregoing. In this case, however, it will be noted that the printing of a line of a page is completed at the middle of 2488 clock pulses, i.e. at the 1224th clock pulse. Thus a counter C (not shown) contained in the read-out control circuit 131 detects the 1225th clock pulse after the commencement of printing (CP3 in FIG. 12f) and generates a clock pulse CP3' of advanced phase which is used to terminate the supply of control signals to the address counter 124 and to instruct the start of read-out from the address counter 125.

Simultaneously with the start of read-out of the 1st line in PBF 122-3 in this manner, the gate 145 is controlled to allow the supply of size information from the decoder 143 to the signal line 144 which controls the horizontal clock circuit 166, change circuit 152 and character generating circuit 150 according to the size information signal.

In this manner, therefore, the character information is successively read by the data latch 141 and recorded in medium size characters. Upon completion of the 1st scanning line of the 1st line of PBF 122-3, a scanning line completion signal is applied from the vertical clock circuit 149 to the line counters 147 and 148 to advance said counters by 1. Said scanning line completion signal is also applied to clear the relative counters in the address counters 124 and 125, thereby returning the addresses of said relative counters to the initial state.

Thus, after the size information is again read from PBF 122-3, the information of the 1st line in PBF 122-1 is subjected to the read-out a second time, which is followed by the second read-out of the 1st line from PBF 122-1, and this cycle is repeated in a similar manner. Upon completion of the 15th scanning line in this manner, the line counter 147, upon reception of a scanning line completion signal, releases a line completion signal which is supplied through the read-out control circuit 131 to the address counter 124 to advance the count thereof by 138 which corresponds to the number of characters in a line thereby addressing the read-out to the 1st character in 2nd line. In this state the line counter 148 retains the state thereof unchanged.

In reduced printing it is previously arranged that small size cannot be accepted as the size information in PBF 122 (if any it is regarded as an error and not recorded), and the address register is in advance controlled so as to advance the count thereof by 138 upon receipt of a line completion signal. Consequently at the scanning of the 16th scanning line, the read-out operation reads the information of the 2nd line from PBF 122-1 and that of the 1st line from PBF 122-3.

Upon completion of the 990th scanning line whereby the printing of the 1st and 3rd pages is completed, a scanning line completion signal is applied to the line counters 147 and 148 to respectively supply line completion signals to the address counters 124 and 125, which thus indicate the first address of the 1st line of PBF 122-2 and 122-4.

Stated differently the read-out of the succeeding page can be commenced merely by advancing the address by an amount corresponding to one line since PBF 122 is addressed continuously throughout from 122-1 to 122-4.

In reduced printing, as explained in the foregoing, PBF 122-1 to 122-4 respectively store information of one page and thus the information of four pages in total is printed on a recording sheet. If the information to be subjected to reduced printing is recorded on a magnetic tape, said information corresponding to four pages is transferred to the PBF at the same time. Further at the end of the program, reduced printing can be realized even if the amount of information is less than four pages. For example if there are three pages of information left at the end of a program, such three pages are stored in PBF 122-1 to 122-3, and upon detection of the completion of the program by the 276th character of 34th record of 3rd page, an undecodable code "L" and blank code are automatically supplied to PBF 122-4 as the size information and character information respectively.

Such insertion of said blank code clears the prior data stored in PBF 122-4, thus enabling to print three pages in reduced size and one page of blank on a single recording sheet.

For this purpose the write-in control circuit 126 is provided with a blank code generator which, upon detection of the completion of a program, supplies a blank code signal through said write-in control circuit 126 to the distributor 108, and further through a gate to PBF 122-4.

As thus far explained the present embodiment is capable of performing reduced printing, even if the information remaining at the end of a program is less than four pages, by inserting blank code into the marginal space.

The following is an explanation of superposed printing wherein two character information signals are simultaneously read and utilized to modulate the laser beam thereby obtaining a print with two superposed information messages.

As already explained PBF 121 and PBF 122 in the present embodiment are respectively provided with address counters for independent access and can therefore be subjected to read-out operation at the same time. Although the foregoing explanation has principally dealt with the case of storing the data to berecorded into PBF 122, size information and character information of data from the magnetic tape is stored in PBF 121 if the write-in control circuit 126 identifies that the function thereof indicates that said data are stationary.

In this state the next read data, if identified to be varying, are stored in PBF 122. The read-out control circuit 131 identifies, by means of the content of the function register 118, if said varying data instruct superposed printing, and instructs the read-out of the varying data in PBF 122 alone if the superposed printing is not instructed or the simultaneous read-out of PBF 121 and PBF 122 if the superposed printing is instructed.

For the purpose of clarity it is supposed in the following explanation that an information of standard density is stored in PBF 121 and PBF 122-1. The superposed printing instruction from the read-out control circuit 131 activates the address counters 123 and 124 which commence simultaneous and synchronized read-out operations in a manner as explained in the foregoing to store the information in the shift registers 184 and 165. The information in said two shift registers is synchronizedly read, and the image information generator generates an "or" output of the two read-out outputs to control the modulator, the laser modulator thus being driven by the "or" output of the two PBF's. The respective read-out operation from PBF 121 or from PBF 122-1, though not explained detailedly herein, proceeds in a manner identical with the foregoing explanation, with the only difference being that the scanning lines and dots are synchronized, and such control can be realized by applying a control signal simultaneously to the gates 174 and 137 and by supplying the horizontal clock circuit 166 and generator 180 with the same clock signals from the recording clock generator.

FIG. 19 shows an example of such superposed printing wherein PBF 121 memorizes a large sized character "A" as the first character of the 1st line as shown in FIG. 19a while PBF 122-1 memorizes medium sized characters "B" from the third character of the 1st line as shown in FIG. 19b, of which "or" output enables, by superposing the obtaining of a recording in which the first line is composed of A BBBB ... B while the other lines are composed of BBBBB ... B as shown in FIG. 19c.

Such superposing is not limited to the case of ordinary printing but is also realizable in the case of reduced printing.

In the latter case the read-out control circuit 131 controls the decoder 177 so as to change the character size of PBF 121 to medium size if it is large size and to small size if it is medium size, and PBF 121 is subjected to read-out in synchronization with each of PBF 122-1 to 122-4, i.e. the read-out of the 1st scanning line of the 1st line of PBF 121 being synchronized with the read-out of the 1st scanning line of 1st line of PBF 122-1, then with that of the 1st scanning line of the 1st line of PBF 122-2, further when with that of the 1st scanning line of the 1st line of PBF 122-3 and finally with that of the 1st scanning line of the 1st line of PBF 122-4, and nextly the read-out of the 2nd scanning line of the 1st line of PBF 121 being synchronized with that of the 2nd scanning line of the 1st line of PBF 122-1 and so on, and the modulator is modulated by the "or" output of the outputs of shift registers 165 and 184.

FIG. 20 shows an example of such reduced printing wherein PBF 121 memorizes a large size character "A" in the first character of the 1st line while PBF 122-1 to 122-4 memorize large size characters "B", "C", "C" and "D" respectively therein except for the first character of the 1st line, combination of which results in a printing of four pages in each of which character "A" is inserted in the first character of 1st line as shown in FIG. 20.

In the foregoing example the modulator 303 is supplied with the "or" output of the "reset" output of flip-flop 285 and the output of shift register 165 or 184, but it is also possible to supply said modulator 303 with an "and" of the "set" output of said flip-flop 285 and the output of said shift register 165 or 184, and any other logic output of the two meeting the purpose can be used for modulating the modulator 303. Further, the counter 195 or the circuit shown in FIG. 13 employed for defining the left margin is in fact merely functioning as a timer and can therefore be replaced for the same purpose by an appropriate time-constant circuit which releases a time signal at a fixed period after the reception of a trigger input signal.

In such case the counter 195 in FIG. 11 is eliminated and replaced by a timer containing a time-constant circuit which receives the "set" output of the flip-flop 191 as the trigger input signal and releases a time signal to the "and" gate 196 after said fixed period which is identical with the period during which said counter 195 counts the pulses of fixed number supplied from the divider or counter 192. It is naturally possible, by making the time-constant of said timer variable, to obtain the same effect as obtained by making the counting of said counter 195 variable.

Further, though the divider 192 for reducing the main clock of 80 MHz to 5 MHz is in the foregoing embodiment driven by the output of the beam detector 318 in order to detect the position of moving body, the present invention is by no means limited to such embodiment but can also be achieved in other ways for example by driving a locked oscillator having an oscillating circuit of 5 MHz which is resonant with said main clock of 80 MHz by means of the output of said beam detector 318. Further it is possible in this manner to detect not only the beam position but also the position of other moving bodies such as a recording stylus.

As thus far explained the present invention realizes the irradiation with a beam of a predetermined and exactly defined recording area on a recording medium, and thus enables the exact recording in a desired position.

Following is a detailed description of the details of the control of the aforementioned recording unit 102 in particular connection with how to address the exposure of data signals by laser to a predetermined position of the photosensitive drum 308 in FIG. 30 when there exists therein a splice junction 229 parallel to the rotary axis of said photosensitive element 228 (as formed by winding a sheet-formed photosensitive material around a drum to form a photosensitive element) and how to transfer effectively, in case of transfer-type electrophotography in which the image formed on the photosensitive element is transferred onto a recording sheet, such image to paper etc., wherein the positioning at transfer is important particularly in case of sheet-form transfer material.

These points will be clarified in the following explanation with respect to an embodiment utilizing an electrophotographic process.

Figure 31:
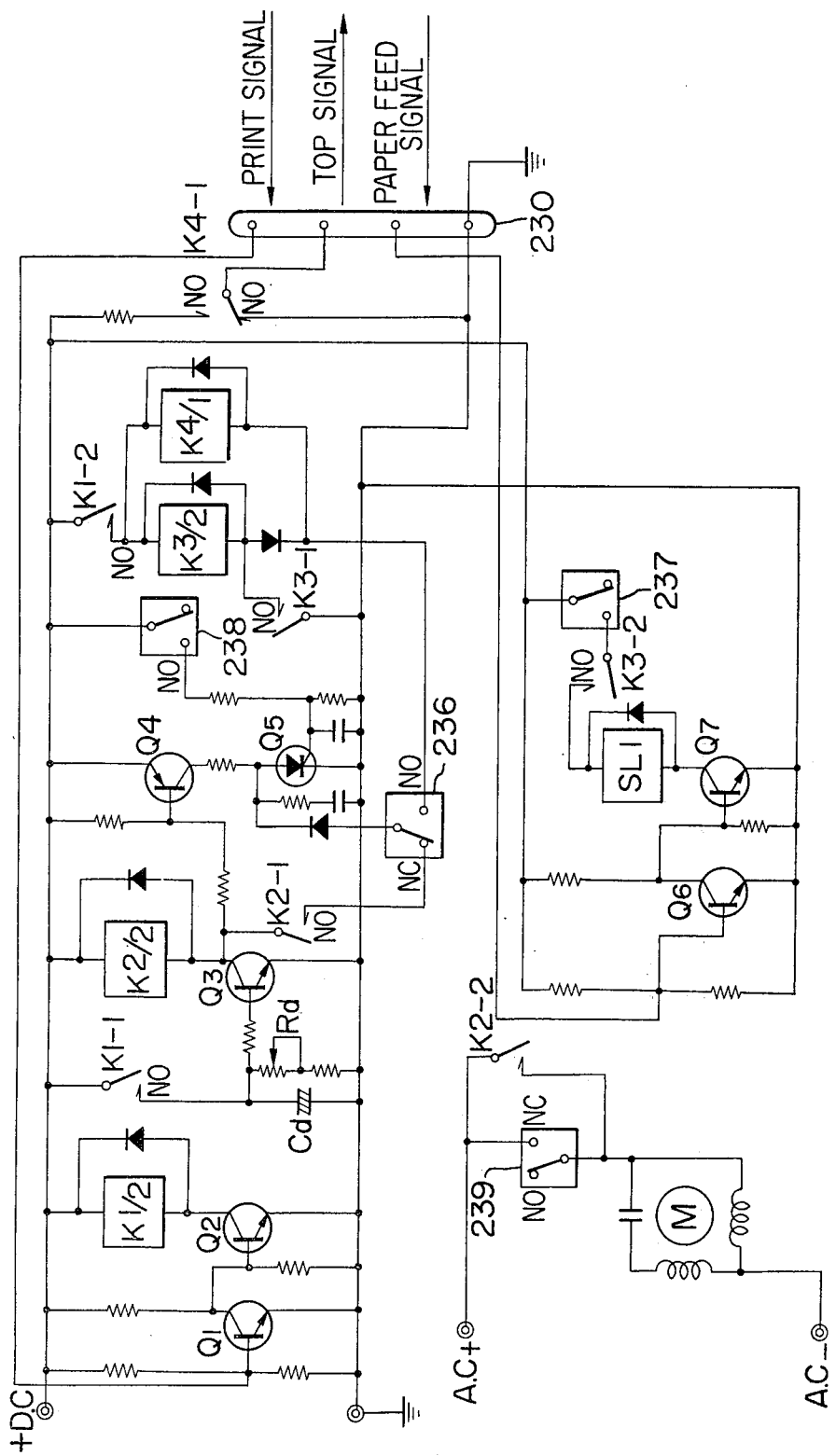
FIG. 31 is a circuit diagram of a recording control circuit in the recording unit.

FIG. 30 and FIG. 31 show a first embodiment utilizing a jointed photosensitive drum.

Upon receipt of a print signal to instruct the start of printing from the control unit 101, the drive motor is started and the photosensitive drum which has been at standstill is rotated. Simultaneously the charger etc. are activated to reach an almost stationary state ready for printing before said photosensitive drum makes a full rotation, and a top signal instructing the start of exposure is released to the control unit 101 through the signal line 188 (FIG. 1D).

In the control unit 101, the information output from PBF is commenced by the "and" output (initial rise or fall of said output) of said print signal and said top signal.

Simultaneously the recording paper is fed by a paper feed signal if the transfer of the image formed on the photosensitive element is desired.

With respect to FIG. 31, the print signal received from the terminal 230 brings the transistor Q2 to conductive state which in turn closes the relays K1 and K2 to put the photosensitive drum 308 into rotation and to bring the transistors Q4 and Q5 to a "stand-by" state.

The photosensitive drum 308 is provided, as shown in FIG. 30, at an end face thereof with a base cam 231, paper feed cam 232, start cam 233 and stop cam 234 located at different radial distances, corresponding to which there are provided a page-top microswitch 236, paper feed microswitch 237, start microswitch 238 and stop microswitch 239 mounted on a support plate 235 fixed on a non-represented substrate, thereby enabling, upon rotation of the photosensitive drum in the direction V, to obtain an output signal at positions of said cams from corresponding microswitches.

Thus, after said relays K1 and K2 are closed, the microswitch 236 is actuated at first to release a paper feed signal for paper feeding in case the information recorded on the photosensitive element is to be transferred onto said paper.

With respect to FIG. 31, the print signal received from the terminal 230 brings the transistor Q2 to conductive state which in turn closes the relays K1 and K2 to put the photosensitive drum 308 into rotation and to bring the transistor Q4 and switching element Q5 to a "stand-by" state.

At this point the relays K4 and K5 retain their initial state since Q5 is not yet conductive. Only after an approximately full rotation of the photosensitive drum is the microswitch 236 actuated to render Q5 conductive, and, thereafter said microswitch 236 generates the top signals which are sent to the control unit from the "top" terminal.

Thus, once started, the top signal continues to be released once for each rotation of the photosensitive element, and the control unit commences the output of print data from PBF upon reception of said top signal as explained in the foregoing. The main control circuit 130 releases a paper feed signal simultaneously with the read-out of information from PBF.

The microswitch 237 in the printer unit is actuated at a predetermined time corresponding to the cam position, but the paper feed solenoid SL1 does not function since the transistor Q7 is not conductive. Said transistor Q7 is rendered conductive by the paper feed signal from the control unit 101, after which the paper feed microswitch 237 becomes effective for activating the solenoid SL1 to feed paper.

The time sequence of the above-mentioned steps are indicated in FIG. 32 wherein the print signal is supplied at $t_0$ and the first top signal is released at $t_1$ after an approximately full rotation of the photosensitive drum, between which the output signals of the microswitches 236, and 237 are not used.

Also after the termination of the print signal upon completion of printing, the drum makes an ideal rotation with no printing during which the microswitches 236 and 237 are not utilized and said drum is stopped thereafter by the function of the microswitch 239.

The period $T_p$ from the top signal to the paper feed is determined by the cam setting and is maintained constant irrespective of process speed or speed of photosensitive drum, thereby assuring stable paper feeding.

With respect to the exact transfer of the image on the photosensitive drum in register with the transfer material such as paper, following consideration is required. The following equation must be satisfied in order to keep the start of the image in register with the top end of the paper:

$$T_m + T_{t-E} = T_p + T_{t-p}$$

wherein $T_{t-E}$ indicates a period for the photosensitive element exposed at the exposure station to reach the transfer station, $T_{t-P}$ a period necessary for the transfer paper to reach the transfer station after feeding, $T_m$ a period from the reception of top signal by the signal control unit to the start of exposure, and $T_P$ a period from the top signal to the start of paper feed. Supposing that $T_P$ is determined by the cam position and that the peripheral speed of the photosensitive drum is identical with the advancing speed of the paper, $T_{t-E}$ and $T_{t-P}$ are determined by mechanical factors such as process speed, diameter of photosensitive element etc. In case it is intended to start the data output immediately after the top signal (i.e. $t_m = 0$), the cam setting requires a high mechanical precision which will involve significant difficulty to realize whereas such difficulty can be greatly reduced if there is provided an adjustable period $t_m$ for the top margin. Thus, the signal control unit performs a function to form a top margin as explained in the following with reference to FIGS. 33 and 34.

As shown in FIG. 33 there is provided a monostable multi-vibrator IC1 which is capable of freely regulating, by means of the value of R, the length of top margin which is the blank portion formed at the top end of a recording paper. Upon reception of a top signal with a pulse width d as the trigger signal, said multivibrator is capable of releasing a top margin signal with a pulse width $T_m$ which is determined by a time-constant circuit containing said R as a part thereof.

With respect to FIG. 34, the top margin signal is already generated at the first top signal but the control unit is not yet ready for the data output at this point, and the paper feed signal is not released from IC2 since the write-in instruction signal supplied from the control unit to the recording unit is applied thereto with a certain delay, with no data output or modulation of laser beam at this point, and the recording is thus commenced from the second top signal.

In this manner the registration between the image and the transfer material is greatly facilitated since the top margin period $T_m$ is freely adjustable by regulating the value of R.

In case of a jointed photosensitive element, as thus far explained, the process control is significantly facilitated by providing a multi-vibrator of an adjustable time constant with a base signal (top signal) released upon the arrival of a given point on the photosensitive drum at a given rotational position, thereby substantially rendering the pulse width of said top signal variable and also by providing a top margin on the record.

In the following there is explained a second embodiment of the control of the printing unit utilizing an endless photosensitive drum.

Figure 35:
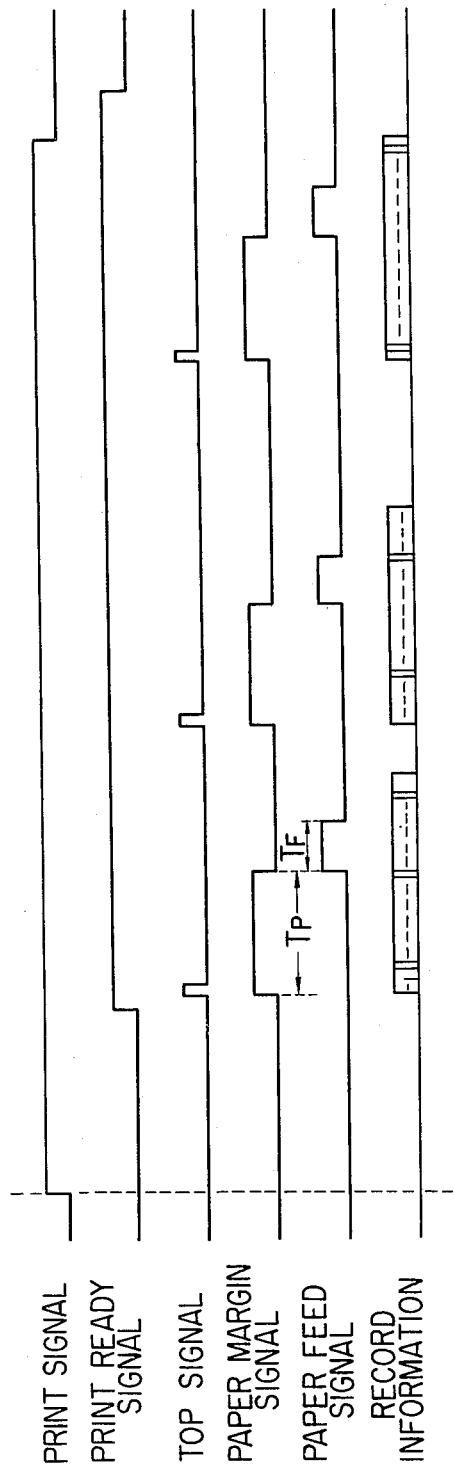

As shown in FIG. 35, a print signal supplied from the control unit initiates the preparatory rotation of the printer, unit, which releases a "ready" signal upon reaching a state ready for printing. Upon receipt thereof the control unit commences the output of data from PBF and simultaneously releases a top signal (start signal) to the printing unit.

The read-out start instruction signal supplied from the main control circuit 130 to the read-out control circuit 131 can be used for said top signal.

Figure 36:
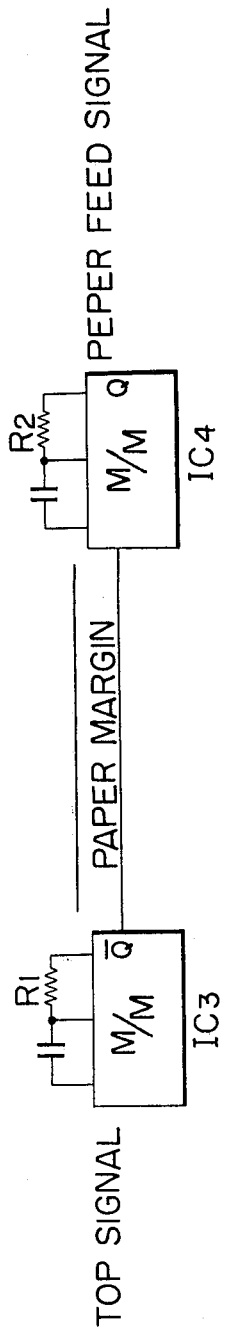
FIG. 36 is a block diagram of the reshaping circuit for paper feeding signals.
Figure 37:
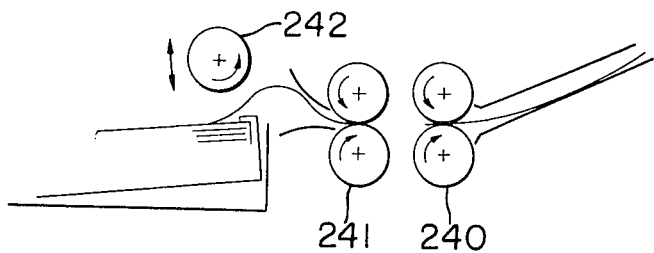
FIG. 37 illustrates a side view of a group of rollers illustrating paper-feeding.
Figure 39:
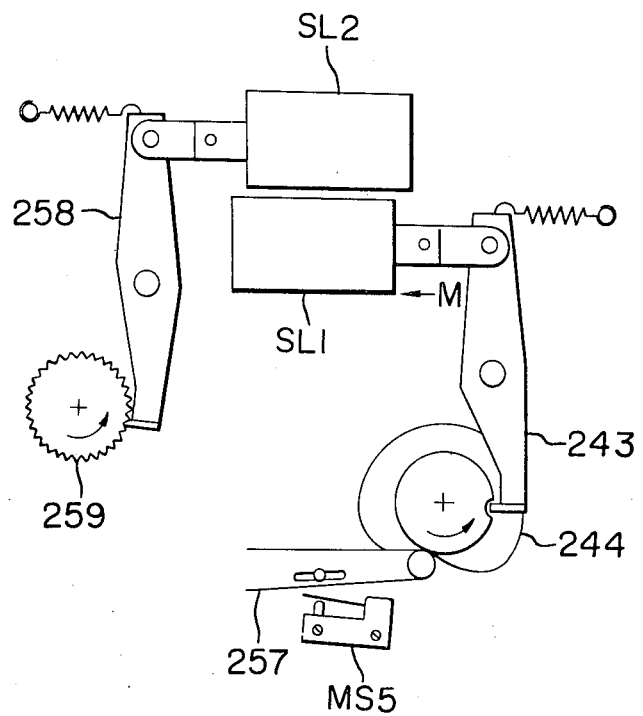
FIG. 39 illustrates a driving mechanism for paper-feeding.
Figure 38:
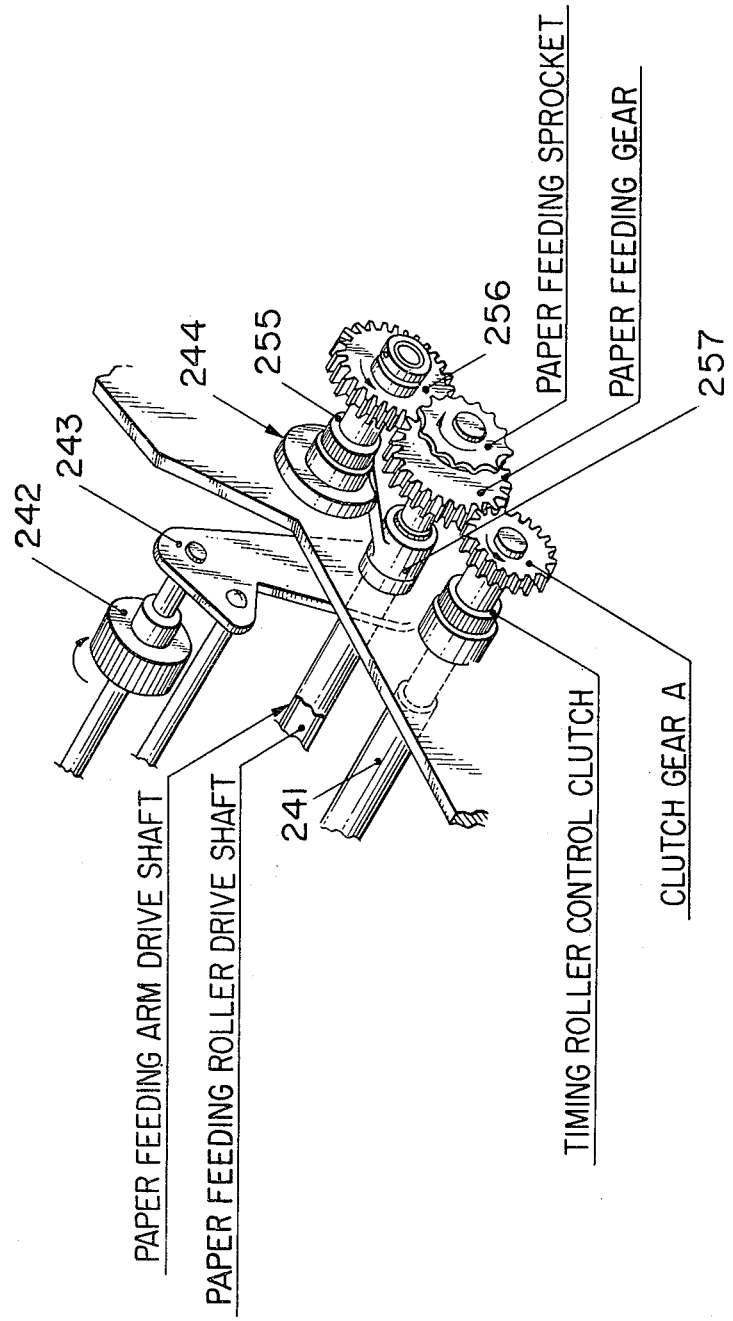
FIG. 38 illustrates a perspective view of a group of rollers illustrating paper-feeding.
Figure 40:
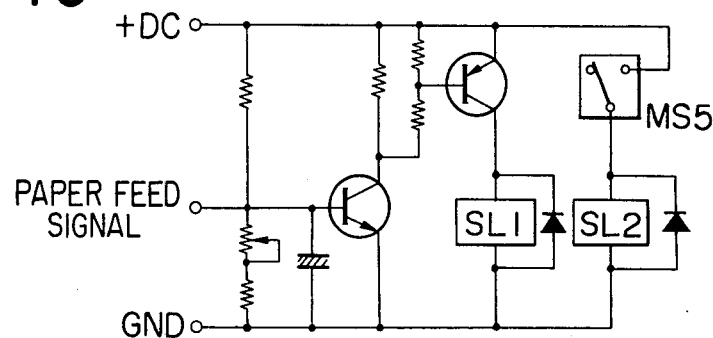
FIG. 40 is a circuit diagram of a paper-feeding control circuit.
Figure 41:
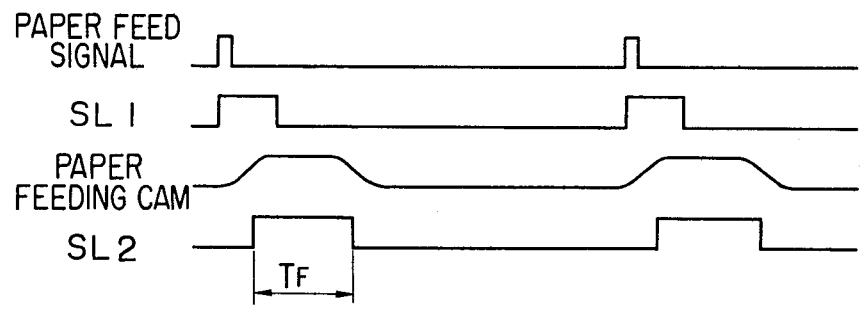
FIG. 41 is a set of wave forms in the control circuit in FIG. 40.

Upon receipt thereof the printing unit controls the timing of paper feed as explained in the following with reference to FIG. 36. This function is achieved, with two monostable multi-vibrators IC3 and IC4, by adjusting $T_P$ since $T_m$ is equal to zero in the foregoing equation in the first embodiment. The time period $T_P$ from the top signal to the start of paper feed is determined by the resistance $R_1$ of the monostable multi-vibrator IC3 as said multi-vibrator is constructed as shown in FIG. 35 to be triggered by the initial signal from top signal and to release a signal of a pulse width $T_P$ determined by a time constant circuit containing $R_1$ as a part thereof, and the period $T_F$ of the paper advancement from the feed thereof to the transport system is also determined by a monostable multi-vibrator of which time constant is made varible by a resistance $R_2$ as in the case of multi-vibrator IC3. Said period $T_F$ is dependent on the feeding mechanism and is adjusted by $R_2$. As explained thus far, the control in case of an endless photosensitive drum is governed by the control unit and is characterized in that the printing can be commenced irrespective of the position of photosensitive element.

The method of paper feed will be further detailedly explained in the following with respect to an embodiment thereof shown in FIGS. 37-44, in which a paper feed roller 242, a timing roller 241 and a transport roller 240 are driven by a drive system common with that for the photosensitive drum.

A paper feed signal displaces the paper feeding solenoid SL1 in the direction M to release a paper feeding cam 244 from a paper feed control arm 243 and also to liberate a paper feed cam control clutch 255. Thus the rotation of a clutch gear 256 is transmitted to the paper feeding cam 244 to lower an arm 257, and a paper feeding roller 242 mounted on a paper feed arm which in turn is fixed to aforementioned arm 257 (said roller being fixed on the paper feeding roller drive shaft) advances a sheet of paper to the timing roller 241. The lowered arm 257 which has started the feeding of paper also actuates microswitch MS5 which activates a solenoid SL2 to lock the timing clutch 259 by a timing control arm 258. Consequently the paper thus fed is forwarded toward the timing roller in standstill whereby the top end of a paper sheet is kept in correct position by the advancing force.

The arm 257 starts to ascend and to leave from the paper when said paper becomes slightly bent as the top end thereof is stopped while the tail thereof is advanced. At this point the microswitch MS5 is opened to release the timing clutch, thus enabling the timing roller to rotate again and advance the paper toward the transport roller. On the other hand the paper feed control arm engages with the recess of the paper feeding cam to lock the paper feeding clutch. The sequence of such signals is illustrated in FIGS. 33 and 34.

The paper registering time $T_F$ (FIG. 35) which in fact is the effective paper feed time is determined by mechanical factors and requires no readjustment in case the process speed is changed, thus assuring stable paper feeding.

Figure 42:
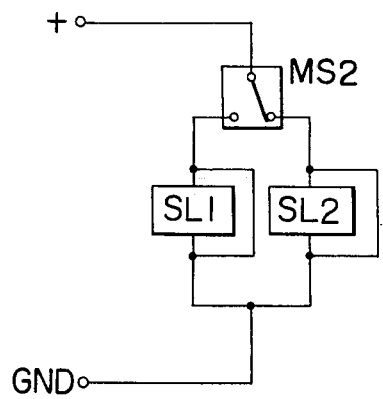
FIG. 42 and 43 are circuit diagrams for paper-feeding.
Figure 43:
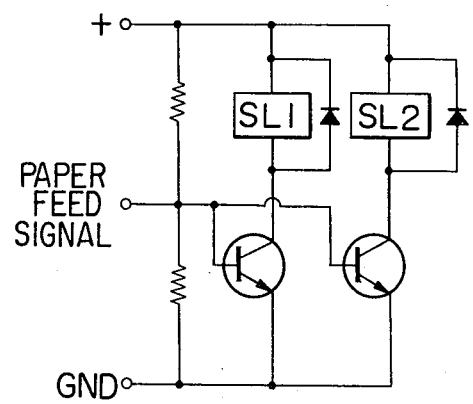

In the conventional mechanism this function was achieved by a microswitch MS2 actuated directly by the photosensitive element as shown in FIG. 42 or by an external signal as shown in FIG. 43 in either of which SL1 is activated simultaneously with SL2 so as to start the rotation of the timing roller at the moment SL1 is switched off. In this method the registration of the top end of a paper sheet at the timing roller cannot be realized in a stable manner unless the timing of the feed signal is satisfactorily controlled. Stated differently such method is apt to cause difficulties such as the lack of said registration step if the timing roller is prematurely started with respect to the function of the paper feed roller or possible damage to said paper if said timing roller is started too late.

According to the present invention the paper feed signal, being generated by a monostable multi-vibrator of a variable pulse width triggered by a top signal (base signal), is made arbitrarily variable in pulse width thereof, and thus the top marginal blank portion on the recording sheet is freely adjustable.

What we claim is:

1. A character size changing apparatus comprising:
   (a) a beam forming means which, by application of character dot signals, forms a beam modulated by the character dot signals;
   (b) deflecting means which deflects the beam obtained from said beam forming means to scan a recording medium;
   (c) signal generating means which, by application of character signals and scanning line instructing signals, generates character dot signals corresponding to said character signals and belonging to the instructed scanning lines;
   (d) counting means for forming the scanning line instructing signals, wherein said counting means advances according to the number of times the beam scans said recording medium;
   (e) instructing means for instructing the size of a character to be formed on said recording medium; and
   (f) control means for controlling said counting means to advance only once in response to a plurality of beam scans when a large character size is instructed by said instructing means.

2. A character size changing apparatus as defined in claim 1, further comprising beam detecting means provided along the path of beam deflection for detecting the deflected beam and for applying an output to said counting means.

3. A character size changing apparatus as defined in claim 1, further comprising driving means which drives said recording medium at a constant speed in a direction substantially perpendicular to the scanning direction of the beam.

4. A character size changing apparatus as defined in claim 1, wherein said instructing means includes, at least a first instructing means for instructing a first character size and a second instructing means for instructing a second character size.

5. A character size changing apparatus as defined in claim 1, wherein said counting means includes a counter, and said counter comprises a first counter to count the number of scanning lines, and ½ step-down means to halve the count of said first counter.

6. A character size changing apparatus as defined in claim 5, wherein said instructing means includes at least a first instructing means to instruct a first character size and a second instructing means to instruct a second character size, and wherein, when the first character size is instructed by said first instructing means, said ½ step-down means is not utilized, and, when said second character size is instructed by said second instructing means, said ½ step-down means is actuated by said control means.

7. A character size changing apparatus comprising:
(a) beam forming means which, by application of character dot signals, forms a beam modulated by the character dot signals;
(b) deflecting means which deflects the beam obtained from said beam forming means to scan a recording medium;
(c) dot signal generating means which, by application of character signals and scanning line instructing signals, generates a plurality of character dot signals which correspond to said character signals and belong to the instructed scanning lines;
(d) parallel-series converting means for converting said plurality of character dot signals obtained from said dot signal generating means into a series of character dot signals for sequential application to said beam forming means;
(e) counting means for forming the scanning line instructing signals, wherein said counting means advances according to the number of times the beam scans said recording medium;
(f) instructing means for instructing the size of a character to be formed on said recording medium; and
(g) control means for controlling said counting means to advance only once in response to a plurality of beam scans when a large character size is instructed by said instructing means.

8. A character size changing apparatus as defined in claim 7, wherein said beam forming means consists of a semi-conductor laser oscillator.

9. A character size changing apparatus as defined in claim 7, wherein said recording medium consists of a drumshaped photosensitive body.

10. A character size changing apparatus as defined in claim 7, wherein said parallel-series converting means consists of a shift register.

11. A character size changing apparatus as defined in claim 7, wherein said deflecting means consists of a rotatory polygonal mirror.

12. A character size changing apparatus comprising:
(a) recording means which, by scanning a recording medium, records, on said recording medium, characters formed by dots corresponding to character dot signals;
(b) signal generating means which, by application of character signals and scanning line instructing signals, generates character dot signals corresponding to the character signals and belonging to the instructed scanning lines;
(c) counting means for forming the scanning line instructing signals, wherein said counting means advances according to the number of times said recording medium is scanned by said recording means, said counting means including a counter which in order to form blank portions between rows of characters on said recording medium, converts a counted value of said counter to another value which differs from the counted value by a particular value;
(d) instructing means to instruct the size of a character to be formed on said recording medium; and
(e) control means which controls said counting means to advance only once in response to a plurality of scans by said recording means when a large character size is instructed by said instructing means.

13. A character size changing apparatus as defined in claim 12, wherein said converting means comprises particular value generating means for generating said particular value, and operational means which compares the counted value of said counter and the particular value generated by said particular value generating means and converts said counted value into another value.

14. A character size changing apparatus as defined in claim 13, wherein said particular value generating means comprises a first particular value generating means to generate a first particular value and a second particular value generating means to generate a second particular value, and said character size changing apparatus further includes particular value controlling means for applying one of said first and second particular values to said operational means.

15. A character size changing apparatus as defined in claim 12, wherein said counter includes a first counter to count the number of scanning lines, and ½ step-down means to halve the counted value of said first counter.

16. A character size changing apparatus as defined in claim 15, wherein said ½ step-down means is driven by said control means when said instructing means instructs a large character size.

17. A character size changing apparatus as defined in claim 12, wherein said converting means is constructed in such a manner that said scanning line instructing signals may not be led out of said counting means until said first counter reaches a particular value.

18. A character size changing apparatus comprising:
(a) recording means which, by scanning a recording medium, records, on said recording medium, characters formed by dots corresponding to character dot signals;
(b) character dot signal generating means which, by application of character signals, scanning line instructing signals, and clock signals, generates character dot signals corresponding to the character signals and belonging to the instructed scanning lines in accordance with the application of the clock signals;
(c) clock signal generating means which generates clock signals for reading out the character dot signals from said character dot signal generating means;
(d) counting means for forming the scanning line instructing signals, wherein said counting means advances in accordance with the number of times said recording medium is scanned by said recording means;
(e) instructing means for instructing the size of a character to be formed on said recording medium; and
(f) control means which controls said counting means in such a manner that, when a large character size is instructed by said instructing means, said counting means advances only once for a plurality of scans and, at the same time, controls said clock signal generating means in such a manner that the frequency of the clock signals generated by said clock signal generating means is reduced to a lower frequency value.

19. A character size changing apparatus as defined in claim 18, wherein said recording means comprises:

beam forming means which, by application of character dot signals, forms a beam modulated by the character dot signals; and deflecting means which deflects the beam obtained from said beam forming means to scan said recording medium.

20. A character size changing apparatus as defined in claim 18, wherein said character dot signal generating means comprises dot signal generating means which, by application of character signals and scanning line instructing signals to instruct particular scanning lines, generates a plurality of character dot signals corresponding to the character signals and belonging to the instructed scanning lines and parallel-series converting means which accommodates said plurality of character dot signals obtained from said dot signal generating means, for sequential application to said recording means in response to application of the clock signals.

21. A character size changing apparatus as defined in claims 18, wherein said clock signal generating means comprises a first clock signal generating means which generates first clock signals of a certain definite frequency, and a ½ circuit which halves the frequency of the clock signals obtained from said first clock signal generating means.

22. A character size changing apparatus as defined in claim 21, wherein said control means comprises clock control means which determines whether said ½ circuit is to be actuated or not.

23. A character size changing apparatus comprising:
(a) recording means which, by scanning a recording medium, records characters formed by dot signals corresponding to character dot signals on said recording medium;
(b) dot signal generating means which, by application of character signals and scanning line instructing signals, generates a plurality of character dot signals corresponding to the character signals and belonging to the instructed scanning lines;
(c) parallel-series converting means which converts a plurality of character dot signals obtained from said dot signal generating means to a series of character dot signals for sequential application to said recording means;
(d) blank portion forming means which applies particular information to said parallel-series converting means to form blank portions at the side of the characters to be formed on said recording medium;
(e) clock signal generating means which generates clock signals for timing the application of the series of character dot signals from said parallel-series converting means to said recording means;
(f) counting means for forming the scanning line instructing signals, wherein said counting means advances in accordance with the number of times said recording medium is scanned by said recording means;
(g) instructing means for instructing the size of a character to be formed on said recording medium; and
(h) control means which controls said counting and said clock signal generating means in such a manner that, when a large character size is instructed by said instructing means, said counting means advances only once in response to a plurality of scans on said recording medium by said recording means, and, at the same time, the frequency of the clock signals generated by said clock signal generating means is reduced.

24. A character size changing apparatus as defined in claim 23, wherein said parallel-series converting means comprises a shift register having a plurality of stages.

25. A character size changing apparatus as defined in claim 24, wherein said blank portion forming means applies the particular information to a particular stage of said shift register.

26. A character size changing apparatus as defined in claim 23, wherein said recording means comprises:
beam forming means which, by application of character dot signals, forms a beam modulated by the character dot signals; and
deflecting means which deflects the beam obtained from said beam forming means to scan said recording medium.

27. A character size changing apparatus as defined in claim 23, further comprising beam detecting means provided along the path of beam deflection for detecting the deflected beam and for applying an output to said counting means.

28. A character size changing apparatus comprising:
(a) recording means which, by scanning a recording medium, records characters, formed by dot signals corresponding to character dot signals, on said recording medium;
(b) dot signal generating means which, by application of character signals and scanning line instructing signals, generates a plurality of character dot signals corresponding to the character signals and belonging to the instructed scanning lines;
(c) parallel-series converting means which converts a plurality of character dot signals obtained from said dot signal generating means to a series of character dot signals for sequential application to said recording means;
(d) blank portion forming means which, in order to form blank portions at the side of a character to be formed on said recording medium, applies particular information to said parallel-series converting means;
(e) clock signal generating means which generates clock signals for timing the application of the series of character dot signals from said parallel-series converting means to said recording means;
(f) counting means for forming the scanning line instructing signals, wherein said counting means advances in accordance with the number of times said recording medium is scanned by said recording means, said counting means comprising a counter for counting the number of scans, and converting means for changing a counted value of said counter to another value which differs from the counted value by a particular value;
(g) instructing means which instructs the size of a character to be formed on said recording medium; and
(h) control means which controls said counting means and said clock generating means in such a manner that, when a large character size is instructed by said instructing means, said counting means advances only once in response to a plurality of scans of said recording medium by the recording means, and, at the same time, the frequency of the recording clock signals generated from said clock signal generating means is reduced.

29. A character size changing apparatus as defined in claim 28, wherein said recording means comprises:
beam forming means which, by application of character dot signals, forms a beam modulated by the character dot signals; and
deflecting means which deflects the beam obtained from said beam forming means to cause the beam to scan said recording medium.

30. A character size changing apparatus as defined in claim 29, further comprising beam detecting means provided along the path of beam deflection for detecting the deflected beam and applying an output to said counting means.

31. A character size changing apparatus comprising:
(a) laser beam forming means which, by application of character dot signals, generates a laser beam modulated by the character dot signals;
(b) deflecting means which deflects the modulated laser beam to scan a photosensitive drum;
(c) dot signal generating means which, by application of character signals and scanning line instructing signals, generates a plurality of character dot signals corresponding to the character signals and belonging to the instructed scanning lines;
(d) beam detecting means which detects the scanning laser beam and which forms a beam detecting signal;
(e) a first counter which counts the beam detecting signals from said detecting means;
(f) ½ step-down means which halves the counted value of the beam detecting signals by said first counter;
(g) counter control means which controls whether the beam detecting signal is directly applied to said first counter, or whether said beam detecting signal is applied to said first counter through said ½ step-down means;
(h) changing means which changes a counted value of said first counter into another value which differs from the counted value for a particular value so as to form a blank portion between lines of characters to be formed on said photosensitive drum, and applies the thus changed counted value to said dot signal generating means;
(i) parallel-series converting means which converts a plurality of character dot signals obtained from said dot signal generating means to a series of character dot signals for sequential application to said recording means;
(j) blank portion forming means which applies particular information to said parallel-series converting means to form blank portions at the side of a character to be formed on said recording medium;
(k) clock signal generating means which generates clock signals for timing the application of the series of character dot signals from said parallel-series converting means to said recording means, said clock signal generating means including a first clock signal generating means to generate first clock signals, and a ½ circuit to halve the frequency of the clock signals obtained from said clock signal generating means;
(l) clock control means which controls whether the clock signals obtained from said clock signal generating means are to be applied to said parallel-series converting means at their normal frequency, or whether the clock signals are to be applied thereto at a frequency which has been halved by said ½ circuit; and
(m) instructing means which instructs whether the size of a character to be formed on said recording medium is a first size or a second size, wherein the beam detecting signal is applied to said first counter as is by said counter control means, and the clock signals are applied to said parallel-series converting means as is by said clock control means when the first character size is instructed by said instructing means, and wherein the beam detecting signal is applied to said first counter by said counter control means through the ½ step-down means and the clock signals are applied to said parallel-series converting means by said clock control means through the ½ circuit, when the second character size is instructed by said instructing means.

32. A character size changing apparatus as defined in claim 31, wherein said changing means includes particular number generating means which generates a particular number, and operational means which compares said particular number and an output from said first counter.

33. A character size changing apparatus as defined in claim 31, wherein said changing means comprises a first particular number generating means to generate the first particular number, a second particular number generating means to generate the second particular number, particular number control means which selects one of said first particular number or said second particular number, and operational means which compares the particular number selected by said particular number control means and an output from said first counter, and wherein, when the first character size is instructed by said instructing means, the first particular number is applied to said operational means by said particular number control means, and, when the second character size is instructed by said instructing means, the second particular number is applied to said operational means by said particular number control means.

* * * * *